(12) United States Patent
Natarajan et al.

(10) Patent No.: US 11,345,030 B2
(45) Date of Patent: May 31, 2022

(54) METHODS AND APPARATUS FOR COMPLEX ASSEMBLY VIA AUTONOMOUS ROBOTS USING REINFORCEMENT LEARNING ACTION PRIMITIVES

(71) Applicant: Intel Corporation, Santa Clara, CA (US)

(72) Inventors: Venkataraman Natarajan, Bangalore (IN); Gagan Acharya, Karnataka (IN); Ramya M., Gobichettipalayam (IN); Amit Sudhir Baxi, Bengaluru (IN); Arjun K. G., Chennai (IN); Shagaya Mageshkumar Vincent, Navi Mumbai (IN)

(73) Assignee: INTEL CORPORATION, Santa Clara, CA (US)

( * ) Notice: Subject to any disclaimer, the term of this patent is extended or adjusted under 35 U.S.C. 154(b) by 402 days.

(21) Appl. No.: 16/424,025

(22) Filed: May 28, 2019

(65) Prior Publication Data
US 2019/0275671 A1    Sep. 12, 2019

(51) Int. Cl.
*B25J 9/16*    (2006.01)
*G06N 20/00*    (2019.01)

(52) U.S. Cl.
CPC .......... *B25J 9/163* (2013.01); *B25J 9/1664* (2013.01); *B25J 9/1697* (2013.01); *G06N 20/00* (2019.01)

(58) Field of Classification Search
USPC ............................................... 700/245–264
See application file for complete search history.

(56) References Cited

U.S. PATENT DOCUMENTS

| 7,200,260 B1 * | 4/2007 | Watanabe | B25J 9/1692 901/3 |
| 9,327,406 B1 * | 5/2016 | Hinterstoisser | B25J 9/1697 |
| 10,147,210 B1 * | 12/2018 | Desai | H04N 7/183 |

(Continued)

FOREIGN PATENT DOCUMENTS

| DE | 102014108287 | 11/2015 |
| DE | 202017106132 | 11/2017 |

(Continued)

OTHER PUBLICATIONS

German Patent Office, "Office Action," issued in connection with German Patent Application No. 10 2020 106 714.3, dated Jan. 13, 2021, 6 pages (English translation not available).

(Continued)

*Primary Examiner* — Jonathan L Sample
(74) *Attorney, Agent, or Firm* — Hanley, Flight & Zimmerman, LLC

(57) ABSTRACT

Methods and apparatus for complex assembly via autonomous robots using reinforcement learning action primitives are disclosed. An example apparatus includes a construction manager and a movement manager. The construction manager is to determine sequences of reinforcement learning (RL) action primitives based on object location goals and associated assembly goals determined for respective ones of objects depicted in an imaged assembly of objects. The movement manager is to command a robot to construct a physical assembly of objects based on the sequences of RL action primitives. The physical assembly of objects is to correspond to the imaged assembly of objects.

23 Claims, 23 Drawing Sheets

(56) References Cited

U.S. PATENT DOCUMENTS

| | | | |
|---|---|---|---|
| 10,332,066 B1* | 6/2019 | Palaniappan | G01G 19/42 |
| 10,360,531 B1* | 7/2019 | Stallman | G06Q 10/087 |
| 10,384,869 B1* | 8/2019 | Shiee | B65G 1/02 |
| 10,438,277 B1* | 10/2019 | Jiang | G06V 20/52 |
| 10,475,185 B1* | 11/2019 | Raghavan | G06Q 10/087 |
| 10,552,750 B1* | 2/2020 | Raghavan | G06Q 30/0639 |
| 10,919,151 B1* | 2/2021 | Marchese | B65G 1/1373 |
| 11,014,231 B2* | 5/2021 | Parikh | B25J 9/1687 |
| 2015/0336268 A1* | 11/2015 | Payton | B25J 9/163 |
| | | | 901/3 |
| 2016/0016311 A1* | 1/2016 | Konolige | B25J 9/1633 |
| | | | 901/30 |
| 2016/0089782 A1* | 3/2016 | Sisbot | B25J 9/163 |
| | | | 700/250 |
| 2017/0136632 A1* | 5/2017 | Wagner | B25J 9/1687 |
| 2017/0225330 A1* | 8/2017 | Wagner | B25J 9/1694 |
| 2018/0126550 A1* | 5/2018 | Izhikevich | G06N 3/049 |
| 2018/0281180 A1* | 10/2018 | Yamamoto | B25J 9/1664 |
| 2018/0349527 A1* | 12/2018 | Li | G06N 3/08 |
| 2018/0370027 A1* | 12/2018 | Oota | B25J 9/1697 |
| 2019/0232488 A1* | 8/2019 | Levine | G06N 3/008 |
| 2019/0232489 A1* | 8/2019 | Pascanu | G06N 3/0445 |
| 2019/0308325 A1* | 10/2019 | Higo | B25J 15/0616 |
| 2019/0346836 A1* | 11/2019 | Ando | G06N 3/006 |
| 2019/0380278 A1* | 12/2019 | Burden | B25J 19/0054 |
| 2020/0331144 A1* | 10/2020 | Huang | B25J 9/1679 |

FOREIGN PATENT DOCUMENTS

| | | | | |
|---|---|---|---|---|
| DE | 202017105598 | | 7/2018 | |
| DE | 102018204740 | | 10/2018 | |
| WO | WO-2018053187 A1 * | 3/2018 | | G06N 3/0454 |

OTHER PUBLICATIONS

Andrychowicz et al., "Hindsight Experience Replay," 31st Conference on Neural Information Processing Systems (NIPS 2017), dated Feb. 23, 2018, 15 pages.

German Patent Office, "Office Action and Search Report," issued in connection with German Patent Application No. 10 2020 106 714.3, dated Sep. 9, 2020, 7 pages (English translation not available).

* cited by examiner

METHODS AND APPARATUS FOR COMPLEX ASSEMBLY VIA AUTONOMOUS ROBOTS USING REINFORCEMENT LEARNING ACTION PRIMITIVES

FIELD OF THE DISCLOSURE

This disclosure relates generally to autonomous robots and, more specifically, to methods and apparatus for complex assembly via autonomous robots using reinforcement learning action primitives.

BACKGROUND

Robots are routinely utilized to construct assemblies of objects in a wide range of industrial applications. Such applications include automotive component fabrication and assembly, consumer electronics fabrication and assembly, etc. Robotic object handling and/or object assembly technologies are promising in emerging artificial intelligence (AI) based applications such as smart retail and warehouse logistics, smart manufacturing assembly lines, etc. For example, in a smart retail store, autonomous robots may be implemented to replenish, refill and/or restock products on shelves, and/or to automatically arrange products in specific shapes or patterns for display.

Figure 1:
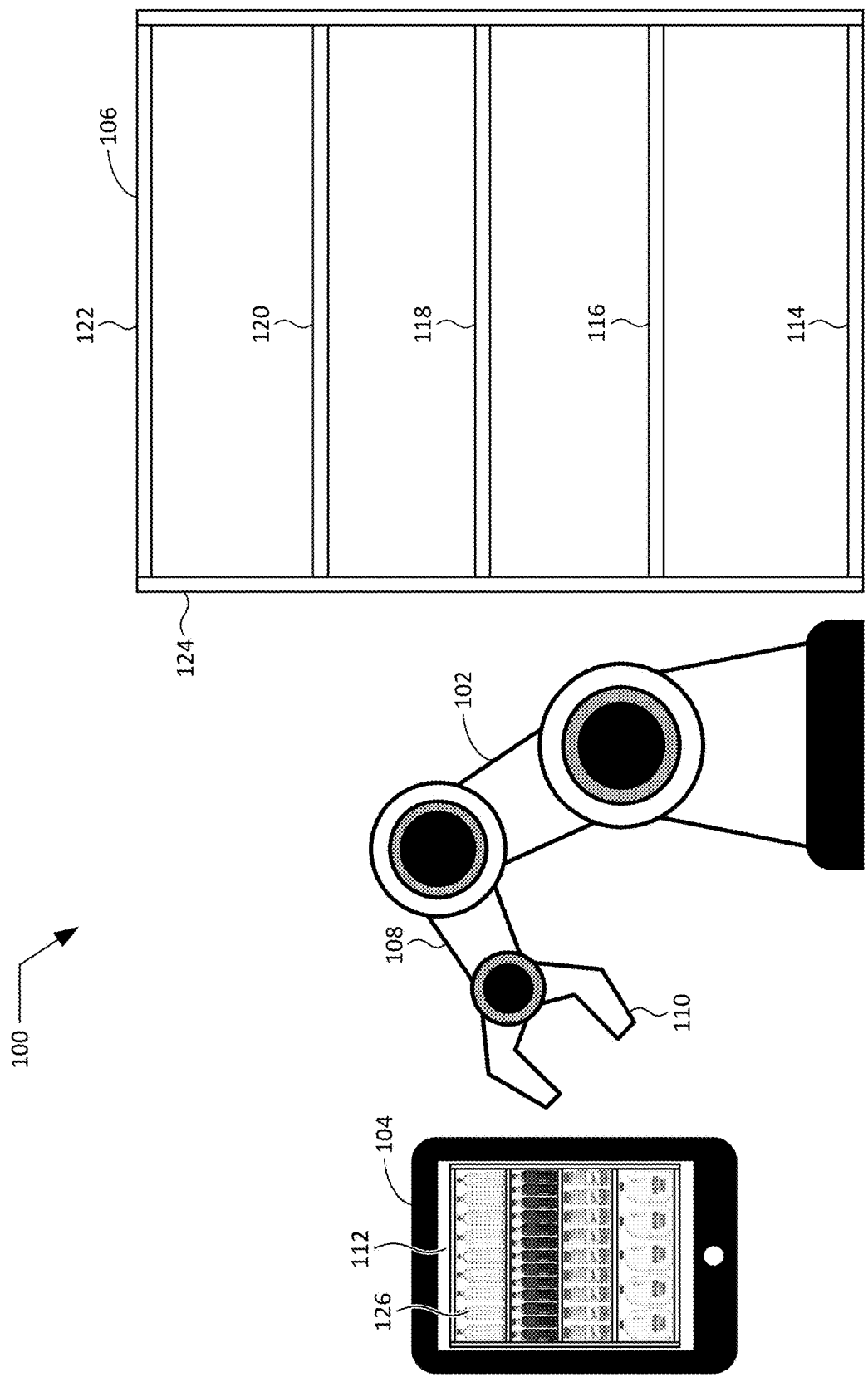
FIG. 1 illustrates an example environment in which an example robot may be implemented in accordance with teachings of this disclosure to construct a complex assembly using reinforcement learning action primitives.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Robotic object handling and/or object assembly technologies are promising in emerging AI-based applications such as smart retail and warehouse logistics, smart manufacturing assembly lines, etc. A major challenge with deploying autonomous robots for AI-based object handling and/or object assembly applications is the conventional need for extensive manual programming and expensive customization of the kinematics and manipulation logic needed to control the robot (e.g., control object handling and/or placement by the robot, control movements and/or actions of the robot, etc.). For example, in conventional programming-based (e.g., non-learning) solutions in which an assembly task is to be performed by a robot, the assembly task itself must first be manually decomposed (e.g., deconstructed) into a sequence of instructions, and the robot must then subsequently be programmed and/or customized based on such instructions to perform the assembly task. This programming and/or customization challenge is amplified when a robot is required to perform highly intricate actions in complex assembly sequences involving a large number of objects having highly-varying physical properties (e.g., sizes, shapes, etc.).

Another challenge with deploying autonomous robots for AI-based object handling and/or object assembly applications is the inability to easily adapt and/or scale the robot to changing and/or varying applications within an environment. For example, a warehouse shelf replenishment environment may involve extremely large and frequently changing numbers, types and/or configurations of products and/or assemblies. Manually programming a robot to handle (e.g., interact with and/or respond to) such frequently changing numbers, types and/or configurations of products and/or assemblies within the environment would consume a tremendous amount of resources (e.g., time, money, manpower, etc.), and would likely be prohibitively expensive.

Furthermore, while the use of AI-based solutions is an attractive alternative to the conventional, brute force, programming-based methods described above, existing AI techniques such as end-to-end reinforcement learning (RL) often fail when a robot attempts to learn (e.g., by exploration or imitation) complex tasks. Failures of the robot in this regard typically arise from a high dimensionality (e.g., size and/or complexity) of the state-action space, and an extremely sparse reward structure. Rectifying the implementation and/or deployment challenges identified above is critical to achieving complete end-to-end automation of an AI-based object assembly process.

Unlike the known solutions described above, examples disclosed herein advantageously enable complex assembly via autonomous robots using RL action primitives corresponding to relatively simple (e.g., non-complex) robotic actions and/or robotic movements. Disclosed examples enable a robot to individually learn respective ones of the RL action primitives. Examples disclosed herein can intelligently combine various ones of the learned RL action primitives into one or more action primitive policies to be followed and/or implemented by the robot. Subsequent to a robot learning the RL action primitives, examples disclosed herein can decompose (e.g., deconstruct) complex assembly tasks to be performed by the robot into a sequence of the RL action primitives. Disclosed examples can associate the sequence of RL action primitives with one or more of the action primitive policies, and can cause the robot to follow and/or implement the associated action primitive policies to construct a complex assembly corresponding to the complex assembly task.

Some examples disclosed herein automatically decompose (e.g., deconstruct) an image (e.g., captured by or otherwise input to the robot) of an assembly of objects into a plurality of constituent objects having object location goals (e.g., target object locations) and associated assembly goals (e.g., target object assembly parameters such as on a shelf, under a shelf, on another object, under another object, in front of another object, behind another object, etc.). Based on the object location goals and the associated assembly goals, examples disclosed herein determine an object placement sequence to be implemented, invoked and/or executed by and/or at the robot to sequentially place the constituent objects within a space. For each object in the object placement sequence, examples disclosed herein determine an action primitive sequence that may be implemented, invoked and/or executed by and/or at the robot to construct a physical assembly of objects corresponding to the imaged assembly of objects. Each action primitive sequence includes one or more RL action primitives that have previously been learned by the robot and stored as one or more corresponding action primitive policies in an action primitive policy library. Examples disclosed herein access the action primitive policies corresponding to the action primitive sequence, and implement, invoke and/or execute such action primitive policies at the robot to construct the physical assembly of objects.

Examples disclosed herein for complex assembly via autonomous robots using RL action primitives provide numerous advantages relative to the known solutions described above. For example, by providing an RL-based approach, disclosed examples advantageously reduce (e.g., eliminate) the tedious and labor-intensive process of manually programming robots to perform complex assembly tasks. As another example, by providing an RL-based approach that utilizes relatively simple (e.g., non-complex) RL action primitives, examples disclosed herein advantageously reduce (e.g., eliminate) the learning failures that commonly occur in connection with known end-to-end RL-based solutions that do not segment the otherwise complex learning process that is inherently associated with a complex assembly task. As another example, by providing an RL-based approach that utilizes relatively simple and non-complex RL action primitives that are combinable into a myriad of configurations and/or sequences, examples disclosed herein advantageously provide a solution that is easily adaptable and/or scalable to environments and/or applications that present frequently changing and/or varying numbers, types and/or configurations of objects and/or object assemblies. As another example, by providing an RL-based approach that incorporates automated decomposition (e.g., deconstruction) of an imaged assembly of objects as a basis for constructing a physical assembly of objects corresponding to the imaged assembly, examples disclosed herein advantageously provide complete end-to-end automation for robotic construction of complex assemblies of objects.

FIG. 1 illustrates an example environment 100 in which an example robot 102 may be implemented in accordance with teachings of this disclosure to construct a complex assembly using RL action primitives. In the illustrated example of FIG. 1, the environment 100 includes the robot 102, an example computing device 104, and example shelving 106. In other examples, the computing device 104 and/or the shelving 106 may be absent from the environment 100. The environment 100 of FIG. 1 can be implemented by and/or as any type of environment including, for example, a product (e.g., automobiles, consumer electronics, etc.) manufacturing and/or assembly facility, a warehouse for storing products and/or materials, a retail department store, a retail grocery store, etc. In the illustrated example of FIG. 1, the environment 100 is a retail grocery store.

The example robot 102 of FIG. 1 can be implemented by and/or as any type of autonomous robot that is configurable to learn and/or to perform one or more assembly task(s). In the illustrated example of FIG. 1, the robot 102 includes an example robotic arm 108 (e.g., a six degree-of-freedom (6DOF) robotic arm) having an example end effector 110 that is configured to move (e.g., via gripping, engaging, pushing, pulling, rotating, etc.) objects (e.g., parts, components, sub-assemblies, finished assemblies, etc.) in connection with constructing an assembly of objects. Movements of the robotic arm 108 and/or the robot 102 of FIG. 1 are performed in a controlled manner based on actuation and/or activation of one or more motor(s) operatively coupled to the robotic arm 108 of the robot 102.

The example computing device 104 of FIG. 1 can be implemented by and/or as any type of computing device including, for example, a laptop computer, a desktop computer, a tablet, a smartphone, etc. In the illustrated example of FIG. 1, the computing device 104 includes an example display 112. The example display 112 of FIG. 1 can be implemented by and/or as any type of display including, for example, a cathode ray tube (CRT) monitor, a liquid crystal display (LCD) monitor, a light-emitting diode (LED) monitor, a touchscreen, etc. In the illustrated example of FIG. 1, the computing device 104 is a tablet, and the display 112 is an LCD touchscreen.

The example shelving 106 of FIG. 1 can be implemented by and/or as any number (1, 2, 4, 10, 20, etc.), type, size and/or shape of shelves arranged and/or configured in any manner within the environment 100. In the illustrated example of FIG. 1, the shelving 106 includes an example first shelf 114, an example second shelf 116 located above the first shelf 114, an example third shelf 118 located above the second shelf 116, an example fourth shelf 120 located above the third shelf 118, and an example fifth shelf 122 located above the fourth shelf 120. As shown in FIG. 1, the first shelf 114, the second shelf 116, the third shelf 118, the fourth shelf 120 and the fifth shelf 122 and/or, more generally, the shelving 106 is/are arranged and/or configured as an example assembled shelving unit 124. In some examples, the shelving unit 124 and/or, more generally, the shelving 106 may itself constitute a complex assembly of objects that has been assembled by the robot 102 of FIG. 1 using RL action primitives, as further described below.

The robot 102 of FIG. 1 is configured to obtain an image (e.g., image data) of an assembly of objects. In some examples, the robot 102 of FIG. 1 includes a camera configured to capture images. In some examples, the camera may capture an image of an assembly of objects located within the field of view of the camera. In other examples, the camera may capture an image of an assembly picture presented via a display of a computing device located within the field of view of the camera. For example, as shown in FIG. 1, a camera of the robot 102 may capture an image of an example assembly picture 126 presented via the display 112 of the computing device 104 located within the environment 100. In the illustrated example of FIG. 1, the assembly picture 126 depicts an assembly of objects (e.g., milk jugs, juice bottles, soda bottles, and water bottles) positioned on shelves located in a grocery store.

The robot 102 of FIG. 1 decomposes and/or deconstructs the obtained image into a plurality of constituent objects having object location goals (e.g., target object locations) and associated assembly goals (e.g., target object assembly parameters such as on a shelf, under a shelf, on another object, under another object, in front of another object, behind another object, etc.). For example, the robot 102 of FIG. 1 may decompose and/or deconstruct (e.g., using one or more decomposition algorithm(s)) the assembly picture 126 of FIG. 1 into a plurality of milk jugs, juice bottles, soda bottles and water bottles, with each jug and/or bottle having an object location goal and an associated assembly goal.

Based on the object location goals and the associated assembly goals, the robot 102 of FIG. 1 determines an object placement sequence to be implemented, invoked and/or executed by and/or at the robot 102 to sequentially place the constituent objects within a space. For each object in the object placement sequence, the robot 102 of FIG. 1 determines an action primitive sequence that may be implemented, invoked and/or executed by and/or at the robot 102 to construct a physical assembly of objects corresponding to the imaged assembly of objects. Each action primitive sequence includes one or more RL action primitives that have previously been learned by the robot 102 and stored as one or more corresponding action primitive policies in an action primitive policy library. The robot 102 of FIG. 1 accesses the action primitive policies corresponding to the action primitive sequence, and implements, invokes and/or executes such action primitive policies to construct the physical assembly of objects.

Figure 2:
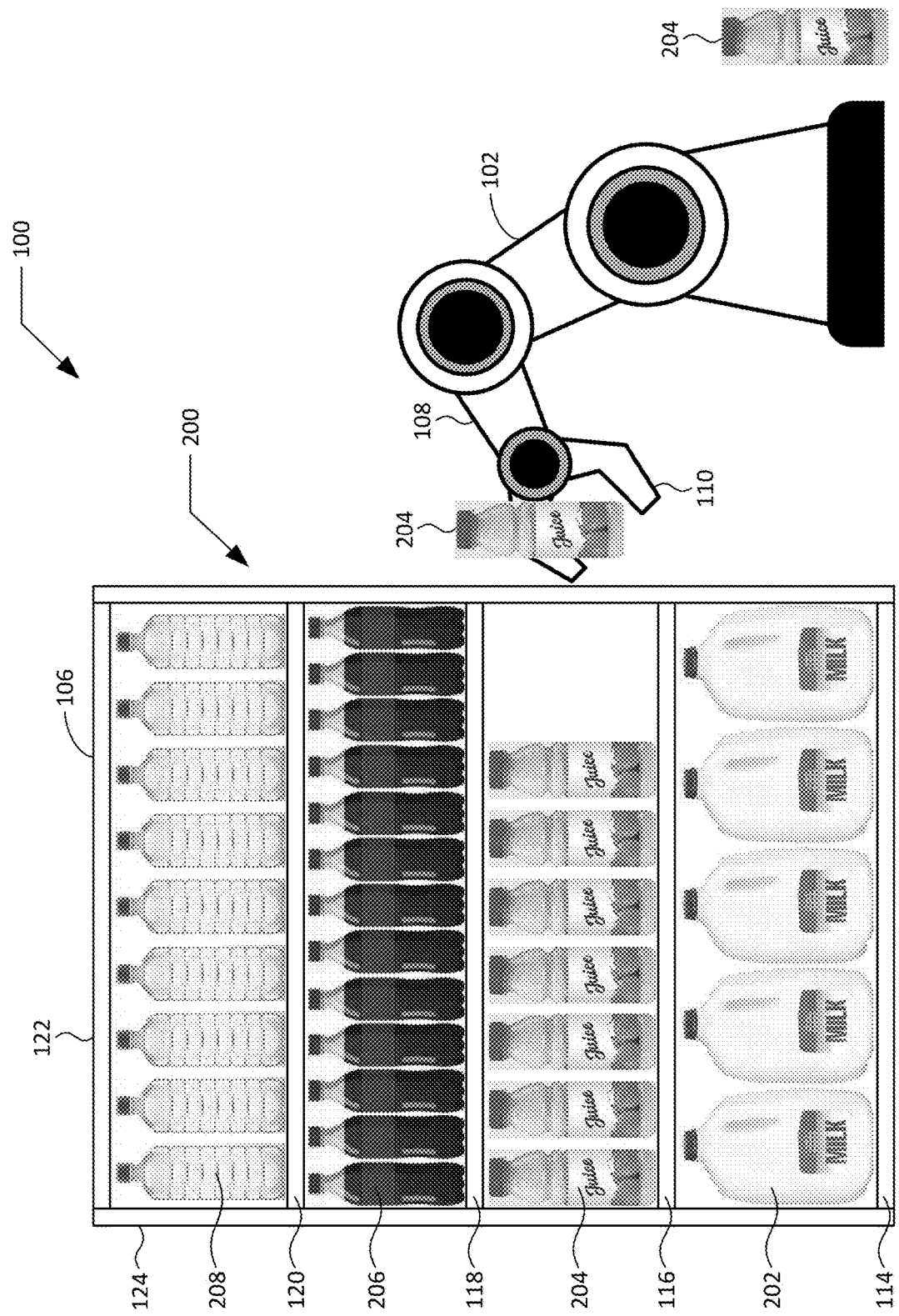
FIG. 2 illustrates an example complex assembly constructed by the example robot of FIG. 1.

FIG. 2 illustrates an example complex assembly 200 constructed by the example robot 102 of FIG. 1. In the illustrated example of FIG. 2, the complex assembly 200 corresponds to the example assembly picture 126 presented on the display 112 of the computing device 104 of FIG. 1. As shown in FIG. 2, the complex assembly 200 includes example milk jugs 202 located on the first shelf 114 of the shelving unit 124 and/or shelving 106, example juice bottles 204 located on the second shelf 116 of the shelving unit 124 and/or shelving 106, example soda bottles 206 located on the third shelf 118 of the shelving unit 124 and/or shelving 106, and example water bottles 208 located on the fourth shelf 120 of the shelving unit 124 and/or shelving 106. The robot 102 of FIGS. 1 and 2 constructs the complex assembly 200 of FIG. 2 by moving respective ones of physical objects (e.g., respective ones onto the milk jugs 202, the juice bottles 204, the soda bottles 206, and the water bottles 208) into and/or onto the shelving unit 124 and/or shelving 106 based on a object placement sequence and a plurality of action primitive sequences, as described above. In the illustrated example of FIG. 2, the robot 102 is in the process of moving certain ones of the juice bottles 204 onto the second shelf 116 of the shelving unit 124 and/or the shelving 106 in accordance with the object placement sequence and one or more action primitive sequence(s) implemented, invoked and/or executed by the robot 102.

Figure 3:
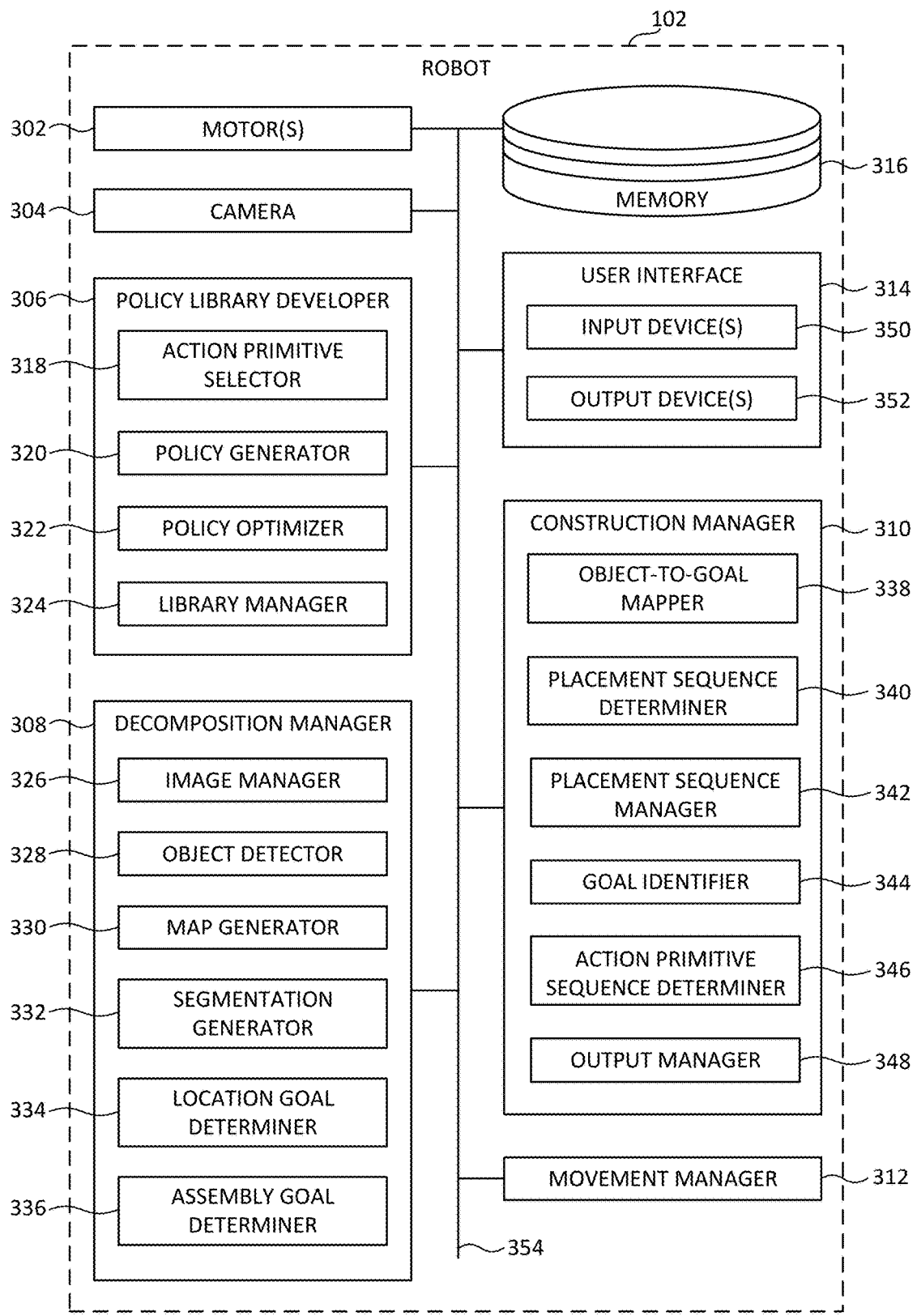
FIG. 3 is a block diagram of the example robot of FIGS. 1 and 2 constructed in accordance with teachings of this disclosure.

FIG. 3 is a block diagram of the example robot 102 of FIGS. 1 and 2 constructed in accordance with teachings of this disclosure. In the illustrated example of FIG. 3, the robot 102 includes one or more example motor(s) 302, an example camera 304, an example policy library developer 306, an example decomposition manager 308, an example construction manager 310, an example movement manager 312, an example user interface 314, and an example memory 316. The example policy library developer 306 of FIG. 3 includes an example action primitive selector 318, an example policy generator 320, an example policy optimizer 322, and an example library manager 324. The example decomposition manager 308 of FIG. 8 includes an example image manager 326, an example object detector 328, an example map generator 330, an example segmentation generator 332, an example location goal determiner 334, and an example assembly goal determiner 336. The example construction manager 310 of FIG. 3 includes an example object-to-goal mapper 338, an example placement sequence determiner 340, an example placement sequence manager 342, an example goal identifier 344, an example action primitive sequence determiner 346, and an example output manager 348. The example user interface 314 of FIG. 3 includes one or more example input device(s) 350 and one or more example output device(s) 352. However, other example implementations of the robot 102 of FIG. 3 may include fewer or additional structures.

In the illustrated example of FIG. 3, the motor(s) 302, the camera 304, the policy library developer 306 (including the action primitive selector 318, the policy generator 320, the policy optimizer 322, and the library manager 324), the decomposition manager 308 (including the image manager 326, the object detector 328, the map generator 330, the segmentation generator 332, the location goal determiner 334, and the assembly goal determiner 336), the construction manager 310 (including the object-to-goal mapper 338, the placement sequence determiner 340, the placement sequence manager 342, the goal identifier 344, the action primitive sequence determiner 346, and the output manager 348), the movement manager 312, the user interface 314 (including the input device(s) 350 and the output device(s) 352), and/or the memory 316 are operatively coupled (e.g., in electrical communication) via an example communication bus 354.

The example motor(s) 302 of FIG. 3 facilitate(s) one or more movement(s) and/or physical operation(s) of the robot 102 associated with constructing an assembly of objects. In some examples, the motor(s) 302 of the robot 102 can be mounted on and/or integrated within a robotic arm (e.g., the robotic arm 108 of FIG. 1) of the robot 102. In such examples, the motor(s) 302 can be configured to move (e.g., position, reposition, orient, reorient, etc.) the robotic arm based on one or more signal(s), command(s) and/or instruction(s) generated by the example construction manager 310 of the robot 102, as further described below. The motor(s) 302 of FIG. 3 can be implemented via any quantity and/or type of motor(s) and/or motive component(s) including, for example, via one or more servomotor(s) configured to move a robotic arm of the robot 102 in accordance with various degrees of freedom associated with the robotic arm.

The example camera 304 of FIG. 3 is mounted to the robot 102 of FIGS. 1-3. The camera 304 is configured and/or positioned to capture images of objects located within a field of view of the camera 304. In some examples, the camera 304 may capture an image of an assembly of objects located within the field of view of the camera 304. In other examples, the camera 304 may capture an image of an assembly picture presented via a display of a computing device (e.g., the assembly picture 126 presented via the display 112 of the computing device 104 of FIG. 1) located within the field of view of the camera 304. In some examples, the images captured by the camera 304 are RGB images. Images and/or image data captured by the camera 304 may be associated with one or more local time(s) (e.g., time stamped) at which the image data was captured by the camera 304. Images and/or image data captured by the camera 304 may be of any quantity, type, form and/or format, and may be stored in a computer-readable storage medium such as the example memory 316 of FIG. 3 described below.

The example policy library developer 306 of FIG. 3 builds and/or develops an action primitive policy library including one or more action primitive policies learned (e.g., via an RL-based algorithm) by the robot 102. As mentioned above, the policy library developer 306 of FIG. 3 includes the action primitive selector 318, the policy generator 320, the policy optimizer 322, and the library manager 324 of FIG. 3, each of which is further described below. The policy library developer 306 of FIG. 3 may be implemented by any type(s) and/or any number(s) of semiconductor device(s) (e.g., microprocessor(s), microcontroller(s), etc.). The action primitive policy library built and/or developed by and/or at the policy library developer 306 may be of any type, form and/or format, and may be stored in a computer-readable storage medium such as the example memory 316 of FIG. 3 described below. Action primitives, action primitive data, action primitive policies, and/or action primitive policy data accessed, generated and/or processed by and/or at the policy library developer 306 may be of any quantity, type, form and/or format, and may be stored in a computer-readable storage medium such as the example memory 316 of FIG. 3 described below.

Figure 4:
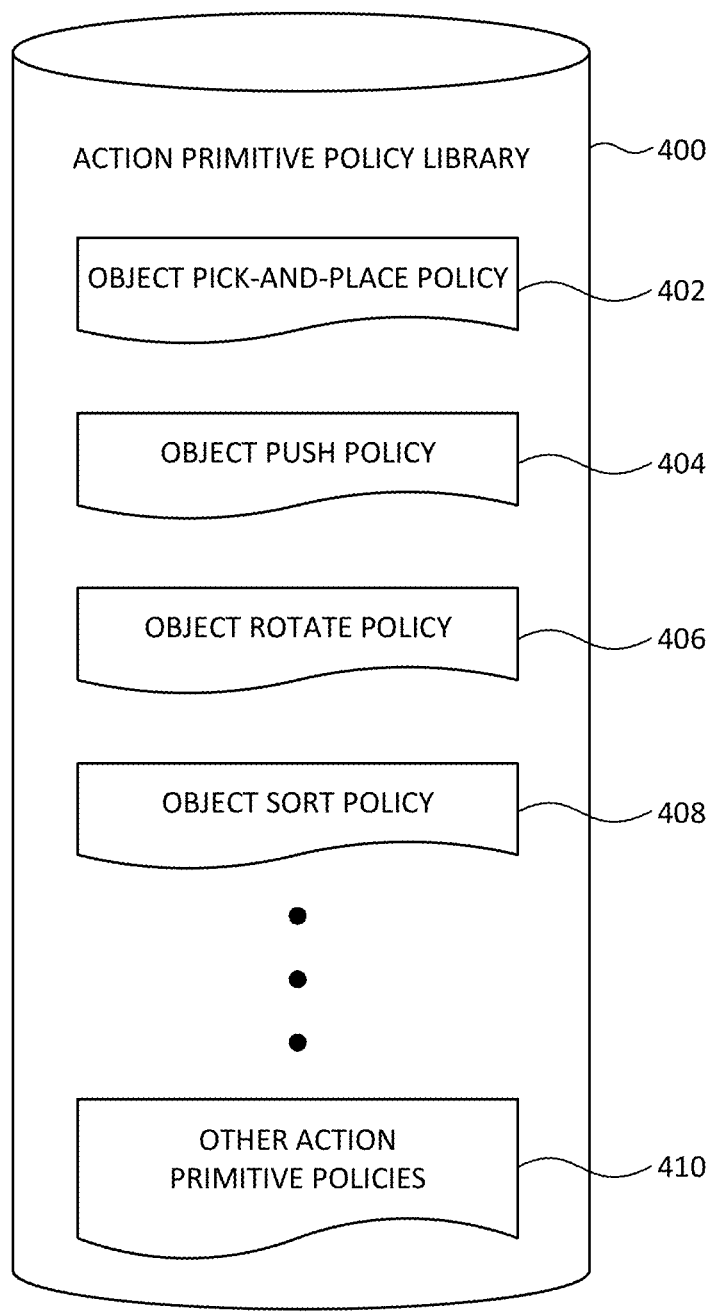
FIG. 4 is a block diagram of an example action primitive policy library developed by the example policy library developer of FIG. 3.

FIG. 4 is a block diagram of an example action primitive policy library 400 developed by the example policy library developer 306 of FIG. 3. In the illustrated example of FIG. 4, the action primitive policy library 400 includes an example object pick-and-place policy 402, an example object push policy 404, an example object rotate policy 406, and an example object sort policy 408. As further shown in FIG. 4, the action primitive policy library 400 may include any number of other example action primitive policies 410. Action primitive policies stored within the action primitive policy library (e.g., the action primitive policy library 400 of FIG. 4) built and/or developed by the policy library developer 306 of FIG. 3 are respectively derived from corresponding RL action primitives (e.g., basic robotic movements) of the robot 102.

Figure 5:
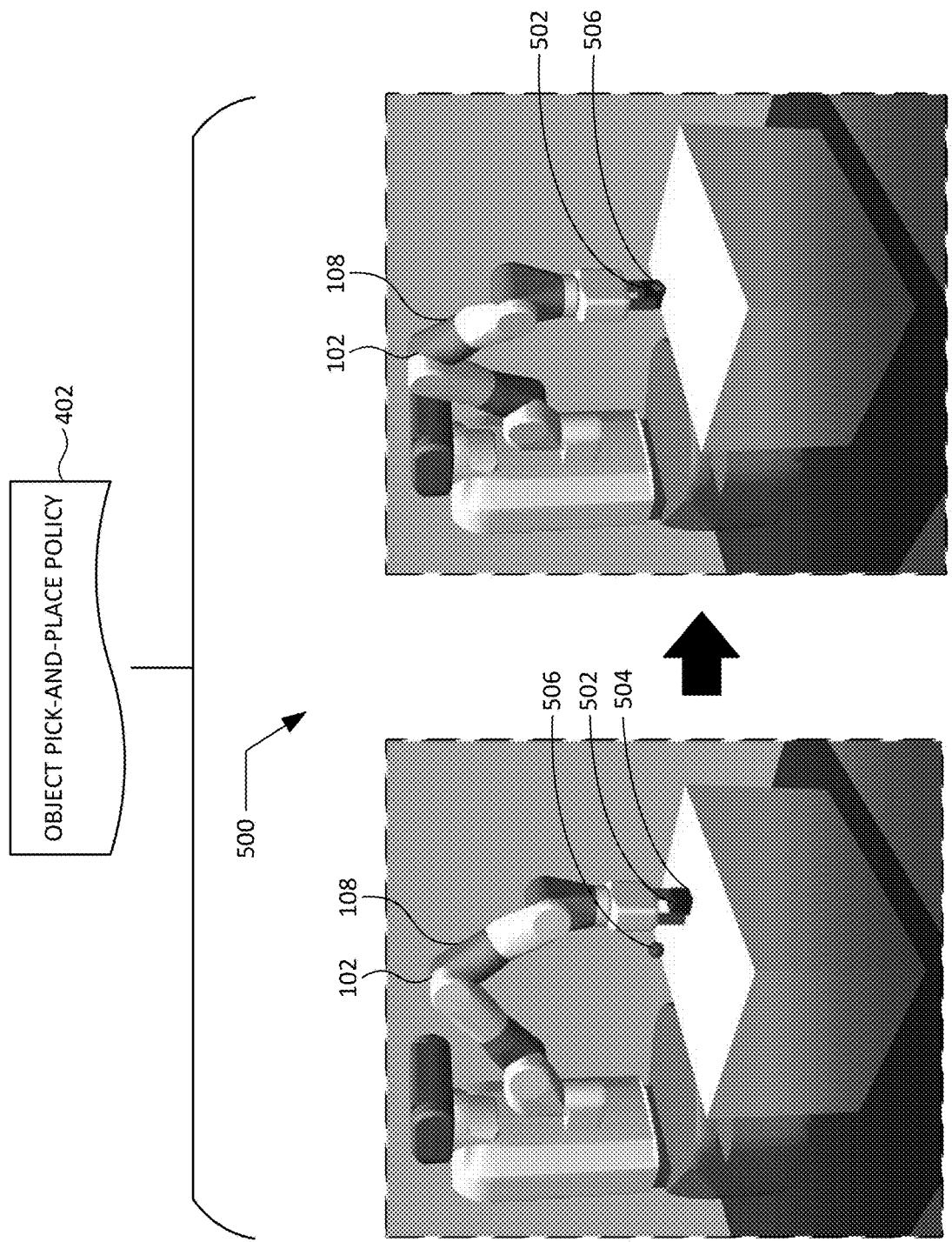
FIG. 5 illustrates the example robot of FIGS. 1-3 performing an example object pick-and-place action primitive.

For example, FIG. 5 illustrates the example robot 102 of FIGS. 1-3 performing an example object pick-and-place action primitive 500. The object pick-and-place action primitive 500 of FIG. 5 involves the robot 102 picking up an example object 502 from an example first location 504, and moving and/or placing the object 502 to and/or in an example second location 506. As shown in FIG. 5, the object pick-and-place policy 402 that is to be stored within the action primitive policy library 400 of FIG. 4 corresponds to and/or is generated based on the object pick-and-place action primitive 500.

Figure 6:
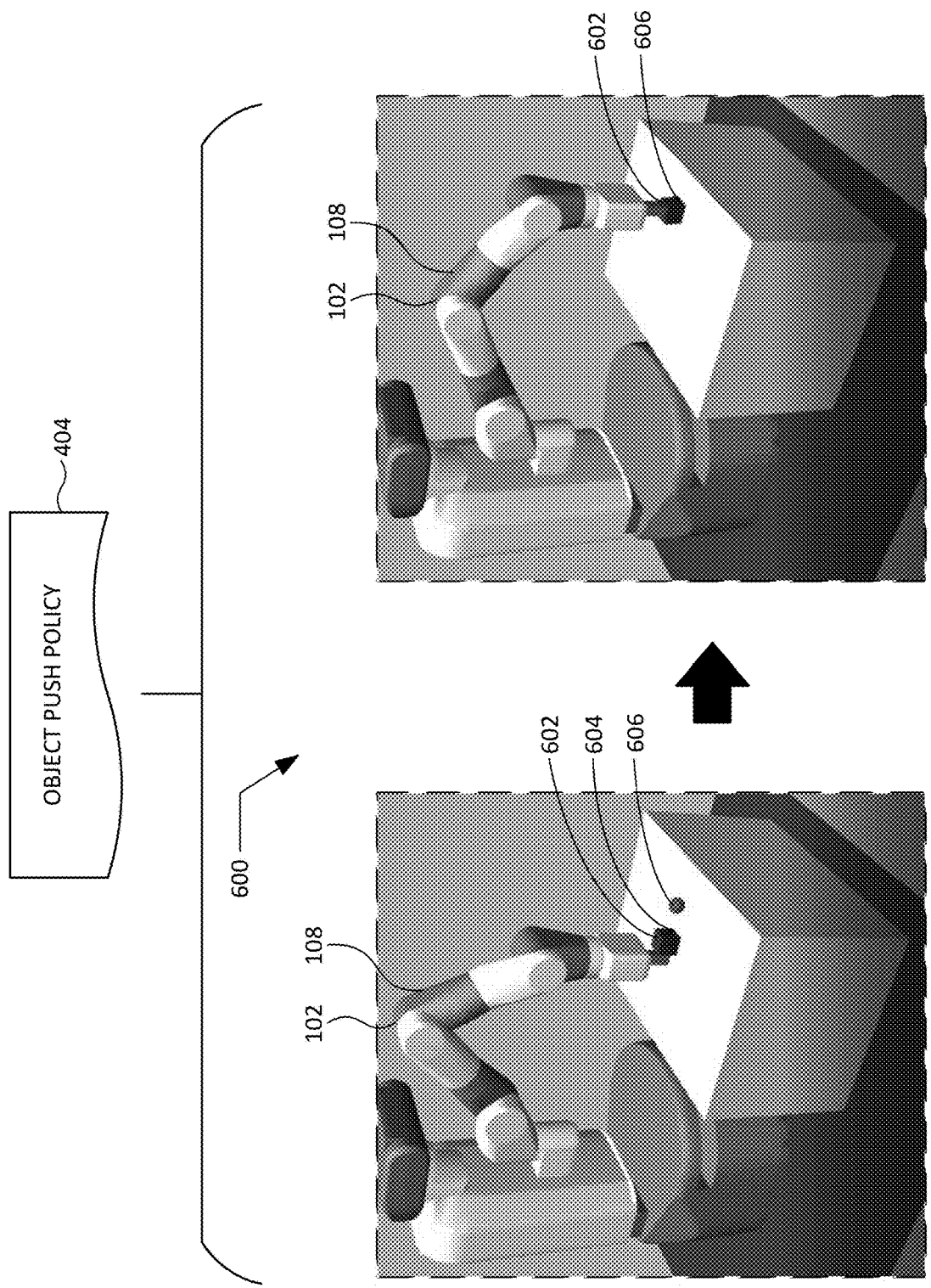
FIG. 6 illustrates the example robot of FIGS. 1-3 and 5 performing an example object push action primitive.

As another example, FIG. 6 illustrates the example robot 102 of FIGS. 1-3 and 5 performing an example object push action primitive 600. The object push action primitive 600 of FIG. 6 involves the robot 102 pushing an example object 602 from an example first location 604 to an example second location 606. As shown in FIG. 6, the object push policy 404 that is to be stored within the action primitive policy library 400 of FIG. 4 corresponds to and/or is generated based on the object push action primitive 600.

Figure 7:
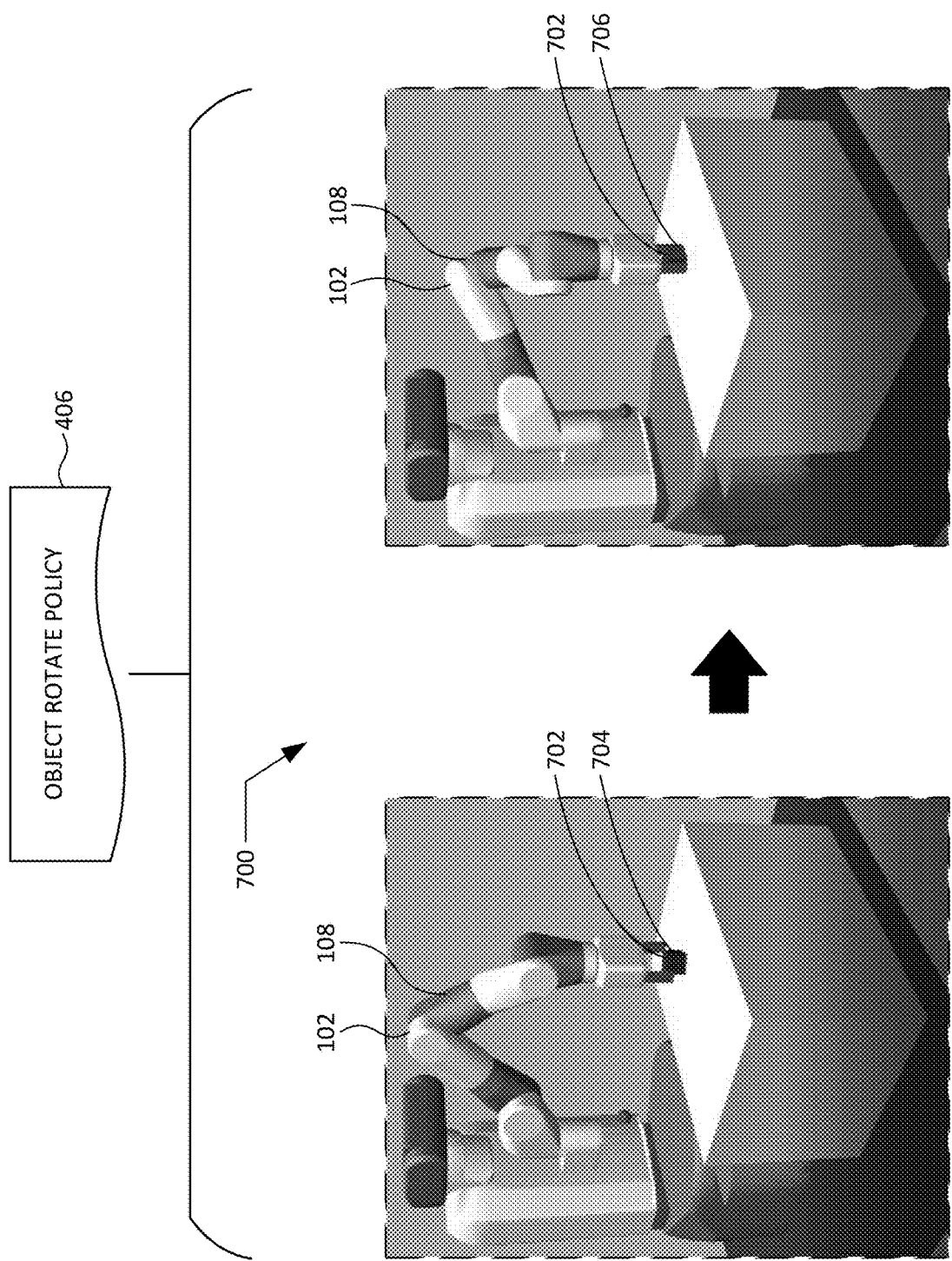
FIG. 7 illustrates the example robot of FIGS. 1-3, 5 and 6 performing an example object rotate action primitive.

As another example, FIG. 7 illustrates the example robot 102 of FIGS. 1-3, 5 and 6 performing an example object rotate action primitive 700. The object rotate action primitive 700 of FIG. 7 involves the robot 102 rotating an example object 702 from an example first orientation 704 into an example second orientation 706. As shown in FIG. 7, the object rotate policy 406 that is to be stored within the action primitive policy library 400 of FIG. 4 corresponds to and/or is generated based on the object rotate action primitive 700.

Figure 8:
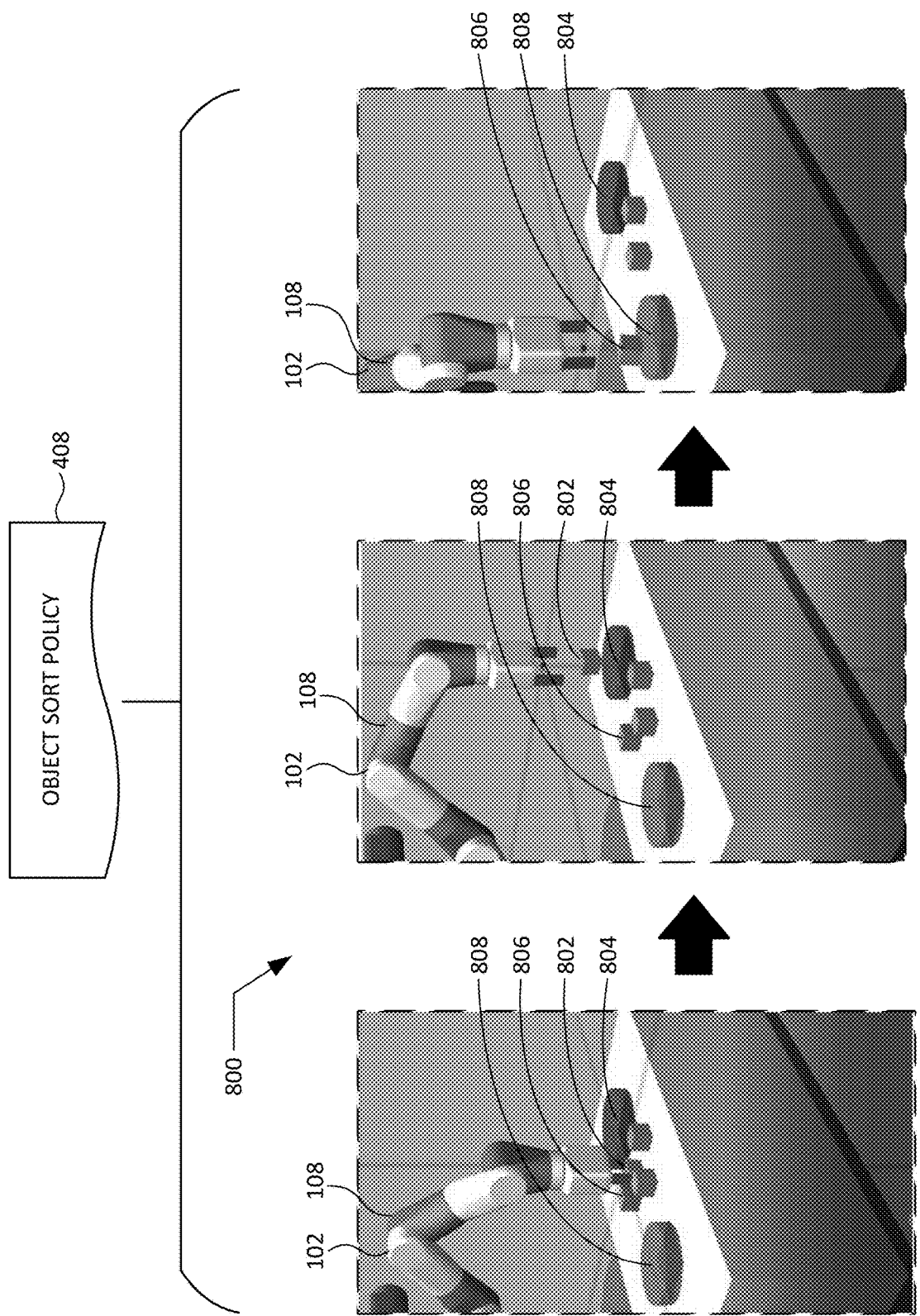
FIG. 8 illustrates the example robot of FIGS. 1-3 and 5-7 performing an example object sort action primitive.

As another example, FIG. 8 illustrates the example robot 102 of FIGS. 1-3 and 5-7 performing an example object sort action primitive 800. The object sort action primitive 800 of FIG. 8 involves the robot 102 moving an example first object 802 to an example first location 804, and moving an example second object 806 that differs (e.g., based on one or more physical properties) from the first object 802 to an example second location 808 that differs from the first location 804. As shown in FIG. 8, the object sort policy 408 that is to be stored within the action primitive policy library 400 of FIG. 4 corresponds to and/or is generated based on the object sort action primitive 800.

Returning to the example of FIG. 3, the example action primitive selector 318 of the policy library developer 306 of FIG. 3 selects an RL action primitive (e.g., a basic robotic movement) of the robot 102. For example, the action primitive selector 318 may select an object pick-and-place action primitive (e.g., the object pick-and-place action primitive 500 shown in FIG. 5), an object push action primitive (e.g., the object push action primitive 600 shown in FIG. 6), an object rotate action primitive (e.g., the object rotate action primitive 700 shown in FIG. 7), or an object sort action primitive (e.g., the object sort action primitive 800 shown in FIG. 8). In some examples, the action primitive selector 318 selects an RL action primitive of the robot 102 for which a corresponding action primitive policy has not yet been generated. The action primitive selector 318 of FIG. 3 may be implemented by any type(s) and/or any number(s) of semiconductor device(s) (e.g., microprocessor(s), microcontroller(s), etc.). RL action primitives and/or RL action primitive data accessed, selected and/or processed by and/or at the action primitive selector 318 may be of any quantity, type, form and/or format, and may be stored in a computer-readable storage medium such as the example memory 316 of FIG. 3 described below.

The example policy generator 320 of the policy library developer 306 of FIG. 3 generates an action primitive policy corresponding to and/or based on the RL action primitive selected by the action primitive selector 318 of FIG. 3. For example, the policy generator 320 may generate the example object pick-and-place policy 402 of FIGS. 4 and 5 based on the example object pick-and-place action primitive 500 of FIG. 5. As another example, the policy generator 320 may generate the example object push policy 404 of FIGS. 4 and 6 based on the example object push action primitive 600 of FIG. 6. As another example, the policy generator 320 may generate the example object rotate policy 406 of FIGS. 4 and 7 based on the example object rotate action primitive 700 of FIG. 7. As another example, the policy generator 320 may generate the example object sort policy 408 of FIGS. 4 and 8 based on the example object sort action primitive 800 of FIG. 8.

In some examples, the policy generator 320 of FIG. 3 implements, invokes, applies and/or utilizes an RL algorithm including a deep deterministic policy gradient (DDPG) algorithm in combination with a hindsight experience replay (HER) algorithm (e.g., combined as a DDPG+HER algorithm) to train the action primitive policy. In such examples, the robot 102 learns the action primitive policy based on the DDPG+HER algorithm. The policy generator 320 of FIG. 3 may be implemented by any type(s) and/or any number(s) of semiconductor device(s) (e.g., microprocessor(s), microcontroller(s), etc.). Action primitive policies, action primitive policy data, and/or RL algorithms accessed, invoked, applied, generated, trained and/or processed by and/or at the policy generator 320 may be of any quantity, type, form and/or format, and may be stored in a computer-readable storage medium such as the example memory 316 of FIG. 3 described below.

The example policy optimizer 322 of the policy library developer 306 of FIG. 3 optimizes the action primitive policy generated and/or trained by the policy generator 320 of FIG. 3. For example, the policy optimizer 322 may reduce the number of robotic actions and/or robotic movements included in the generated and/or trained action primitive policy to a lower number (e.g., a minimum number) of robotic actions and/or robotic movements needed to perform the underlying RL action primitive. The policy optimizer 322 of FIG. 3 may be implemented by any type(s) and/or any number(s) of semiconductor device(s) (e.g., microprocessor(s), microcontroller(s), etc.). Optimized action primitive policies and/or action primitive policy optimization data accessed, generated and/or processed by and/or at the policy optimizer 322 may be of any quantity, type, form and/or format, and may be stored in a computer-readable storage medium such as the example memory 316 of FIG. 3 described below.

The example library manager 324 of the policy library developer 306 of FIG. 3 manages and/or controls the action primitive policy library built and/or developed by the policy library developer 306 of FIG. 3. For example, the library manager 324 may cause the action primitive policy generated and/or trained by the policy generator 320 and optimized by the policy optimizer 322 of FIG. 3 to be added to and/or stored within the action primitive policy library 400 of FIG. 4. In some examples, the library manager 324 may cause two or more action primitive policies stored within the action primitive policy library to be combined (e.g., combined in an ordered sequence) into a new action primitive policy to be stored with the action primitive policy library. The library manager 324 of FIG. 3 may be implemented by any type(s) and/or any number(s) of semiconductor device(s) (e.g., microprocessor(s), microcontroller(s), etc.). Library management data accessed, generated and/or processed by and/or at the library manager 324 may be of any quantity, type, form and/or format, and may be stored in a computer-readable storage medium such as the example memory 316 of FIG. 3 described below.

In some examples, the library manager 324 of FIG. 3 causes the above-described operations of the action primitive selector 318, the policy generator 320, the policy optimizer 322 and/or the library manager 324 to be iteratively performed and/or executed until the action primitive policy library includes action primitive policies corresponding to all RL action primitives within a predetermined group of RL action primitives of the robot 102. In some examples, the predetermined group may include all of the RL action primitives of the robot 102. In other examples, the predetermined group may include a subset of all of the RL action primitives of the robot 102.

The example decomposition manager 308 of FIG. 3 decomposes and/or deconstructs (e.g., via a decomposition algorithm) an image of an assembly of objects into object location goals and associated assembly goals corresponding to the assembly of objects depicted in and/or represented by the image. As mentioned above, the decomposition manager 308 of FIG. 3 includes the image manager 326, the object detector 328, the map generator 330, the segmentation generator 332, the location goal determiner 334, and the assembly goal determiner 336 of FIG. 3, each of which is further described below. The decomposition manager 308 of FIG. 3 may be implemented by any type(s) and/or any number(s) of semiconductor device(s) (e.g., microprocessor(s), microcontroller(s), etc.). Decomposition data and/or decomposition algorithms accessed, invoked, applied, generated and/or processed by and/or at the decomposition manager 308 may be of any quantity, type, form and/or format, and may be stored in a computer-readable storage medium such as the example memory 316 of FIG. 3 described below.

The example image manager 326 of the decomposition manager 308 of FIG. 3 manages and/or controls the operation of the camera 304 of FIG. 3 and/or, more generally, manages and/or controls the process of accessing and/or obtaining images and/or image data. For example, the image manager 326 may signal, command and/or instruct the camera 304 to capture an image at a specified time, at a specified location, and/or in response to the occurrence of a specified event. In some examples, the image manager 326 of FIG. 3 signals, commands and/or instructs the camera 304 of FIG. 3 to capture an image in response to one or more user input(s) received via the example user interface 314 of FIG. 3 described below. In other examples, the image manager 326 may cause and/or enable the robot 102 to access, obtain and/or receive image data via the user interface 314 of FIG. 3 and/or via a network interface of the robot 102 without the use of the camera 304 of FIG. 3. The image manager 326 of FIG. 3 may be implemented by any type(s) and/or any number(s) of semiconductor device(s) (e.g., microprocessor(s), microcontroller(s), etc.). Images and/or image data accessed, obtained, received and/or processed by and/or at the image manager 326 may be of any quantity, type, form and/or format, and may be stored in a computer-readable storage medium such as the example memory 316 of FIG. 3 described below.

The example object detector 328 of the decomposition manager 308 of FIG. 3 detects and/or identifies one or more object(s) depicted in the image of the assembly of objects accessed and/or obtained by the image manager 326 of FIG. 3. For example, the object detector 328 may detect and/or identify one or more object(s) depicted in the image of the assembly of objects by applying an object detection algorithm (e.g., a You Only Look Once (YOLO) object detection algorithm) to the image of the assembly of objects. The object detector 328 of FIG. 3 may be implemented by any type(s) and/or any number(s) of semiconductor device(s) (e.g., microprocessor(s), microcontroller(s), etc.). Object data and/or object detection algorithms accessed, implemented, invoked, applied, detected, identified and/or processed by and/or at the object detector 328 may be of any quantity, type, form and/or format, and may be stored in a computer-readable storage medium such as the example memory 316 of FIG. 3 described below.

Figure 9:
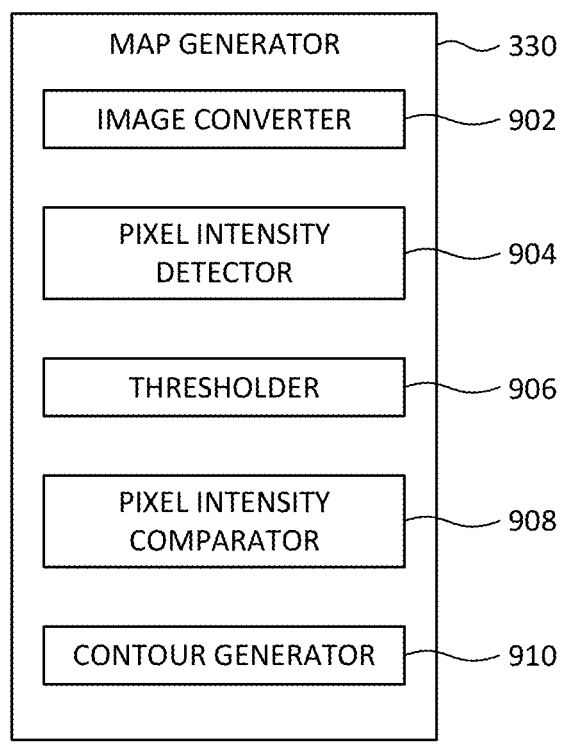
FIG. 9 is a block diagram of the example map generator of FIG. 3.

The example map generator 330 of the decomposition manager 308 of FIG. 3 generates a contour map for objects detected by the object detector 328 of FIG. 3 in the image of the assembly of objects accessed and/or obtained by the image manager 326 of FIG. 3. FIG. 9 is a block diagram of the example map generator 330 of FIG. 3. In the illustrated example of FIG. 9, the map generator 330 includes an example image converter 902, an example pixel intensity detector 904, an example thresholder 906, an example pixel intensity comparator 908, and an example contour generator 910, each of which is further described below. However, other example implementations of the map generator 330 of FIGS. 3 and 9 may include fewer or additional structures. The map generator 330 of FIG. 3 may be implemented by any type(s) and/or any number(s) of semiconductor device(s) (e.g., microprocessor(s), microcontroller(s), etc.). Contour maps and/or contour map data accessed, generated and/or processed by and/or at the map generator 330 may be of any quantity, type, form and/or format, and may be stored in a computer-readable storage medium such as the example memory 316 of FIG. 3 described below.

The example image converter 902 of the map generator 330 of FIGS. 3 and 9 converts the image accessed and/or obtained by the image manager 326 of FIG. 3 into a grayscale image. For example, the image converter 902 may convert an RGB image (e.g., RGB image data) accessed and/or obtained by the image manager 326 into a grayscale image (e.g., grayscale image data). The image converter 902 of FIG. 9 may be implemented by any type(s) and/or any number(s) of semiconductor device(s) (e.g., microprocessor(s), microcontroller(s), etc.). Converted images (e.g., grayscale images) and/or converted image data (e.g., grayscale image data) accessed, generated and/or processed by and/or at the image converter 902 may be of any quantity, type, form and/or format, and may be stored in a computer-readable storage medium such as the example memory 316 of FIG. 3 described below.

The example pixel intensity detector 904 of the map generator 330 of FIGS. 3 and 9 detects and/or determines pixel intensity values for pixels of the grayscale image generated and/or processed by the image converter 902 of FIG. 9. For example, the pixel intensity detector 904 may detect and/or determine pixel intensity values for pixels of the grayscale image by applying a binarization algorithm (e.g., Otsu's algorithm) to the grayscale image. The pixel intensity detector 904 of FIG. 9 may be implemented by any type(s) and/or any number(s) of semiconductor device(s) (e.g., microprocessor(s), microcontroller(s), etc.). Pixel intensities, pixel intensity data, and/or binarization algorithms accessed, implemented, invoked, applied, determined, detected, generated and/or processed by and/or at the pixel intensity detector 904 may be of any quantity, type, form and/or format, and may be stored in a computer-readable storage medium such as the example memory 316 of FIG. 3 described below.

The example thresholder 906 of the map generator 330 of FIGS. 3 and 9 adaptively thresholds the pixel intensity values determined by the pixel intensity detector 904 of FIG. 9. For example, the thresholder 906 may adaptively threshold the pixel intensity values by applying an adaptive thresholding algorithm to the pixel intensity values. The thresholder 906 of FIG. 9 may be implemented by any type(s) and/or any number(s) of semiconductor device(s) (e.g., microprocessor(s), microcontroller(s), etc.). Adaptively thresholded pixel intensity values, adaptively thresholded pixel intensity value data, and/or adaptive thresholding algorithms accessed, implemented, invoked, applied, generated and/or processed by and/or at the thresholder 906 may be of any quantity, type, form and/or format, and may be stored in a computer-readable storage medium such as the example memory 316 of FIG. 3 described below.

The example pixel intensity comparator 908 of the map generator 330 of FIGS. 3 and 9 detects and/or determines areas of matching (e.g., statistically similar) adaptively thresholded pixel intensity values that have been adaptively thresholded by the thresholder 906 of FIG. 9. For example, the pixel intensity comparator 908 may detect and/or determine areas of matching adaptively thresholded pixel intensity values by comparing the adaptively thresholded pixel intensity values of neighboring pixels for statistical similarity and/or likeness. The pixel intensity comparator 908 of FIG. 9 may be implemented by any type(s) and/or any number(s) of semiconductor device(s) (e.g., microprocessor(s), microcontroller(s), etc.). Areas and/or area data of matching adaptively thresholded pixel intensity values accessed, determined, detected, generated and/or processed by and/or at the pixel intensity comparator 908 may be of any quantity, type, form and/or format, and may be stored in a computer-readable storage medium such as the example memory 316 of FIG. 3 described below.

The example contour generator 910 of the map generator 330 of FIGS. 3 and 9 generates contours based on the areas of matching adaptively thresholded pixel intensity values detected and/or determined by the pixel intensity comparator 908 of FIG. 9. For example, the contour generator 910 may generate one or more contour(s), based on the areas of matching adaptively thresholded pixel intensity values, that can be represented by and/or as one or more straight and/or curved line segment(s). The contour generator 910 of FIG. 9 may be implemented by any type(s) and/or any number(s) of semiconductor device(s) (e.g., microprocessor(s), microcontroller(s), etc.). Contours and/or contour data accessed, generated and/or processed by and/or at the contour generator 910 may be of any quantity, type, form and/or format, and may be stored in a computer-readable storage medium such as the example memory 316 of FIG. 3 described below.

Figure 10:
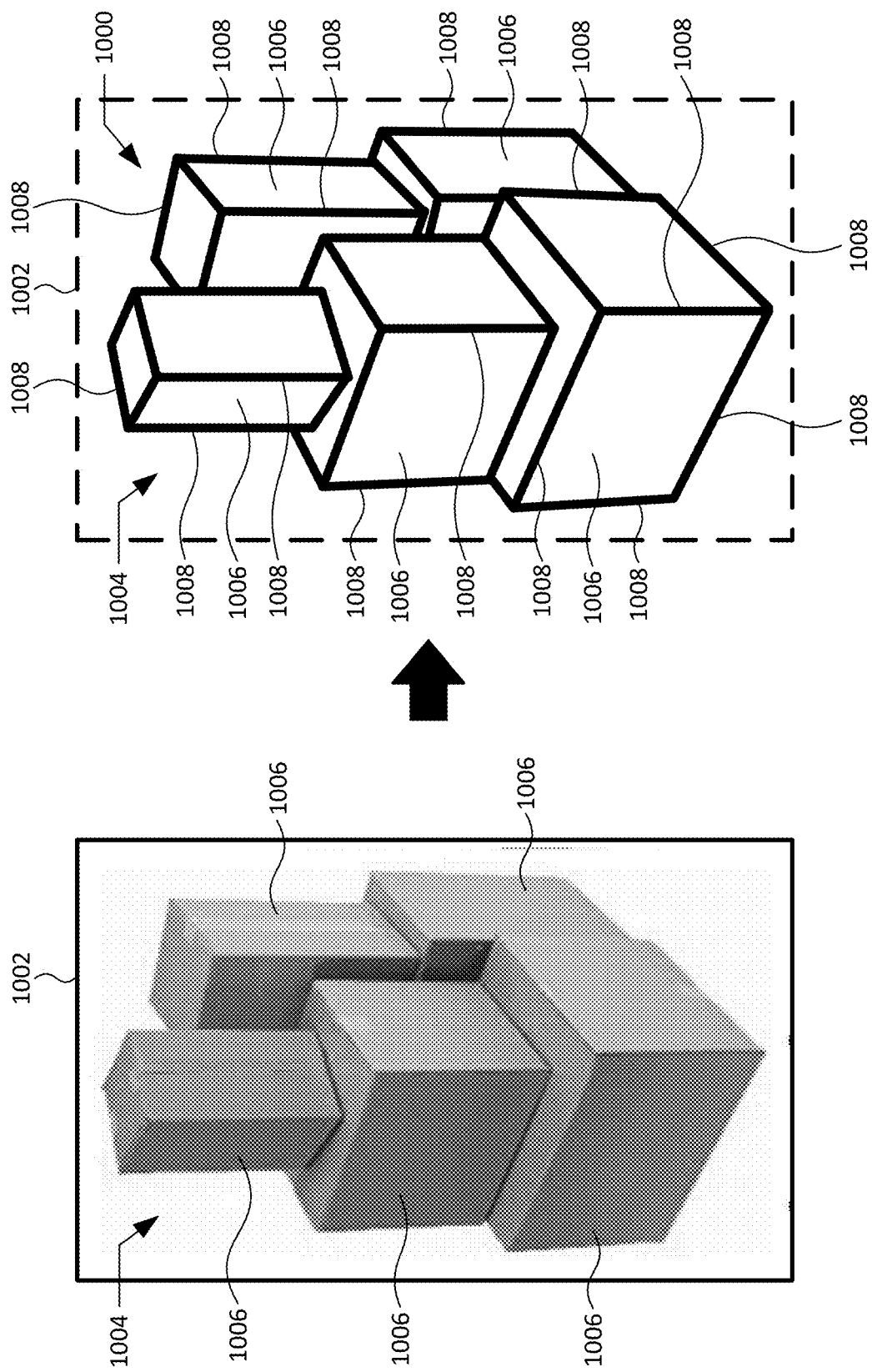
FIG. 10 illustrates an example contour map generated by the example map generator of FIGS. 3 and 9 based on an example image of an example assembly of example objects.

In the illustrated example of FIG. 9, the example map generator 330 generates a contour map based on the contours generated by the contour generator 910 of FIG. 9. For example, the map generator 330 may generate a contour map that includes and or incorporates the contours generated by the contour generator 910. In some examples, the contour map generated by the map generator 330 represents and/or indicates one or more boundaries and/or physical properties (e.g., a size, a shape, an edge, a relative position, a relative orientation, etc.) of one or more object(s) detected by the object detector 328 of FIG. 3 and/or included within the image of the assembly of objects accessed and/or obtained by the image manager 326 of FIG. 3. For example, FIG. 10 illustrates an example contour map 1000 generated by the example map generator 330 of FIGS. 3 and 9 based on an example image 1002 of an example assembly 1004 of example objects 1006. In the illustrated example of FIG. 10, the contour map 1000 includes example contours 1008. The contours 1008 of the contour map 1000 represent and/or indicate boundaries and/or physical properties (e.g., sizes, shapes, edges, relative positions, relative orientations, etc.) of the objects 1006 included within the image 1002 of the assembly 1004 of objects 1006.

Returning to the example of FIG. 3, the example segmentation generator 332 of the decomposition manager 308 of FIG. 3 generates a semantic segmentation for objects detected by the object detector 328 of FIG. 3 in the image of the assembly of objects accessed and/or obtained by the image manager 326 of FIG. 3. For example, the segmentation generator 332 may generate a semantic segmentation of the image of the assembly of objects by applying a semantic segmentation algorithm (e.g., a Region Convoluted Neural Network (R-CNN) segmentation algorithm) to the image of the assembly of objects. In some examples, the semantic segmentation generated by the segmentation generator 332 represents and/or indicates one or more boundaries and/or physical properties (e.g., a size, a shape, an edge, a relative position, a relative orientation, etc.) of one or more object(s) detected by the object detector 328 of FIG. 3 and/or included within the image of the assembly of objects accessed and/or obtained by the image manager 326 of FIG. 3. The segmentation generator 332 of FIG. 3 may be implemented by any type(s) and/or any number(s) of semiconductor device(s) (e.g., microprocessor(s), microcontroller(s), etc.). Semantic segmentations, semantic segmentation data, and/or semantic segmentation algorithms accessed, implemented, invoked, applied, generated and/or processed by and/or at the segmentation generator 332 may be of any quantity, type, form and/or format, and may be stored in a computer-readable storage medium such as the example memory 316 of FIG. 3 described below.

Figure 11:
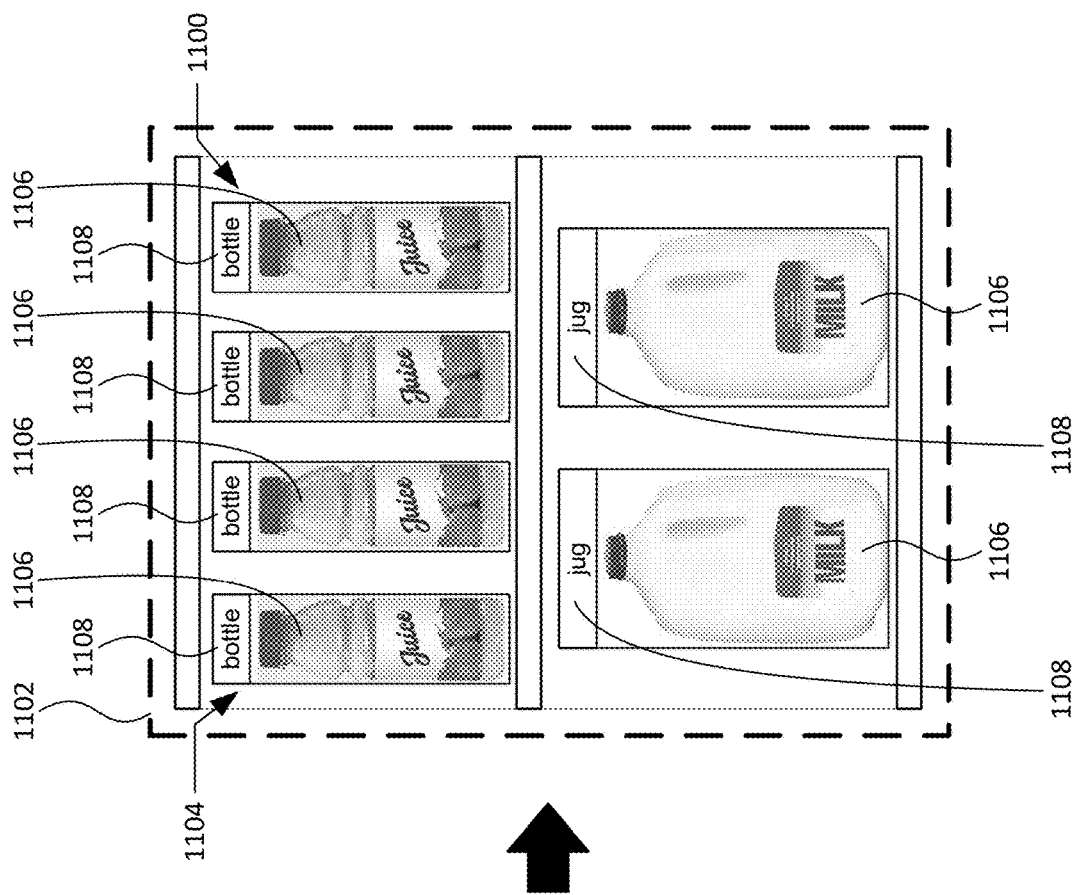
FIG. 11 illustrates an example semantic segmentation generated by the example segmentation generator of FIG. 3 based on an example image of an example assembly of example objects.
Figure 11:
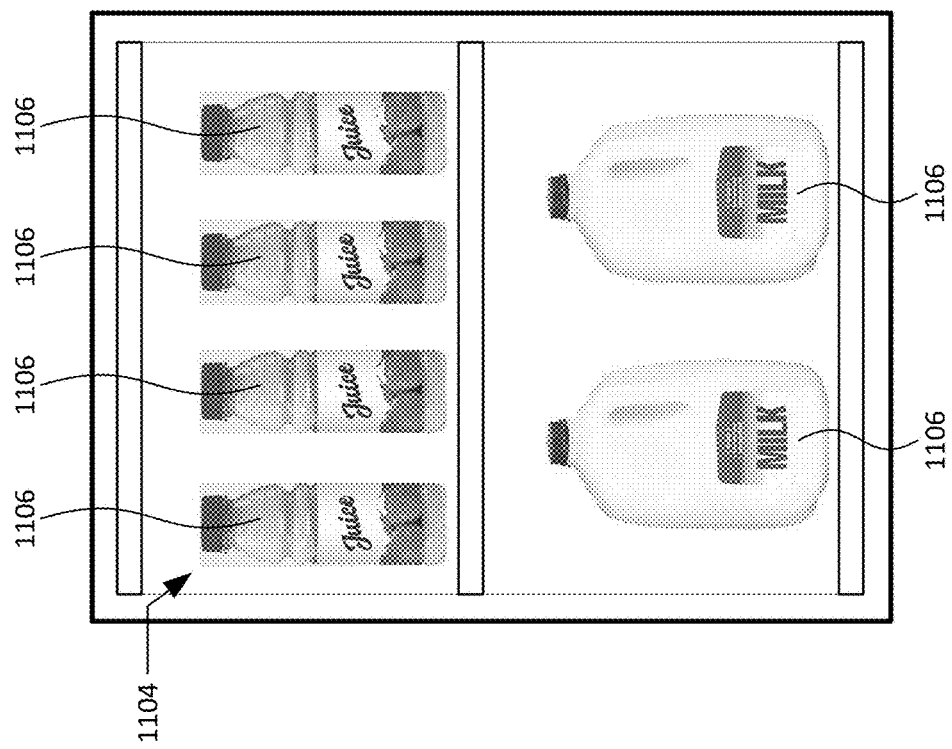

In some examples, the semantic segmentation generated by the segmentation generator 332 of FIG. 3 includes (e.g., in the form of tags, labels, etc.) object identifiers (e.g., object type identifies) for respective ones of the objects included within an image of an assembly of objects. For example, FIG. 11 illustrates an example semantic segmentation 1100 generated by the example segmentation generator 332 of FIG. 3 based on an example image 1102 of an example assembly 1104 of example objects 1106. In the illustrated example of FIG. 11, the semantic segmentation 1100 includes (e.g., in the form of tags, labels, etc.) example object identifiers 1108 (e.g., object type identifies) for respective ones of the objects 1106 included within the image 1102 of the assembly 1104 of objects 1106. As shown in FIG. 11, certain ones of the objects 1106 included within the image 1102 of the assembly 1104 of objects 1106 have been associated with a "bottle" object identifier, and other ones of the objects 1106 included within the image 1102 of the assembly 1104 of objects 1106 have been associated with a "jug" object identifier.

Returning to the example of FIG. 3, the decomposition manger 308 may, in some examples, invoke the map generator 330 of FIG. 3 or the segmentation generator 332 of FIG. 3, but not both. For example, the decomposition manager 308 of FIG. 3 may invoke the map generator 330 of FIG. 3 to generate a contour map when the shapes and/or geometries of the objects detected by the object detector 328 of FIG. 3 are relatively complex. As another example, the decomposition manager 308 of FIG. 3 may invoke the segmentation generator 332 of FIG. 3 instead of the map generator 330 of FIG. 3 when the shapes and/or geometries of the objects detected by the object detector 328 of FIG. 3 are relatively simple.

The example location goal determiner 334 of the decomposition manager 308 of FIG. 3 determines object location goals (e.g., target object locations) for respective ones of the objects included in and/or represented by the contour map generated by the map generator 330 of FIG. 3 and/or the semantic segmentation generated by the segmentation generator 332 of FIG. 3. For example, the location goal determiner 334 may determine object location goals for respective ones of the objects included in and/or represented by the contour map and/or the semantic segmentation by applying a geometry-based packing algorithm (e.g., a contour-based packing algorithm) to the contour map and/or the semantic segmentation. The location goal determiner 334 of FIG. 3 may be implemented by any type(s) and/or any number(s) of semiconductor device(s) (e.g., microprocessor(s), microcontroller(s), etc.). Object location goals, object location goal data, and/or geometry-based packing algorithms accessed, implemented, invoked, applied, determined, generated and/or processed by and/or at the location goal determiner 334 may be of any quantity, type, form and/or format, and may be stored in a computer-readable storage medium such as the example memory 316 of FIG. 3 described below.

The example assembly goal determiner 336 of the decomposition manager 308 of FIG. 3 determines assembly goals (e.g., target object assembly parameters such as on a shelf, under a shelf, on another object, under another object, in front of another object, behind another object, etc.) for respective ones of the objects included in and/or represented by the contour map generated by the map generator 330 of FIG. 3 and/or the semantic segmentation generated by the segmentation generator 332 of FIG. 3. For example, the assembly goal determiner 336 may determine assembly goals for respective ones of the objects included in and/or represented by the contour map and/or the semantic segmentation by applying an object localization algorithm to the contour map and/or the semantic segmentation. In some examples, the assembly goal determiner 336 of FIG. 3 associates respective ones of the determined assembly goals with corresponding respective ones of the object location goals determined by the location goal determiner 334 of FIG. 3. Assembly goals, assembly goal data, and/or object localization algorithms accessed, implemented, invoked, applied, determined, generated and/or processed by and/or at the assembly goal determiner 336 may be of any quantity, type, form and/or format, and may be stored in a computer-readable storage medium such as the example memory 316 of FIG. 3 described below.

Figure 12:
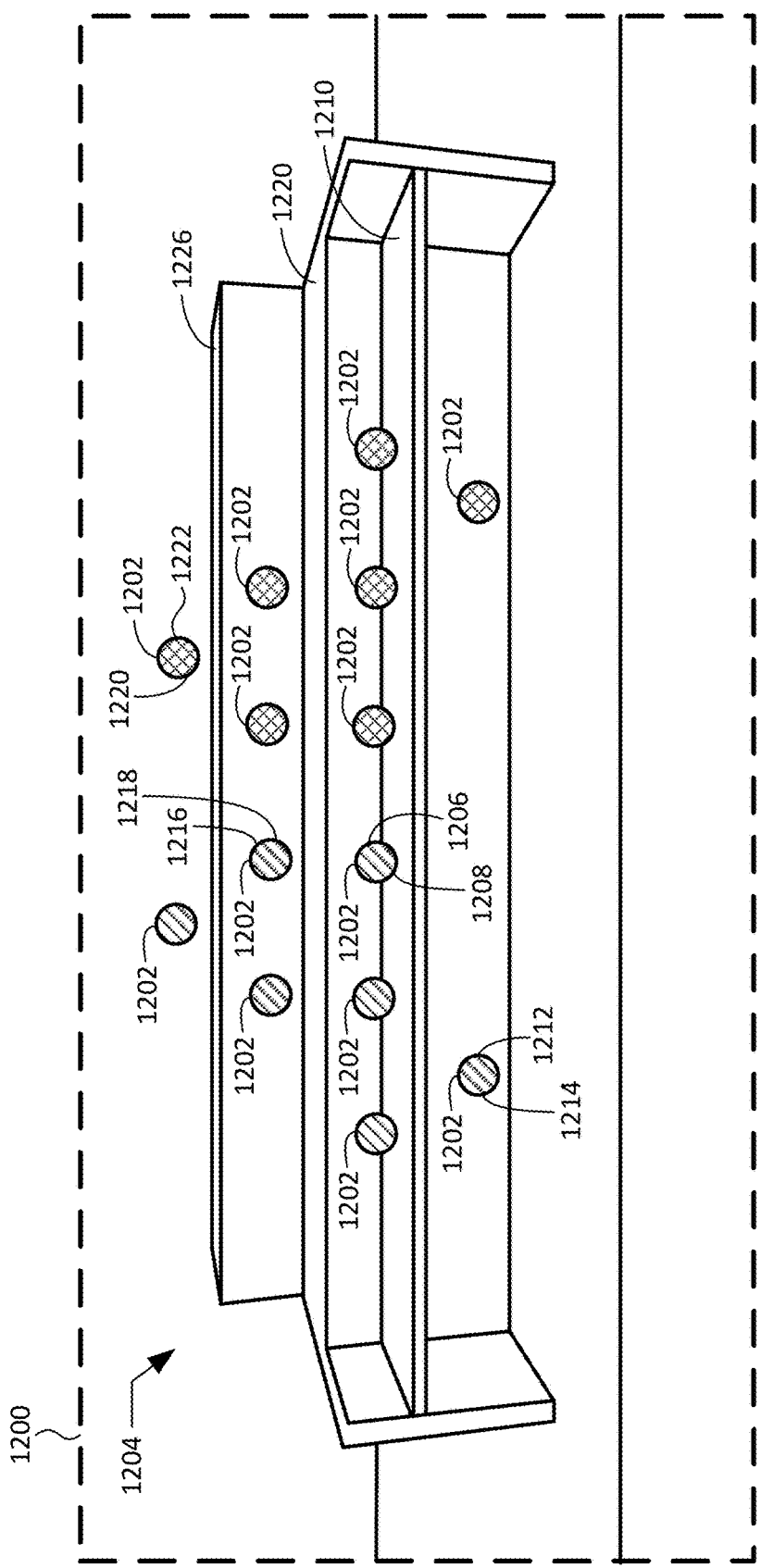
FIG. 12 illustrates an example representation of example objects included within an example target assembly.

FIG. 12 illustrates an example representation 1200 of example objects 1202 included within an example target assembly 1204. In the illustrated example of FIG. 12, respective ones of the objects 1202 shown in the representation 1200 have an object location goal (e.g., an object location goal determined by the location goal determiner 334 of FIG. 3) and an associated assembly goal (e.g., an associated assembly goal determined by the assembly goal determiner 336 of FIG. 3). For example, in the representation 1200 of FIG. 12, an example first one 1206 of the objects 1202 is shown as being located at an example first location 1208 on an example first shelf 1210 of the target assembly 1204, an example second one 1212 of the objects 1202 is shown as being located at an example second location 1214 below the first shelf 1210 of the target assembly 1204, an example third one 1216 of the objects 1202 is shown as being located at an example third location 1218 on an example second shelf 1220 of the target assembly 1204 positioned above and behind the first shelf 1210 of the target assembly 1204, and an example fourth one 1222 of the objects 1202 is shown as being located at an example fourth location 1224 on an example third shelf 1226 of the target assembly 1204 positioned above and behind the second shelf 1220 of the target assembly 1204.

Returning to the example of FIG. 3, the example construction manager 310 of FIG. 3 determines one or more sequence(s) of RL action primitives for constructing an assembly of objects based on the object location goals and the associated assembly goals determined by the decomposition manager 308 of FIG. 3. For example, the construction manager 310 may determine, based on the object location goals determined by the location goal determiner 334 of the decomposition manager 308 and the associated assembly goals determined by the assembly goal determiner 336 of the decomposition manager 308, one or more sequence(s) of RL action primitives for constructing an assembly of objects corresponding to the assembly of objects depicted in and/or represented by the image decomposed (e.g., deconstructed) by the decomposition manager 308 of FIG. 3. As mentioned above, the construction manager 310 of FIG. 3 includes the object-to-goal mapper 338, the placement sequence determiner 340, the placement sequence manager 342, the goal identifier 344, the action primitive sequence determiner 346, and the output manager 348 of FIG. 3, each of which is further described below. The construction manager 310 of FIG. 3 may be implemented by any type(s) and/or any number(s) of semiconductor device(s) (e.g., microprocessor(s), microcontroller(s), etc.). Action primitive sequences and/or action primitive sequence data accessed, determined, generated and/or processed by and/or at the construction manager 310 may be of any quantity, type, form and/or format, and may be stored in a computer-readable storage medium such as the example memory 316 of FIG. 3 described below.

The example object-to-goal mapper 338 of the construction manager 310 of FIG. 3 generates an object-to-goal map based on the object location goals determined by the location goal determiner 334 of FIG. 3 and the associated assembly goals determined by the assembly goal determiner 336 of FIG. 3, and further based on initial locations of the objects (e.g., physical objects) to be used to construct an assembly of objects. For example, the object-to-goal mapper 338 may generate an object-to-goal map that logically assigns, links and/or associates respective ones of physical objects having corresponding initial locations to and/or with respective ones of the object location goals and their corresponding associated assembly goals. The object-to-goal mapper 338 of FIG. 3 may be implemented by any type(s) and/or any number(s) of semiconductor device(s) (e.g., microprocessor(s), microcontroller(s), etc.). Object-to-goal maps and/or object-to-goal map data accessed, generated and/or processed by and/or at the object-to-goal mapper 338 may be of any quantity, type, form and/or format, and may be stored in a computer-readable storage medium such as the example memory 316 of FIG. 3 described below.

Figure 13:
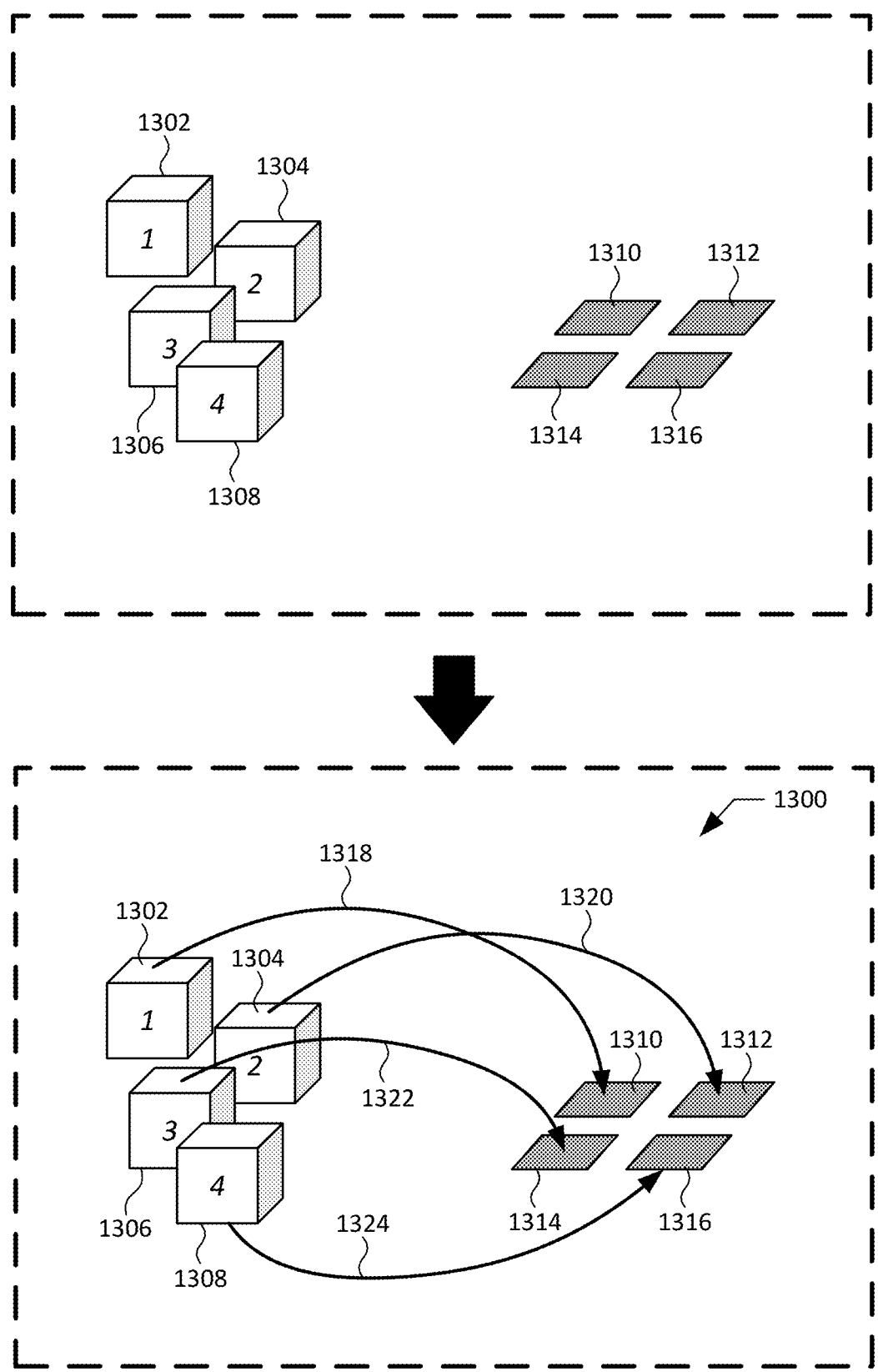
FIG. 13 illustrates an example object-to-goal map generated by the example object-to-goal mapper of FIG. 3.

FIG. 13 illustrates an example object-to-goal map 1300 generated by the example object-to-goal mapper 338 of FIG. 3. In the illustrated example of FIG. 13, the object-to-goal map 1300 is based on logical assignments, links and/or associations generated and/or formed (e.g., by the object-to-goal mapper 338) between example physical objects (e.g., a first example object 1302, a second example object 1304, a third example object 1306, and a fourth example object 1308) having corresponding initial locations, and example object location goals (e.g., a first example object location goal 1310, a second example object location goal 1312, a third example object location goal 1314, and a fourth example object location goal 1316) having corresponding associated assembly goals. As shown in FIG. 13, the object-to-goal map 1300 includes a first example association 1318 generated and/or formed between the first object 1302 and the first object location goal 1310, a second example association 1320 generated and/or formed between the second object 1304 and the second object location goal 1312, a third example association 1322 generated and/or formed between the third object 1306 and the third object location goal 1314, and a fourth example association 1324 generated and/or formed between the fourth object 1308 and the fourth object location goal 1316.

The example placement sequence determiner 340 of the construction manager 310 of FIG. 3 determines an object placement sequence based on the object-to-goal map generated by the object-to-goal mapper 338 of FIG. 3. For example, the placement sequence determiner 340 may generate an object placement sequence that assigns and/or establishes a logical sequence to respective ones of the objects of the object-to-goal pairs mapped via the object-to-goal map. In some examples, the object placement sequence determined by the placement sequence determiner 340 of FIG. 3 is optimized to provide for respective ones of the objects to be placed according to a shortest possible pathway. The placement sequence determiner 340 of FIG. 3 may be implemented by any type(s) and/or any number(s) of semiconductor device(s) (e.g., microprocessor(s), microcontroller(s), etc.). Object placement sequences and/or object placement sequence data accessed, determined, generated and/or processed by and/or at the placement sequence determiner 340 may be of any quantity, type, form and/or format, and may be stored in a computer-readable storage medium such as the example memory 316 of FIG. 3 described below.

Figure 14:
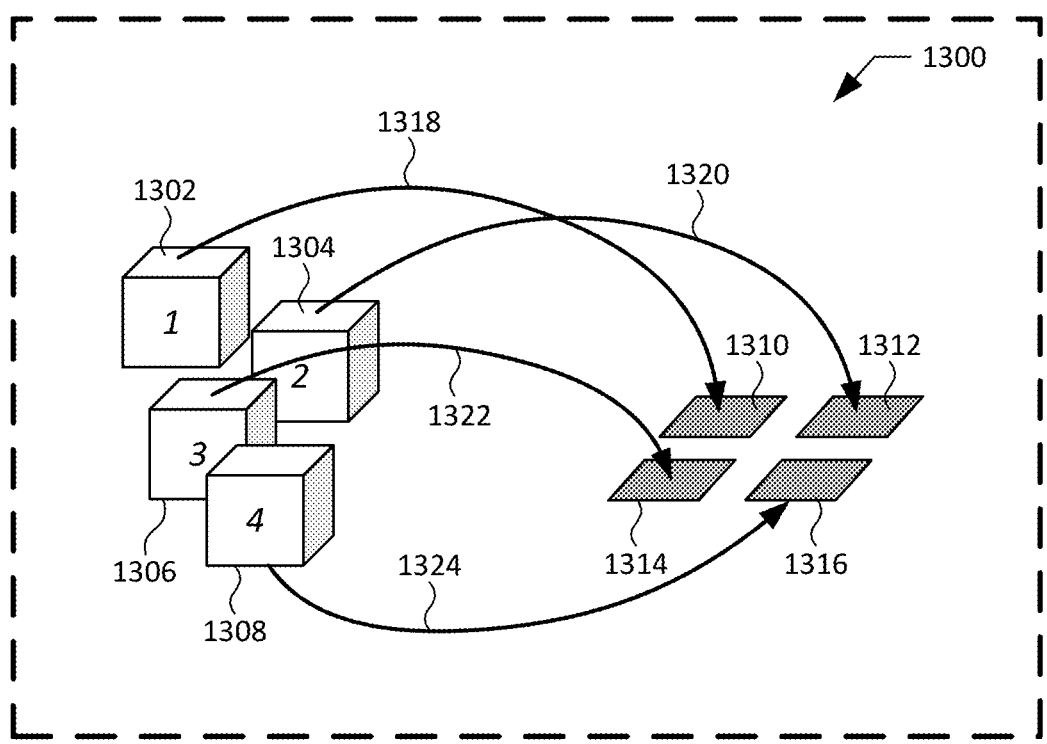
FIG. 14 illustrates an example object placement sequence determined by the example placement sequence determiner of FIG. 3.
Figure 14:
Figure 14:
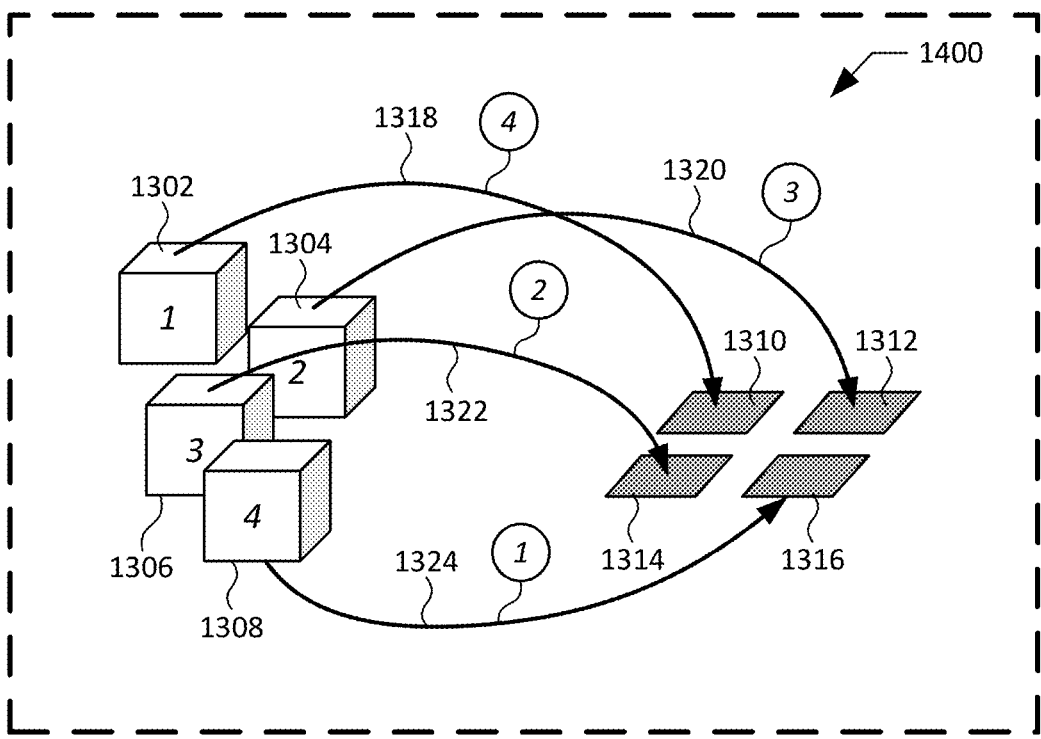

FIG. 14 illustrates an example object placement sequence 1400 determined by the example placement sequence determiner 340 of FIG. 3. In the illustrated example of FIG. 14, the object placement sequence 1400 is based on the example object-to-goal map 1300 of FIG. 13 described above. As shown in FIG. 14, the object placement sequence 1400 includes a first example segment (e.g., first in time and/or sequence) corresponding to the fourth association 1324 of the object-to-goal map 1300, a second example segment (e.g., second in time and/or sequence) corresponding to the third association 1322 of the object-to-goal map 1300, a third example segment (e.g., third in time and/or sequence) corresponding to the second association 1320 of the object-to-goal map 1300, and a fourth example segment (e.g., fourth in time and/or sequence) corresponding to the first association 1318 of the object-to-goal map 1300.

The example placement sequence manager 342 of the construction manager 310 of FIG. 3 manages and/or controls a processing cycle associated with the object placement sequence determined by the placement sequence determiner 340 of FIG. 3. For example, the placement sequence manager 342 may iteratively invoke, in an ordered and/or sequential manner for each object included in the object placement sequence determined by the placement sequence determiner 340 of FIG. 3, one or more operation(s) of the example goal identifier 344, the example action primitive sequence determiner 346, and the example output manager 348 of FIG. 3 described below. In some examples, the placement sequence manager 342 may determine, by comparing the most recent output of the output manager 348 of FIG. 3 to the object placement sequence determined by the placement sequence determiner 340 of FIG. 3, that one or more object(s) included in the object placement sequence has/have yet to be processed. The placement sequence manager 342 of FIG. 3 may be implemented by any type(s) and/or any number(s) of semiconductor device(s) (e.g., microprocessor(s), microcontroller(s), etc.). Placement sequence management data accessed, determined, generated and/or processed by and/or at the placement sequence manager 342 may be of any quantity, type, form and/or format, and may be stored in a computer-readable storage medium such as the example memory 316 of FIG. 3 described below.

The example goal identifier 344 of the construction manager 310 of FIG. 3 identifies the assembly goal for each object included in the object placement sequence determined by the placement sequence determiner 340 of FIG. 3. For example, the goal identifier 344 may identify an assembly goal for a specified object included in the object placement sequence based on a correlation provided by the mapped object-to-goal pairs generated by the object-to-goal mapper 338 of FIG. 3. The goal identifier 344 of FIG. 3 may be implemented by any type(s) and/or any number(s) of semiconductor device(s) (e.g., microprocessor(s), microcontroller(s), etc.). Assembly goals and/or assembly goal data accessed, determined, identified and/or processed by and/or at the goal identifier 344 may be of any quantity, type, form and/or format, and may be stored in a computer-readable storage medium such as the example memory 316 of FIG. 3 described below.

The example action primitive sequence determiner 346 of the construction manager 310 of FIG. 3 determines a sequence of action primitives associated with each assembly goal identified by the goal identifier 344 of FIG. 3. For example, the action primitive sequence determiner 346 may determine a sequence of action primitives for a specified assembly goal based on an association and/or correlation provided by a goal-to-primitive correlation table. The action primitive sequence determiner 346 of FIG. 3 may be implemented by any type(s) and/or any number(s) of semiconductor device(s) (e.g., microprocessor(s), microcontroller(s), etc.). Action primitive sequences and/or action primitive sequence data accessed, determined, generated and/or processed by and/or at the action primitive sequence determiner 346 may be of any quantity, type, form and/or format, and may be stored in a computer-readable storage medium such as the example memory 316 of FIG. 3 described below.

Figure 15:
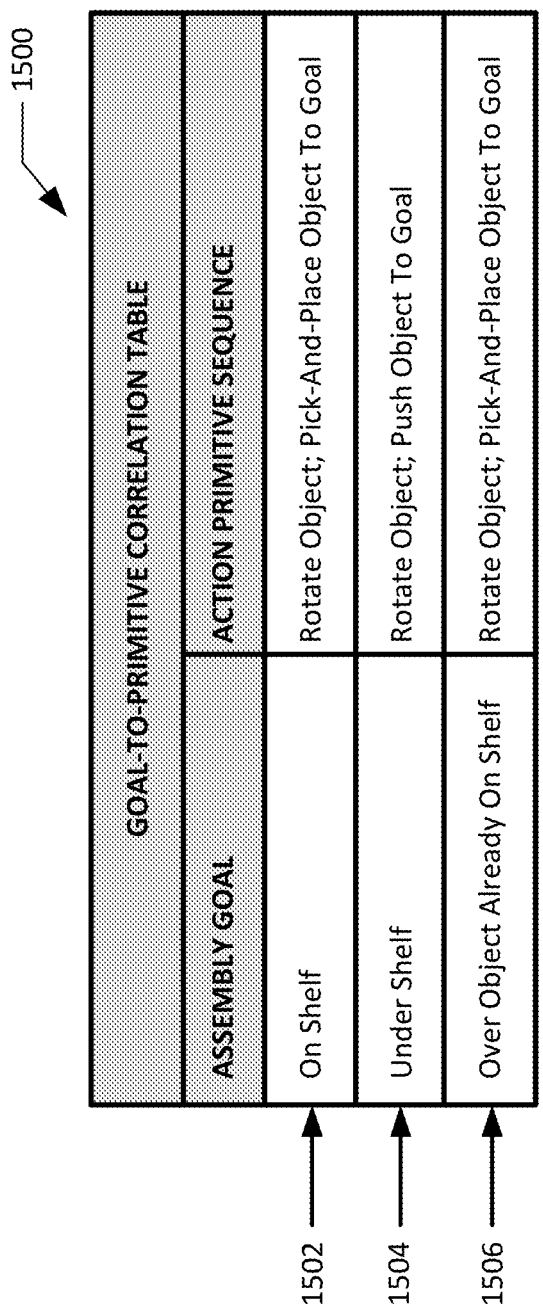
FIG. 15 illustrates an example goal-to-primitive correlation table accessed by the example action primitive sequence determiner of FIG. 3.

FIG. 15 illustrates an example goal-to-primitive correlation table 1500 accessed by the example action primitive sequence determiner 346 of FIG. 3. In the illustrated example of FIG. 15, the goal-to-primitive correlation table 1500 provides associations and/or correlations between assembly goals and sequences of action primitives. For example, a first example row 1502 of the goal-to-primitive correlation table 1500 associates and/or correlates a first assembly goal (e.g., an "on shelf" assembly goal) with a sequence of action primitives that includes an object rotation action primitive followed in time and/or sequence by an object pick-and-place action primitive. A second example row 1504 of the goal-to-primitive correlation table 1500 associates and/or correlates a second assembly goal (e.g., an "under shelf" assembly goal) with a sequence of action primitives that includes an object rotation action primitive followed in time and/or sequence by an object push action primitive. A third example row 1506 of the goal-to-primitive correlation table 1500 associates and/or correlates a third assembly goal (e.g., an "over object already on shelf" assembly goal) with a sequence of action primitives that includes an object rotation action primitive followed in time and/or sequence by an object pick-and-place action primitive.

The example output manager 348 of the construction manager 310 of FIG. 3 outputs respective ones of the sequences of action primitives determined by the action primitive sequence determiner 346 of FIG. 3. For example, the output manager 348 may output a sequence of action primitives determined by the action primitive sequence determiner 346 to the example movement manager 312 of FIG. 3 described below. The output manager 348 of FIG. 3 may be implemented by any type(s) and/or any number(s) of semiconductor device(s) (e.g., microprocessor(s), microcontroller(s), etc.). Action primitive sequences and/or action primitive sequence data accessed, output and/or processed by and/or at the output manager 348 may be of any quantity, type, form and/or format, and may be stored in a computer-readable storage medium such as the example memory 316 of FIG. 3 described below.

The example movement manager 312 of FIG. 3 manages and/or controls the motor(s) 302 and/or movement(s) of the robot 102. In some examples, the movement manager 312 commands the robot 102 to construct an assembly of objects based on the sequence(s) of RL action primitives determined by the construction manager 310 of FIG. 3. For example, the movement manager 312 may generate one or more signal(s), command(s) and/or instruction(s) that cause(es) one or more of the motor(s) 302 of the robot 102 to move (e.g., position, reposition, orient, reorient, etc.) the robot 102 in accordance with the sequence(s) of RL action primitives determined by the construction manager 310 (e.g., the sequence(s) output by the output manager 348 of the construction manager 310 of FIG. 3). In some examples, RL action primitives included in the action primitive sequence(s) have previously been learned by the robot 102 and stored as one or more corresponding action primitive policies in the action primitive policy library developed by the policy library developer 306 of FIG. 3. In such examples, the movement manager 312 of FIG. 3 may access the action primitive policies corresponding to the sequence(s) of RL action primitives, and may generate signal(s), command(s) and/or instruction(s) that cause the motor(s) 302 of the robot to implement, invoke and/or execute such action primitive policies to construct the physical assembly of objects. Controlled movements of the robot 102 via the motor(s) 302 of FIG. 3, according to the sequence(s) determined by the construction manager 310 of FIG. 3, and/or in response to the signal(s), command(s) and/or instruction(s) generated by the movement manager 312 of FIG. 3 result in the robot 102 constructing an assembly of objects corresponding to the assembly of objects depicted in and/or represented by the image decomposed (e.g., deconstructed) by the decomposition manager 308 of FIG. 3. The movement manager 312 of FIG. 3 may be implemented by any type(s) and/or any number(s) of semiconductor device(s) (e.g., microprocessor(s), microcontroller(s), etc.). Movement signal(s), command(s), instruction(s) and/or data accessed, generated and/or processed by and/or at the movement manager 312 may be of any quantity, type, form and/or format, and may be stored in a computer-readable storage medium such as the example memory 316 of FIG. 3 described below.

Figure 16:
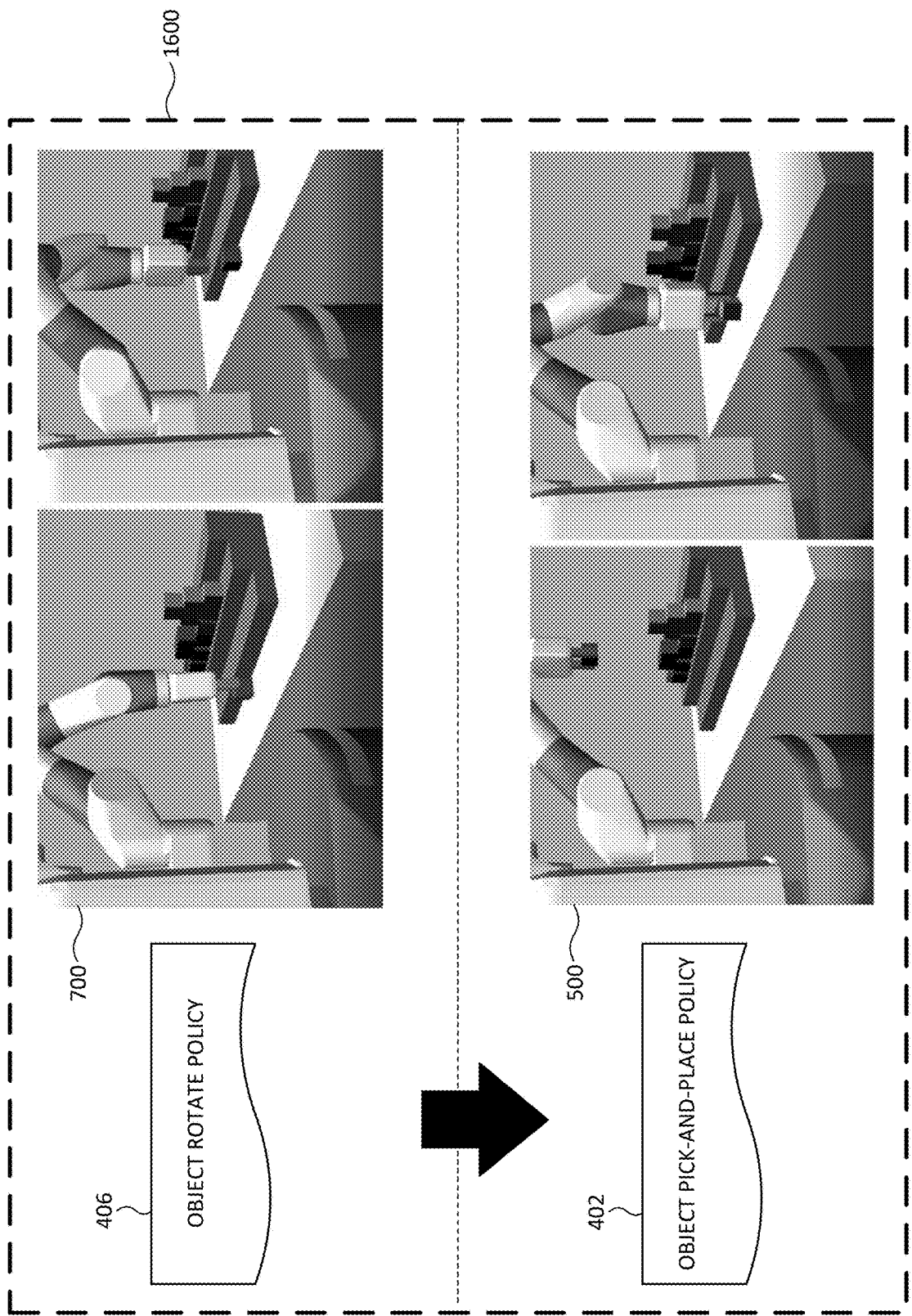
FIG. 16 illustrates a first example sequence of action primitives determined by the example action primitive sequence determiner of FIG. 3, output by the example output manager of FIG. 3, and/or invoked by the example movement manager of FIG. 3.

FIG. 16 illustrates a first example sequence 1600 of action primitives determined by the example action primitive sequence determiner 346 of FIG. 3, output by the example output manager 348 of FIG. 3, and/or invoked by the example movement manager 312 of FIG. 3. In the illustrated example of FIG. 16, the first sequence 1600 of action primitives includes the example object rotate action primitive 700 of FIG. 7 followed in time and/or sequence by the example object pick-and-place action primitive 500 of FIG. 5. As further shown in FIG. 16, the movement manager 312 of FIG. 3 may implement the first sequence 1600 of action primitives by invoking and/or executing the object rotate policy 406 of FIGS. 4 and 7, and subsequently invoking and/or executing the object pick-and-place policy 402 of FIGS. 4 and 5.

Figure 17:
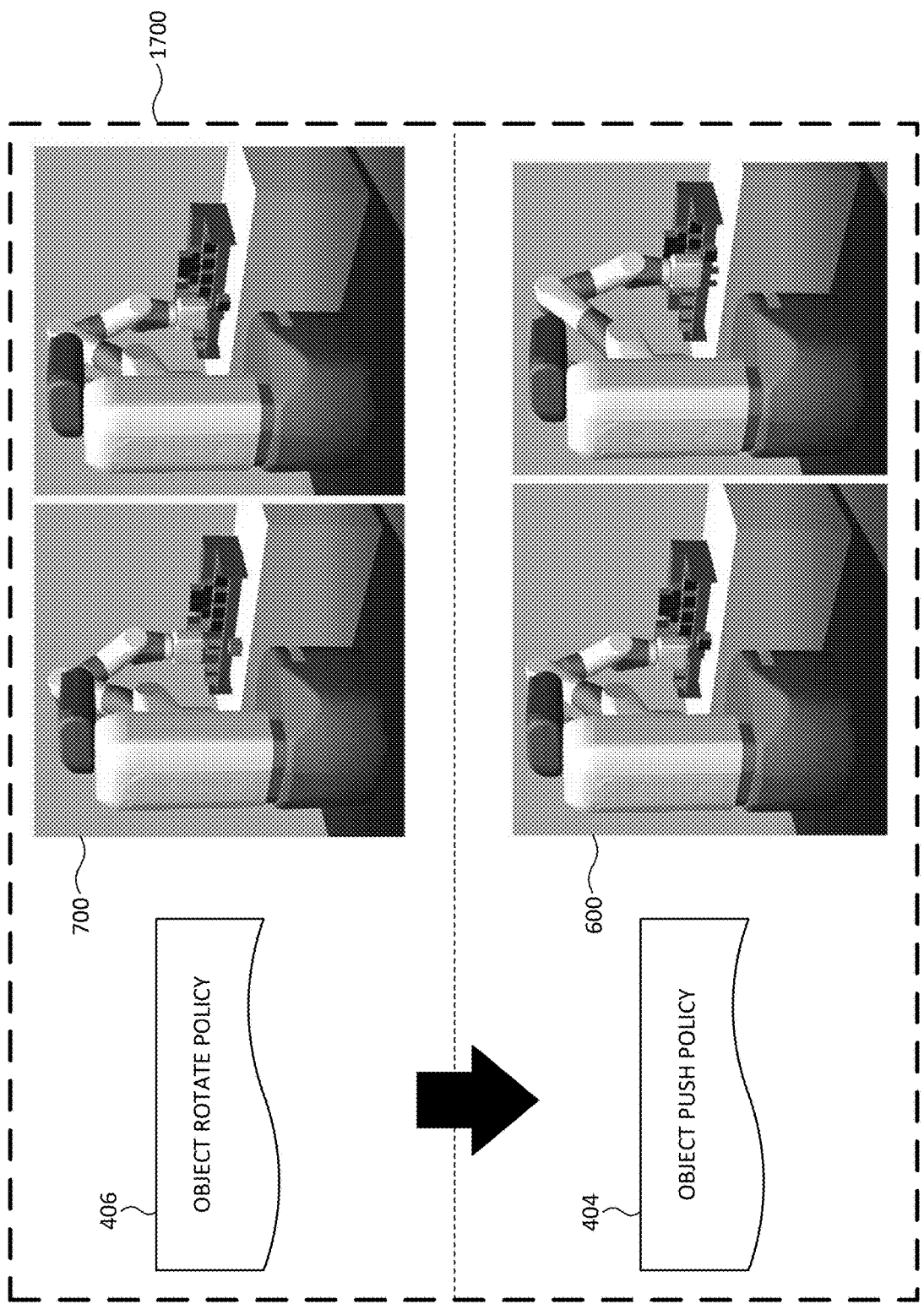
FIG. 17 illustrates a second example sequence of action primitives determined by the example action primitive sequence determiner of FIG. 3, output by the example output manager of FIG. 3, and/or invoked by the example movement manager of FIG. 3.

FIG. 17 illustrates a second example sequence 1700 of action primitives determined by the example action primitive sequence determiner 346 of FIG. 3, output by the example output manager 348 of FIG. 3, and/or invoked by the example movement manager 312 of FIG. 3. In the illustrated example of FIG. 17, the second sequence 1700 of action primitives includes the example object rotate action primitive 700 of FIG. 7 followed in time and/or sequence by the example object push action primitive 600 of FIG. 6. As further shown in FIG. 17, the movement manager 312 of FIG. 3 may implement the second sequence 1700 of action primitives by invoking and/or executing the object rotate policy 406 of FIGS. 4 and 7, and subsequently invoking and/or executing the object push policy 404 of FIGS. 4 and 6.

The example user interface 314 of FIG. 3 facilitates interactions and/or communications between an end user and the robot 102. The user interface 314 includes one or more input device(s) 350 via which the user may input information and/or data to the robot 102. For example, the input device(s) 350 may include a button, a switch, a microphone, and/or a touchscreen that enable(s) the user to convey data and/or commands to the example policy library developer 306, the example decomposition manager 308, the example construction manager 310, and/or the example movement manager 312 of FIG. 3, and/or, more generally, to the robot 102 of FIGS. 1-3 and 5-8. The user interface 314 of FIG. 3 also includes one or more output device(s) 352 via which the user interface 314 presents information and/or data in visual and/or audible form to the user. For example, the output device(s) 352 may include a light emitting diode, a touchscreen, and/or a liquid crystal display for presenting visual information, and/or a speaker for presenting audible information. Data and/or information that is presented and/or received via the user interface 314 may be of any quantity, type, form and/or format, and may be stored in a computer-readable storage medium such as the example memory 316 of FIG. 3 described below.

The example memory 316 of FIG. 3 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 316 may be stored in any file and/or data structure format, organization scheme, and/or arrangement.

In some examples, the memory 316 stores images and/or image data captured by the camera 304 of FIG. 3. In some examples, the memory 316 stores action primitives, action primitive data, action primitive policies, and/or action primitive policy data accessed, generated and/or processed by and/or at the policy library developer 306 of FIG. 3. In some examples, the memory 316 stores RL action primitives and/or RL action primitive data accessed, selected and/or processed by and/or at the action primitive selector 318 of FIG. 3. In some examples, the memory 316 stores action primitive policies, action primitive policy data, and/or RL algorithms accessed, invoked, applied, generated, trained and/or processed by and/or at the policy generator 320 of FIG. 3. In some examples, the memory 316 stores optimized action primitive policies and/or action primitive policy optimization data accessed, generated and/or processed by and/or at the policy optimizer 322 of FIG. 3. In some examples, the memory 316 stores library management data accessed, generated and/or processed by and/or at the library manager 324 of FIG. 3.

In some examples, the memory 316 stores decomposition data and/or decomposition algorithms accessed, invoked, applied, generated and/or processed by and/or at the decomposition manager 308 of FIG. 3. In some examples, the memory 316 stores images and/or image data accessed, obtained, received and/or processed by and/or at the image manager 326 of FIG. 3. In some examples, the memory 316 stores object data and/or object detection algorithms accessed, implemented, invoked, applied, detected, identified and/or processed by and/or at the object detector 328 of FIG. 3. In some examples, the memory 316 stores contour maps and/or contour map data accessed, generated and/or processed by and/or at the map generator 330 of FIGS. 3 and 9. In some examples, the memory 316 stores converted images (e.g., grayscale images) and/or converted image data (e.g., grayscale image data) accessed, generated and/or processed by and/or at the image converter 902 of FIG. 9. In some examples, the memory 316 stores pixel intensities, pixel intensity data, and/or binarization algorithms accessed, implemented, invoked, applied, determined, detected, generated and/or processed by and/or at the pixel intensity detector 904 of FIG. 9. In some examples, the memory 316 stores adaptively thresholded pixel intensity values, adaptively thresholded pixel intensity value data, and/or adaptive thresholding algorithms accessed, implemented, invoked, applied, generated and/or processed by and/or at the thresholder 906 of FIG. 9. In some examples, the memory 316 stores area data (e.g., pixel coordinates defining areas) of matching pixel intensity values (e.g., matching adaptively thresholded pixel intensity value) accessed, determined, detected, generated and/or processed by and/or at the pixel intensity comparator 908 of FIG. 9. In some examples, the memory 316 stores contours and/or contour data accessed, generated and/or processed by and/or at the contour generator 910 of FIG. 9. In some examples, the memory 316 stores semantic segmentations, semantic segmentation data, and/or semantic segmentation algorithms accessed, implemented, invoked, applied, generated and/or processed by and/or at the segmentation generator 332 of FIG. 3. In some examples, the memory 316 stores object locations, object location data, and/or geometry-based packing algorithms accessed, implemented, invoked, applied, determined, generated and/or processed by and/or at the location goal determiner 334 of FIG. 3. In some examples, the memory 316 stores assembly goals, assembly goal data, and/or object localization algorithms accessed, implemented, invoked, applied, determined, generated and/or processed by and/or at the assembly goal determiner 336 of FIG. 3.

In some examples, the memory 316 stores action primitive sequences and/or action primitive sequence data accessed, determined, generated and/or processed by and/or at the construction manager 310 of FIG. 3. In some examples, the memory 316 stores object-to-goal maps and/or object-to-goal map data accessed, generated and/or processed by and/or at the object-to-goal mapper 338 of FIG. 3. In some examples, the memory 316 stores object placement sequences and/or object placement sequence data accessed, determined, generated and/or processed by and/or at the placement sequence determiner 340 of FIG. 3. In some examples, the memory 316 stores placement sequence management data accessed, determined, generated and/or processed by and/or at the placement sequence manager 342 of FIG. 3. In some examples, the memory 316 stores assembly goals and/or assembly goal data accessed, determined, identified and/or processed by and/or at the goal identifier 344 of FIG. 3. In some examples, the memory 316 stores action primitive sequences and/or action primitive sequence data accessed, determined, generated and/or processed by and/or at the action primitive sequence determiner 346 of FIG. 3. In some examples, the memory 316 stores action primitive sequences and/or action primitive sequence data accessed, output and/or processed by and/or at the output manager 348 of FIG. 3. In some examples, the memory 316 stores movement signal(s), command(s), instruction(s) and/or data accessed, generated and/or processed by and/or at the movement manager 312 of FIG. 3. In some examples, the memory 316 stores data and/or information that is presented and/or received via the user interface 314 of FIG. 3.

The memory 316 of FIG. 3 is accessible to the motor(s) 302, the camera 304, the policy library developer 306 (including the action primitive selector 318, the policy generator 320, the policy optimizer 322, and the library manager 324), the decomposition manager 308 (including the image manager 326, the object detector 328, the map generator 330, the segmentation generator 332, the location goal determiner 334, and the assembly goal determiner 336), the construction manager 310 (including the object-to-goal mapper 338, the placement sequence determiner 340, the placement sequence manager 342, the goal identifier 344, the action primitive sequence determiner 346, and the output manager 348), the movement manager 312, and/or the user interface 314 (including the input device(s) 350 and the output device(s) 352) of FIG. 3, and/or, more generally, to the robot 102 of FIGS. 1-3 and 5-8.

The motor(s) 302 of FIG. 3 is/are a means for moving the robot 102 of FIGS. 1-3 and 5-8. The camera 304 of FIG. 3 is a means for capturing images. The policy library developer 306 of FIG. 3 is a means for developing an action primitive policy library including one or more action primitive policies learned by the robot 102 of FIGS. 1-3 and 5-8. The action primitive selector 318 of FIG. 3 is a means for selecting an RL action primitive of the robot 102 of FIGS. 1-3 and 5-8. The policy generator 320 of FIG. 3 is a means for training an action primitive policy corresponding to an RL algorithm action primitive selected by the action primitive selector 318 of FIG. 3. The policy optimizer 322 of FIG. 3 is a means for optimizing an action primitive policy trained by the policy generator 320 of FIG. 3. The library manager 324 of FIG. 3 is a means for managing an action primitive policy library developed by the policy library developer 306 of FIG. 3.

The decomposition manager 308 of FIG. 3 is a means for deconstructing an image of an assembly of objects into object location goals and associated assembly goals corresponding to the assembly of objects depicted in the image. The image manager 326 of FIG. 3 is a means for managing the operation of the camera 304 of FIG. 3, and/or for managing the process of obtaining images. The object detector 328 of FIG. 3 is a means for detecting one or more object(s) depicted in an image of an assembly of objects obtained by the image manager 326 of FIG. 3. The map generator 330 of FIG. 3 is a means for generating a contour map for objects detected by the object detector 328 of FIG. 3 in an image of an assembly of objects obtained by the image manager 326 of FIG. 3. The image converter 902 of FIG. 9 is a means for converting an image obtained by the image manager 326 of FIG. 3 into a grayscale image. The pixel intensity detector 904 of FIG. 9 is a means for detecting pixel intensity values for pixels of a grayscale image generated by the image converter 902 of FIG. 9. The thresholder 906 of FIG. 9 is a means for adaptively thresholding pixel intensity values determined by the pixel intensity detector 904 of FIG. 9. The pixel intensity comparator 908 of FIG. 9 is a means for detecting areas of matching adaptively thresholded pixel intensity values that have been adaptively thresholded by the thresholder 906 of FIG. 9. The contour generator 910 of FIG. 9 is a means for generating contours based on areas of matching adaptively thresholded pixel intensity values detected by the pixel intensity comparator 908 of FIG. 9. The segmentation generator 332 of FIG. 3 is a means for generating a semantic segmentation for objects detected by the object detector 328 of FIG. 3 in an image of an assembly of objects obtained by the image manager 326 of FIG. 3. The location goal determiner 334 of FIG. 3 is a means for determining object location goals for respective ones of objects represented by a contour map generated by the map generator 330 of FIG. 3 and/or a semantic segmentation generated by the segmentation generator 332 of FIG. 3. The assembly goal determiner 336 of FIG. 3 is a means for determining assembly goals for respective ones of objects represented by a contour map generated by the map generator 330 of FIG. 3 and/or a semantic segmentation generated by the segmentation generator 332 of FIG. 3.

The construction manager 310 of FIG. 3 is a means for determining one or more sequence(s) of RL action primitives for constructing an assembly of objects based on object location goals and associated assembly goals determined by the decomposition manager 308 of FIG. 3. The object-to-goal mapper 338 of FIG. 3 is a means for generating an object-to-goal map based on object location goals determined by the location goal determiner 334 of FIG. 3 and associated assembly goals determined by the assembly goal determiner 336 of FIG. 3, and further based on initial locations of objects to be used to construct an assembly of objects. The placement sequence determiner 340 of FIG. 3 is a means for determining an object placement sequence based on an object-to-goal map generated by the object-to-goal mapper 338 of FIG. 3. The placement sequence manager 342 of FIG. 3 is a means for managing a processing cycle associated with an object placement sequence determined by the placement sequence determiner 340 of FIG. 3. The goal identifier 344 of FIG. 3 is a means for identifying an assembly goal for each object included in an object placement sequence determined by the placement sequence determiner 340 of FIG. 3. The action primitive sequence determiner 346 of FIG. 3 is a means for determining a sequence of action primitives associated with each assembly goal identified by the goal identifier 344 of FIG. 3. The output manager 348 of FIG. 3 is a means for outputting one or more sequence(s) of action primitives determined by the action primitive sequence determiner 346 of FIG. 3.

The movement manager 312 of FIG. 3 is a means for controlling the motor(s) 302 and/or movement(s) of the robot 102 of FIGS. 1-3 and 5-8. The user interface 314 of FIG. 3 is a means for facilitating interactions and/or communications between an end user and the robot 102 of FIGS. 1-3 and 5-8. The input device(s) 350 of FIG. 3 is/are a means for inputting information and/or data to the robot 102 of FIGS. 1-3 and 5-8. The output device(s) 352 of FIG. 3 is/are a means for presenting information and/or data in visual and/or audible form via the robot 102 of FIGS. 1-3 and 5-8. The memory 316 of FIG. 3 is a means for storing information and/or data.

While an example manner of implementing the robot 102 is illustrated in FIGS. 1-3 and 5-8, one or more of the elements, processes and/or devices illustrated in FIGS. 1-3 and 5-8 may be combined, divided, re-arranged, omitted, eliminated and/or implemented in any other way. Further, the example motor(s) 302, the example camera 304, the example policy library developer 306, the example decomposition manager 308, the example construction manager 310, the example movement manager 312, the example user interface 314, the example memory 316, the example action primitive selector 318, the example policy generator 320, the example policy optimizer 322, the example library manager 324, the example image manager 326, the example object detector 328, the example map generator 330, the example segmentation generator 332, the example location goal determiner 334, the example assembly goal determiner 336, the example object-to-goal mapper 338, the example placement sequence determiner 340, the example placement sequence manager 342, the example goal identifier 344, the example action primitive sequence determiner 346, the example output manager 348, the example input device(s) 350, the example output device(s) 352, the example image converter 902, the example pixel intensity detector 904, the example thresholder 906, the example pixel intensity comparator 908, and the example contour generator 910 and/or, more generally, the example robot 102 of FIGS. 1-3 and 5-8 may be implemented by hardware, software, firmware and/or any combination of hardware, software and/or firmware. Thus, for example, any of the example motor(s) 302, the example camera 304, the example policy library developer 306, the example decomposition manager 308, the example construction manager 310, the example movement manager 312, the example user interface 314, the example memory 316, the example action primitive selector 318, the example policy generator 320, the example policy optimizer 322, the example library manager 324, the example image manager 326, the example object detector 328, the example map generator 330, the example segmentation generator 332, the example location goal determiner 334, the example assembly goal determiner 336, the example object-to-goal mapper 338, the example placement sequence determiner 340, the example placement sequence manager 342, the example goal identifier 344, the example action primitive sequence determiner 346, the example output manager 348, the example input device(s) 350, the example output device(s) 352, the example image converter 902, the example pixel intensity detector 904, the example thresholder 906, the example pixel intensity comparator 908, and the example contour generator 910 and/or, more generally, the example robot 102 of FIGS. 1-3 and 5-8 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example motor(s) 302, the example camera 304, the example policy library developer 306, the example decomposition manager 308, the example construction manager 310, the example movement manager 312, the example user interface 314, the example memory 316, the example action primitive selector 318, the example policy generator 320, the example policy optimizer 322, the example library manager 324, the example image manager 326, the example object detector 328, the example map generator 330, the example segmentation generator 332, the example location goal determiner 334, the example assembly goal determiner 336, the example object-to-goal mapper 338, the example placement sequence determiner 340, the example placement sequence manager 342, the example goal identifier 344, the example action primitive sequence determiner 346, the example output manager 348, the example input device(s) 350, the example output device(s) 352, the example image converter 902, the example pixel intensity detector 904, the example thresholder 906, the example pixel intensity comparator 908, and/or the example contour generator 910 of FIGS. 1-3 and 5-8 is/are hereby expressly defined to include a non-transitory computer readable storage device or storage disk such as a memory, a digital versatile disk (DVD), a compact disk (CD), a Blu-ray disk, etc. including the software and/or firmware. Further still, the example motor(s) 302, the example camera 304, the example policy library developer 306, the example decomposition manager 308, the example construction manager 310, the example movement manager 312, the example user interface 314, the example memory 316, the example action primitive selector 318, the example policy generator 320, the example policy optimizer 322, the example library manager 324, the example image manager 326, the example object detector 328, the example map generator 330, the example segmentation generator 332, the example location goal determiner 334, the example assembly goal determiner 336, the example object-to-goal mapper 338, the example placement sequence determiner 340, the example placement sequence manager 342, the example goal identifier 344, the example action primitive sequence determiner 346, the example output manager 348, the example input device(s) 350, the example output device(s) 352, the example image converter 902, the example pixel intensity detector 904, the example thresholder 906, the example pixel intensity comparator 908, and the example contour generator 910 and/or, more generally, the example robot 102 of FIGS. 1-3 and 5-8 may include one or more element(s), process(es) and/or device(s) in addition to, or instead of, those illustrated in FIGS. 1-3 and 5-8, and/or may include more than one of any or all of the illustrated elements, processes and devices. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the robot 102 of FIGS. 1-3 and 5-8 are shown in FIGS. 18-22. The machine readable instructions may be one or more executable program(s) or portion(s) of executable program(s) for execution by a computer processor such as the example processor 2302 shown in the example processor platform 2300 discussed below in connection with FIG. 23. The program(s) may be embodied in software stored on a non-transitory computer readable storage medium such as a CD-ROM, a floppy disk, a hard drive, a DVD, a Blu-ray disk, or a memory associated with the processor 2302, but the entire program(s) and/or parts thereof could alternatively be executed by a device other than the processor 2302 and/or embodied in firmware or dedicated hardware. Further, although the example program(s) is/are described with reference to the flowcharts illustrated in FIGS. 18-22, many other methods of implementing the example robot 102 of FIGS. 1-3 and 5-8 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage device(s) and/or computing device(s) (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 18-22 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 18:
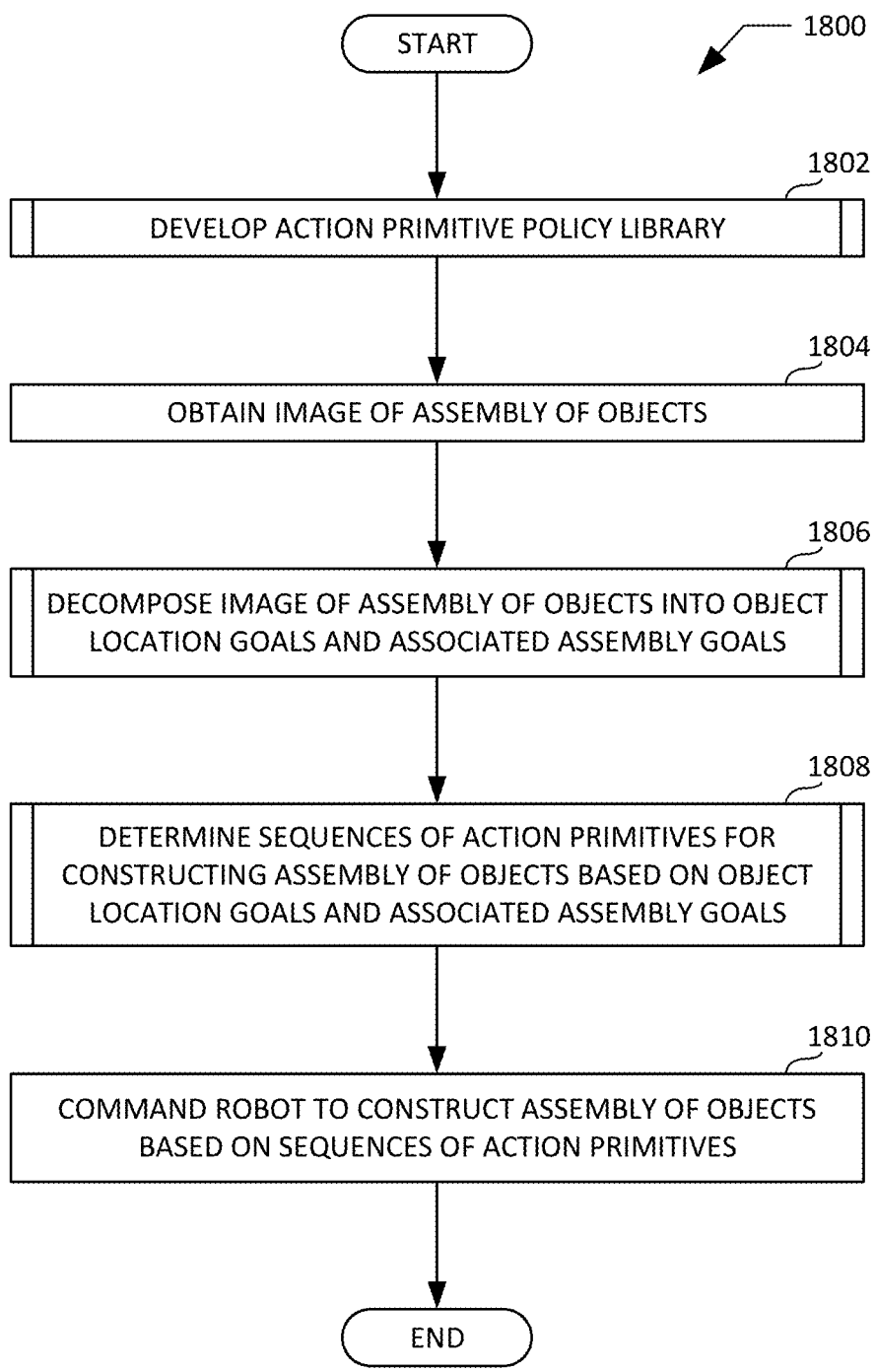
FIG. 18 is a flowchart representative of example machine readable instructions that may be executed to implement the example robot of FIGS. 1-3 and 5-8 to construct a complex assembly using reinforcement learning action primitives.

FIG. 18 is a flowchart representative of example machine readable instructions 1800 that may be executed to implement the example robot 102 of FIGS. 1-3 and 5-8 to construct a complex assembly using RL action primitives. The example program 1800 of FIG. 18 begins when the example policy library developer 306 of FIG. 3 develops an action primitive policy library (block 1802). For example, the policy library developer 306 may build and/or develop an action primitive policy library including one or more action primitive policies learned (e.g., via an RL-based algorithm) by the robot 102. In some examples, the action primitive policy library may include the example object pick-and-place policy 402, the example object push policy 404, the example object rotate policy 406, the example object sort policy 408, and/or the other example action primitive policies 410 of the action primitive policy library 400 of FIG. 4. Action primitive policies stored within the action primitive policy library built and/or developed by the policy library developer 306 of FIG. 3 are respectively derived from corresponding RL action primitives (e.g., basic robotic movements) of the robot 102. An example process that may be used to implement block 1802 of the example program 1800 of FIG. 18 is described in greater detail below in connection with FIG. 19. Following block 1802, control of the example program 1800 of FIG. 18 proceeds to block 1804.

At block 1804, the example image manager 326 of FIG. 3 obtains an image of an assembly of objects. For example, the image manager 326 may signal, command and/or instruct the camera 304 to capture an image (e.g., an image of an assembly of objects) at a specified time, at a specified location, and/or in response to the occurrence of a specified event. In some examples, the image manager 326 of FIG. 3 signals, commands and/or instructs the camera 304 of FIG. 3 to capture an image in response to one or more user input(s) received via the user interface 314 of FIG. 3. In other examples, the image manager 326 may cause the robot 102 to access, obtain and/or receive an image (e.g., an image of an assembly of objects) via the user interface 314 of FIG. 3 and/or via a network interface of the robot 102 without the use of the camera 304 of FIG. 3. Following block 1804, control of the example program 1800 of FIG. 18 proceeds to block 1806.

At block 1806, the example decomposition manager 308 of FIG. 3 decomposes and/or deconstructs the image of the assembly of objects into object location goals and associated assembly goals. For example, the decomposition manager 308 may decompose and/or deconstruct (e.g., via a decomposition algorithm) the image of the assembly of objects into object location goals and associated assembly goals corresponding to the assembly of objects depicted in and/or represented by the image. An example process that may be used to implement block 1806 of the example program 1800 of FIG. 18 is described in greater detail below in connection with FIG. 20. Following block 1806, control of the example program 1800 of FIG. 18 proceeds to block 1808.

At block 1808, the example construction manager 310 of FIG. 3 determines one or more sequence(s) of RL action primitives for constructing an assembly of objects based on the object location goals and the associated assembly goals determined by the decomposition manager 308 of FIG. 3. For example, the construction manager 310 may determine, based on the object location goals determined by the location goal determiner 334 of the decomposition manager 308 and the associated assembly goals determined by the assembly goal determiner 336 of the decomposition manager 308, one or more sequence(s) of RL action primitives for constructing an assembly of objects corresponding to the assembly of objects depicted in and/or represented by the image decomposed (e.g., deconstructed) by the decomposition manager 308 of FIG. 3. An example process that may be used to implement block 1808 of the example program 1800 of FIG. 18 is described in greater detail below in connection with FIG. 21. Following block 1808, control of the example program 1800 of FIG. 18 proceeds to block 1810.

At block 1810, the example movement manager 312 of FIG. 3 commands the robot 102 to construct an assembly of objects based on the sequence(s) of RL action primitives determined by the construction manager 310 of FIG. 3. For example, the movement manager 312 may generate one or more signal(s), command(s) and/or instruction(s) that cause(es) one or more of the motor(s) 302 of the robot 102 to move (e.g., position, reposition, orient, reorient, etc.) the robot 102 in accordance with the sequence(s) of RL action primitives determined by the construction manager 310. In some examples, RL action primitives included in the action primitive sequence(s) have previously been learned by the robot 102 and stored as one or more corresponding action primitive policies in the action primitive policy library developed by the policy library developer 306 of FIG. 3. In such examples, the movement manager 312 of FIG. 3 may access the action primitive policies corresponding to the sequence(s) of RL action primitives, and may generate signal(s), command(s) and/or instruction(s) that cause the motor(s) 302 of the robot to implement, invoke and/or execute such action primitive policies to construct the physical assembly of objects. Controlled movements of the robot 102 via the motor(s) 302 of FIG. 3, according to the sequence(s) determined by the construction manager 310 of FIG. 3, and/or in response to the signal(s), command(s) and/or instruction(s) generated by the movement manager 312 of FIG. 3 result in the robot 102 constructing an assembly of objects corresponding to the assembly of objects depicted in and/or represented by the image decomposed (e.g., deconstructed) by the decomposition manager 308 of FIG. 3. Following block 1810, the example program 1800 of FIG. 18 ends.

Figure 19:
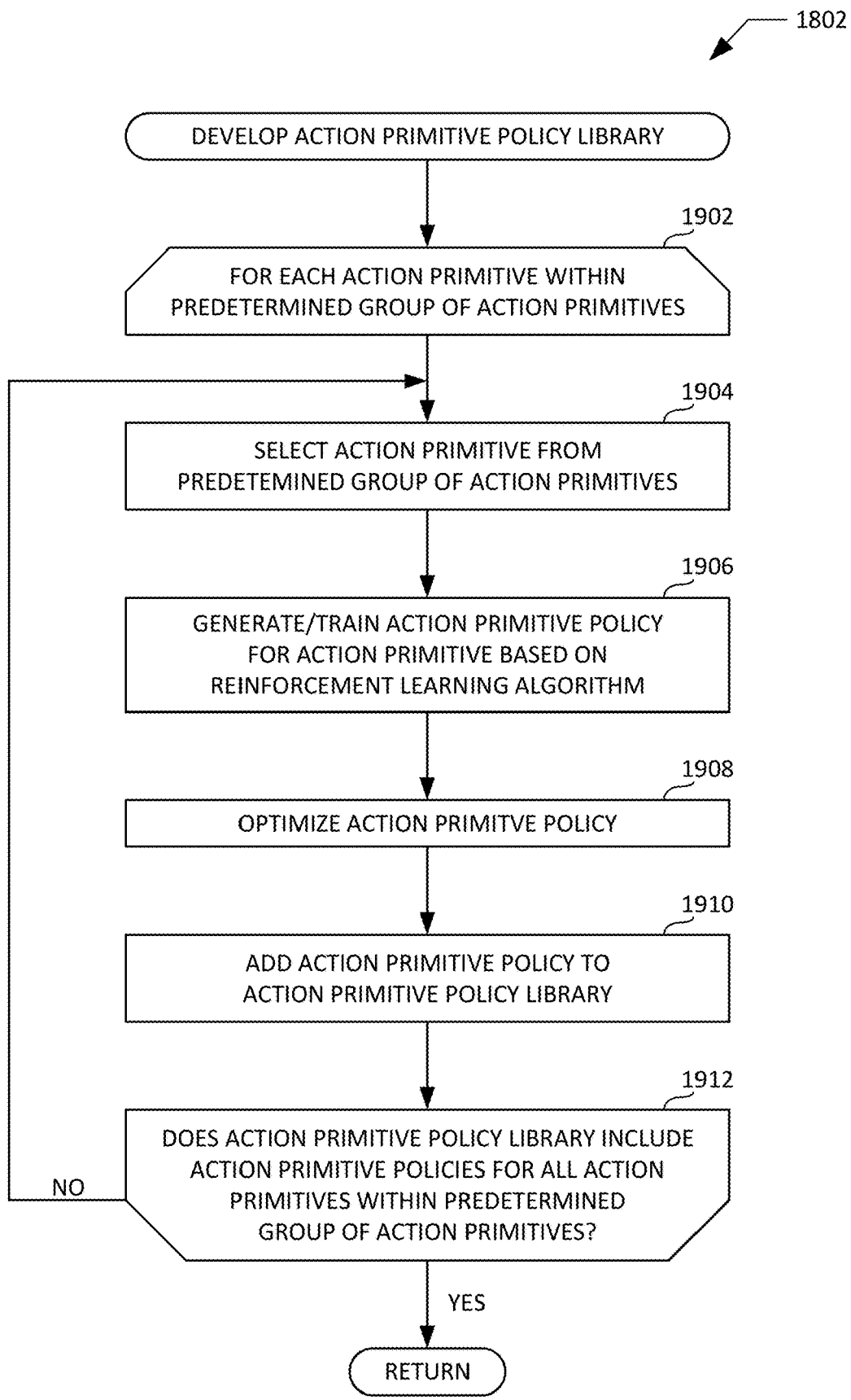
FIG. 19 is a flowchart representative of example machine readable instructions that may be executed to implement the example robot of FIGS. 1-3 and 5-8 to develop an action primitive policy library.

FIG. 19 is a flowchart representative of example machine readable instructions 1802 that may be executed to implement the example robot 102 of FIGS. 1-3 and 5-8 to develop an action primitive policy library. Example operations of blocks 1902, 1904, 1906, 1908, 1910 and 1912 of FIG. 19 may be used to implement block 1802 of FIG. 18. The example program 1802 of FIG. 19 begins when the example library manager 324 of FIG. 3 initiates a processing cycle to be executed iteratively for each RL action primitive within a predetermined group of RL action primitives of the robot 102 (block 1902). In some examples, the predetermined group may include all of the RL action primitives of the robot 102. In other examples, the predetermined group may include a subset of all of the RL action primitives of the robot 102. The processing cycle initiated at block 1902 by the library manager 324 includes blocks 1904, 1906, 1908, 1910 and 1912, as further described below.

At block 1904, the example action primitive selector 318 of FIG. 3 selects an RL action primitive of the robot 102 from within the predetermined group of RL action primitives. For example, the action primitive selector 318 may select an object pick-and-place action primitive (e.g., the object pick-and-place action primitive 500 shown in FIG. 5), an object push action primitive (e.g., the object push action primitive 600 shown in FIG. 6), an object rotate action primitive (e.g., the object rotate action primitive 700 shown in FIG. 7), or an object sort action primitive (e.g., the object sort action primitive 800 shown in FIG. 8). In some examples, the action primitive selector 318 selects an RL action primitive of the robot 102 for which a corresponding action primitive policy has not yet been generated by the policy generator 320 of FIG. 3 and/or stored within the action primitive policy library. Following block 1904, control of the example program 1802 of FIG. 19 proceeds to block 1906.

At block 1906, the example policy generator 320 of FIG. 3 generates and/or trains an action primitive policy for the RL action primitive selected by the action primitive selector 318 of FIG. 3 based on an RL algorithm. For example, the policy generator 320 may generate the example object pick-and-place policy 402 of FIGS. 4 and 5 based on the example object pick-and-place action primitive 500 of FIG. 5. As another example, the policy generator 320 may generate the example object push policy 404 of FIGS. 4 and 6 based on the example object push action primitive 600 of FIG. 6. As another example, the policy generator 320 may generate the example object rotate policy 406 of FIGS. 4 and 7 based on the example object rotate action primitive 700 of FIG. 7. As another example, the policy generator 320 may generate the example object sort policy 408 of FIGS. 4 and 8 based on the example object sort action primitive 800 of FIG. 8. In some examples, the policy generator 320 of FIG. 3 implements, invokes, applies and/or utilizes an RL algorithm including a deep deterministic policy gradient (DDPG) algorithm in combination with a hindsight experience replay (HER) algorithm (e.g., combined as a DDPG+ HER algorithm) to train the action primitive policy. In such examples, the robot 102 learns the action primitive policy based on the DDPG+HER algorithm. Following block 1906, control of the example program 1802 of FIG. 19 proceeds to block 1908.

At block 1908, the example policy optimizer 322 of FIG. 3 optimizes the action primitive policy generated and/or trained by the policy generator 320 of FIG. 3. For example, the policy optimizer 322 may reduce the number of robotic actions and/or robotic movements included in the generated and/or trained action primitive policy to a lower number (e.g., a minimum number) of robotic actions and/or robotic movements needed to perform the underlying RL action primitive. Following block 1908, control of the example program 1802 of FIG. 19 proceeds to block 1910.

At block 1910, the example library manager 324 of FIG. 3 causes the action primitive policy generated and/or trained by the policy generator 320 and/or optimized by the policy optimizer 322 of FIG. 3 to be added to and/or stored within an action primitive policy library. For example, the library manager 324 may cause the example object pick-and-place policy 402 of FIGS. 4 and 5 to be added to the example action primitive policy library 400 of FIG. 4. As another example, the library manager 324 may cause the example object push policy 404 of FIGS. 4 and 6 to be added to the example action primitive policy library 400 of FIG. 4. As another example, the library manager 324 may cause the example object rotate policy 406 of FIGS. 4 and 7 to be added to the example action primitive policy library 400 of FIG. 4. As another example, the library manager 324 may cause the example object sort policy 408 of FIGS. 4 and 8 to be added to the example action primitive policy library 400 of FIG. 4. Following block 1910, control of the example program 1802 of FIG. 19 proceeds to block 1912.

At block 1912, the example library manager 324 of FIG. 3 determines whether the action primitive policy library includes action primitive policies for all of the RL action primitives within the predetermined group of action primitives. For example, the library manager 324 may determine, by comparing the contents of the action primitive library to a list of the RI, action primitives of the robot 102, that one or more action primitive policies corresponding to one or more of the RL action primitives has/have yet to be stored within the action primitive library. If the library manager 324 determines at block 1912 that the action primitive library does not include action primitive policies for all of the RL action primitives within the predetermined group, control of the example program 1802 of FIG. 19 returns to block 1904. If the library manager 324 instead determines at block 1910 that the action primitive library does include action primitive policies for all of the RL action primitives within the predetermined group, control of the example program 1802 of FIG. 19 returns to a function call such as block 1802 of the example program 1800 of FIG. 18.

Figure 20:
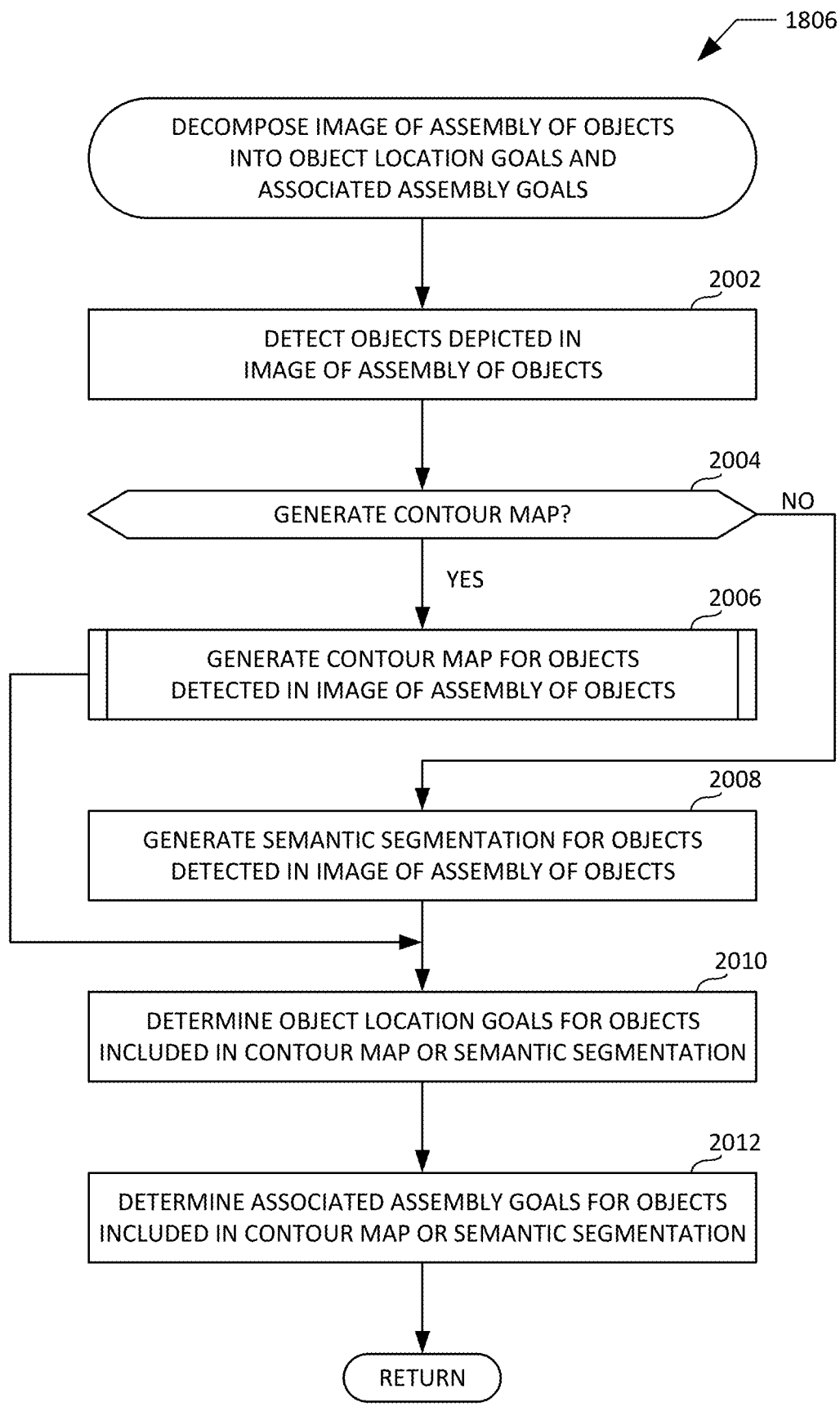
FIG. 20 is a flowchart representative of example machine readable instructions that may be executed to implement the example robot of FIGS. 1-3 and 5-8 to decompose an image of assembled objects.

FIG. 20 is a flowchart representative of example machine readable instructions 1806 that may be executed to implement the example robot 102 of FIGS. 1-3 and 5-8 to decompose an image of assembled objects into object location goals and associated assembly goals. Example operations of blocks 2002, 2004, 2006, 2008, 2010 and 2012 of FIG. 20 may be used to implement block 1806 of FIG. 18. The example program 1806 of FIG. 20 begins when the example object detector 328 of FIG. 3 detects and/or identifies one or more object(s) depicted in the image of the assembly of objects accessed and/or obtained by the image manager 326 of FIG. 3 (block 2002). For example, the object detector 328 may detect and/or identify one or more object(s) depicted in the image of the assembly of objects by applying an object detection algorithm (e.g., a You Only Look Once (YOLO) object detection algorithm) to the image of the assembly of objects. Following block 2002, control of the example program 1806 of FIG. 20 proceeds to block 2004.

At block 2004, the example decomposition manger 308 of FIG. 3 determines whether to invoke the map generator 330 of FIG. 3 to generate a contour map. For example, the decomposition manager 308 of FIG. 3 may invoke the map generator 330 of FIG. 3 to generate a contour map when the shapes and/or geometries of the objects detected by the object detector 328 of FIG. 3 are relatively complex. As another example, the decomposition manager 308 of FIG. 3 may invoke the segmentation generator 332 of FIG. 3 instead of the map generator 330 of FIG. 3 when the shapes and/or geometries of the objects detected by the object detector 328 of FIG. 3 are relatively simple. If the decomposition manger 308 determines at block 2004 to invoke the map generator 330 of FIG. 3 to generate a contour map, control of the example program 1806 of FIG. 20 proceeds to clock 2006. If the decomposition manager 308 instead determines at block 2004 not to invoke the map generator 330 of FIG. 3 to generate a contour map, control of the example program 1806 of FIG. 20 proceeds to block 2008.

At block 2006, the example map generator 330 of FIG. 3 generates a contour map for objects detected by the object detector 328 of FIG. 3 in the image of the assembly of objects accessed and/or obtained by the image manager 326 of FIG. 3. An example process that may be used to implement block 2006 of the example program 1806 of FIG. 20 is described in greater detail below in connection with FIG. 22. Following block 2006, control of the example program 1806 of FIG. 20 proceeds to block 2010.

At block 2008, the example segmentation generator 332 of FIG. 3 generates a semantic segmentation for objects detected by the object detector 328 of FIG. 3 in the image of the assembly of objects accessed and/or obtained by the image manager 326 of FIG. 3. For example, the segmentation generator 332 may generate a semantic segmentation of the image of the assembly of objects by applying a semantic segmentation algorithm (e.g., a Region Convoluted Neural Network (R-CNN) segmentation algorithm) to the image of the assembly of objects. In some examples, the semantic segmentation generated by the segmentation generator 332 represents and/or indicates one or more boundaries and/or physical properties (e.g., a size, a shape, an edge, a relative position, a relative orientation, etc.) of one or more object(s) detected by the object detector 328 of FIG. 3 and/or included within the image of the assembly of objects accessed and/or obtained by the image manager 326 of FIG. 3. In some examples, the semantic segmentation generated by the segmentation generator 332 of FIG. 3 includes (e.g., in the form of tags, labels, etc.) object identifiers (e.g., object type identifies) for respective ones of the objects included within the image of the assembly of objects. Following block 2008, control of the example program 1806 of FIG. 20 proceeds to block 2010.

At block 2010, the example location goal determiner 334 of FIG. 3 determines object location goals (e.g., target object locations) for respective ones of the objects included in and/or represented by the contour map generated by the map generator 330 of FIG. 3 or the semantic segmentation generated by the segmentation generator 322 of FIG. 3. For example, the location goal determiner 334 may determine object location goals for respective ones of the objects included in and/or represented by the contour map or the semantic segmentation by applying a geometry-based packing algorithm to the contour map or the semantic segmentation. Following block 2010, control of the example program 1806 of FIG. 20 proceeds to block 2012.

At block 2012, the example assembly goal determiner 336 of FIG. 3 determines assembly goals (e.g., target object assembly parameters such as on a shelf, under a shelf, on another object, under another object, in front of another object, behind another object, etc.) for respective ones of the objects included in and/or represented by the contour map generated by the map generator 330 of FIG. 3 or the semantic segmentation generated by the segmentation generator 332 of FIG. 3. For example, the assembly goal determiner 336 may determine assembly goals for respective ones of the objects included in and/or represented by the contour map or the semantic segmentation by applying an object localization algorithm to the contour map or the semantic segmentation. The assembly goal determiner 336 of FIG. 3 associates respective ones of the determined assembly goals with corresponding respective ones of the object location goals determined by the location goal determiner 334 of FIG. 3. Following block 2012, control of the example program 1806 of FIG. 20 returns to a function call such as block 1806 of the example program 1800 of FIG. 18.

Figure 21:
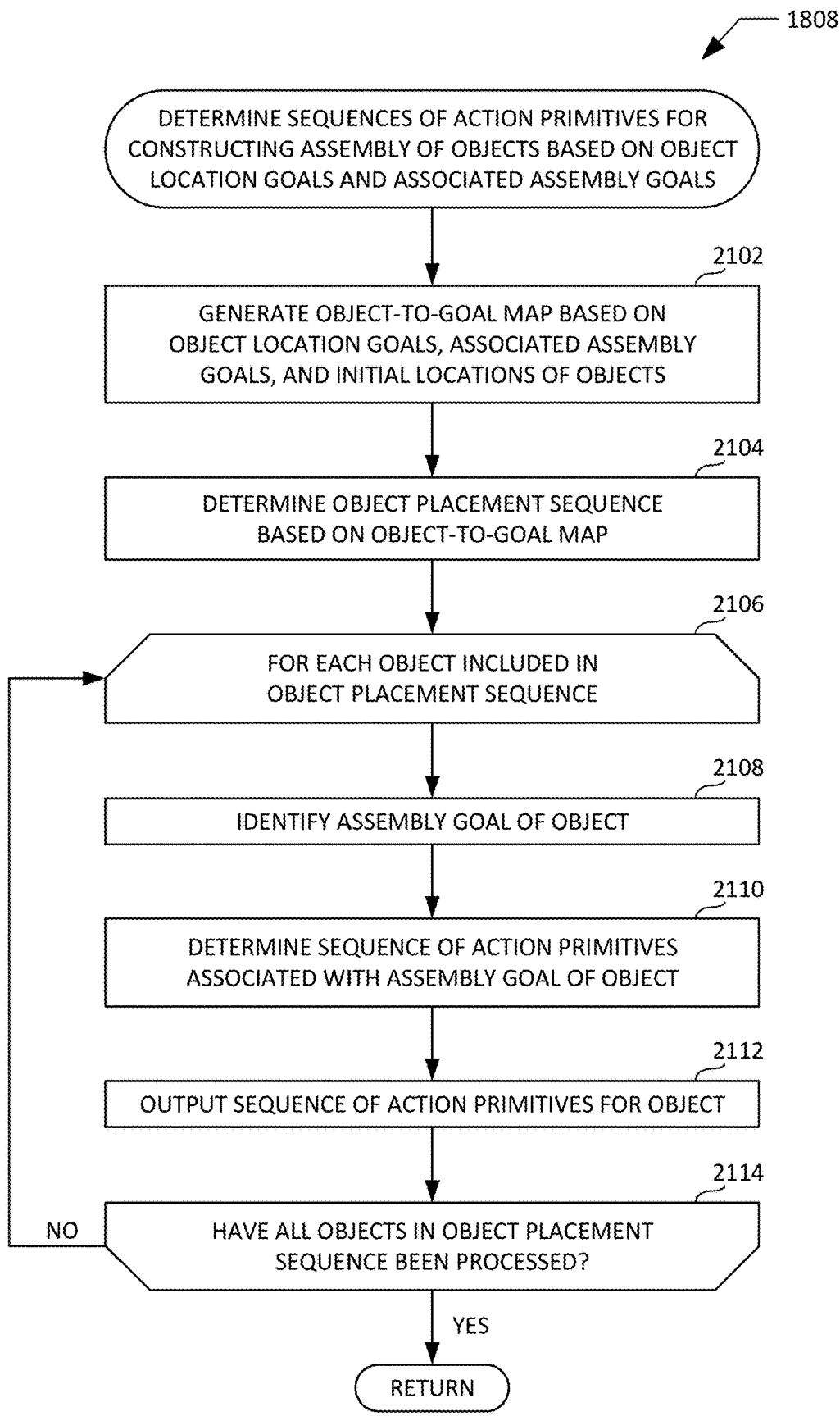
FIG. 21 is a flowchart representative of example machine readable instructions that may be executed to implement the example robot of FIGS. 1-3 and 5-8 to determine sequences of reinforcement learning action primitives for assembling objects.

FIG. 21 is a flowchart representative of example machine readable instructions 1808 that may be executed to implement the example robot 102 of FIGS. 1-3 and 5-8 to determine sequences of RL action primitives for assembling objects. Example operations of blocks 2102, 2104, 2106, 2108, 2110, 2112 and 2114 of FIG. 21 may be used to implement block 1808 of FIG. 18. The example program 1808 of FIG. 21 begins when the example object-to-goal mapper 338 of FIG. 3 generates an object-to-goal map based on the object location goals determined by the location goal determiner 334 of FIG. 3 and the associated assembly goals determined by the assembly goal determiner 336 of FIG. 3, and further based on initial locations of the objects (e.g., physical objects) to be used to construct an assembly of objects (block 2102). For example, the object-to-goal mapper 338 may generate an object-to-goal (e.g., the object-to-goal map 1300 of FIG. 13) map that logically assigns, links and/or associates respective ones of physical objects having corresponding initial locations to and/or with respective ones of the object location goals and their corresponding associated assembly goals. Following block 2102, control of the example program 1808 of FIG. 21 proceeds to block 2104.

At block 2104, the example placement sequence determiner 340 of FIG. 3 determines an object placement sequence based on the object-to-goal map generated by the object-to-goal mapper 338 of FIG. 3. For example, the placement sequence determiner 340 may generate an object placement sequence (e.g., the object placement sequence 1400 of FIG. 14) that assigns and/or establishes a logical sequence to respective ones of the objects of the object-to-goal pairs mapped via the object-to-goal map. In some examples, the object placement sequence determined by the placement sequence determiner 340 of FIG. 3 is optimized to provide for respective ones of the objects to be placed according to a shortest possible pathway. Following block 2104, control of the example program 1808 of FIG. 21 proceeds to block 2106.

At block 2106, the example placement sequence manager 342 of FIG. 3 initiates a processing cycle to be executed iteratively for each object included in the object placement sequence. The processing cycle initiated at block 2106 by the placement sequence manager 342 includes blocks 2108, 2110, 2112 and 2114, as further described below.

At block 2108, the example goal identifier 344 of FIG. 3 identifies an assembly goal for the object of the object placement sequence that is currently being processed via the processing cycle invoked by the placement sequence manager 342 of FIG. 3. For example, the goal identifier 344 may identify an assembly goal for a specified object included in the object placement sequence (e.g., the object placement sequence 1400 of FIG. 14) based on a correlation provided by the mapped object-to-goal pairs of the object-to-goal map (e.g., the object-to-goal map 1300 of FIG. 13) generated by the object-to-goal mapper 338 of FIG. 3. Following block 2108, control of the example program 1808 of FIG. 21 proceeds to block 2110.

At block 2110, the example action primitive sequence determiner 346 of FIG. 3 determines a sequence of action primitives associated with the assembly goal of the object, as identified by the goal identifier 344 of FIG. 3. For example, the action primitive sequence determiner 346 may determine a sequence of action primitives for a specified assembly goal based on an association and/or correlation provided by a goal-to-primitive correlation table (e.g., the goal-to-primitive table 1500 of FIG. 15). Following block 2110, control of the example program 1808 of FIG. 21 proceeds to block 2112.

At block 2112, the example output manager 348 of FIG. 3 outputs the sequence of action primitives for the object, as determined by the action primitive sequence determiner 346 of FIG. 3. For example, the output manager 348 may output the sequence of action primitives determined by the action primitive sequence determiner 346 to the movement manager 312 of FIG. 3. Following block 2112, control of the example program 1808 of FIG. 21 proceeds to block 2114.

At block 2114, the example placement sequence manager 342 of FIG. 3 determines whether all objects in the object placement sequence have been processed. For example, the placement sequence manager 342 may determine, by comparing the most recent output made at block 2112 to the object placement sequence determined at block 2104, that one or more object(s) included in the object placement sequence has/have yet to be processed. If the placement sequence manager 342 determines at block 2114 that all of the objects included in the object placement sequence have not been processed, control of the example program 1808 of FIG. 21 returns to block 2106. If the placement sequence manager 342 instead determines at block 2114 that all of the objects included in the object placement sequence have been processed, control of the example program 1808 of FIG. 21 returns to a function call such as block 1808 of the example program 1800 of FIG. 18.

Figure 22:
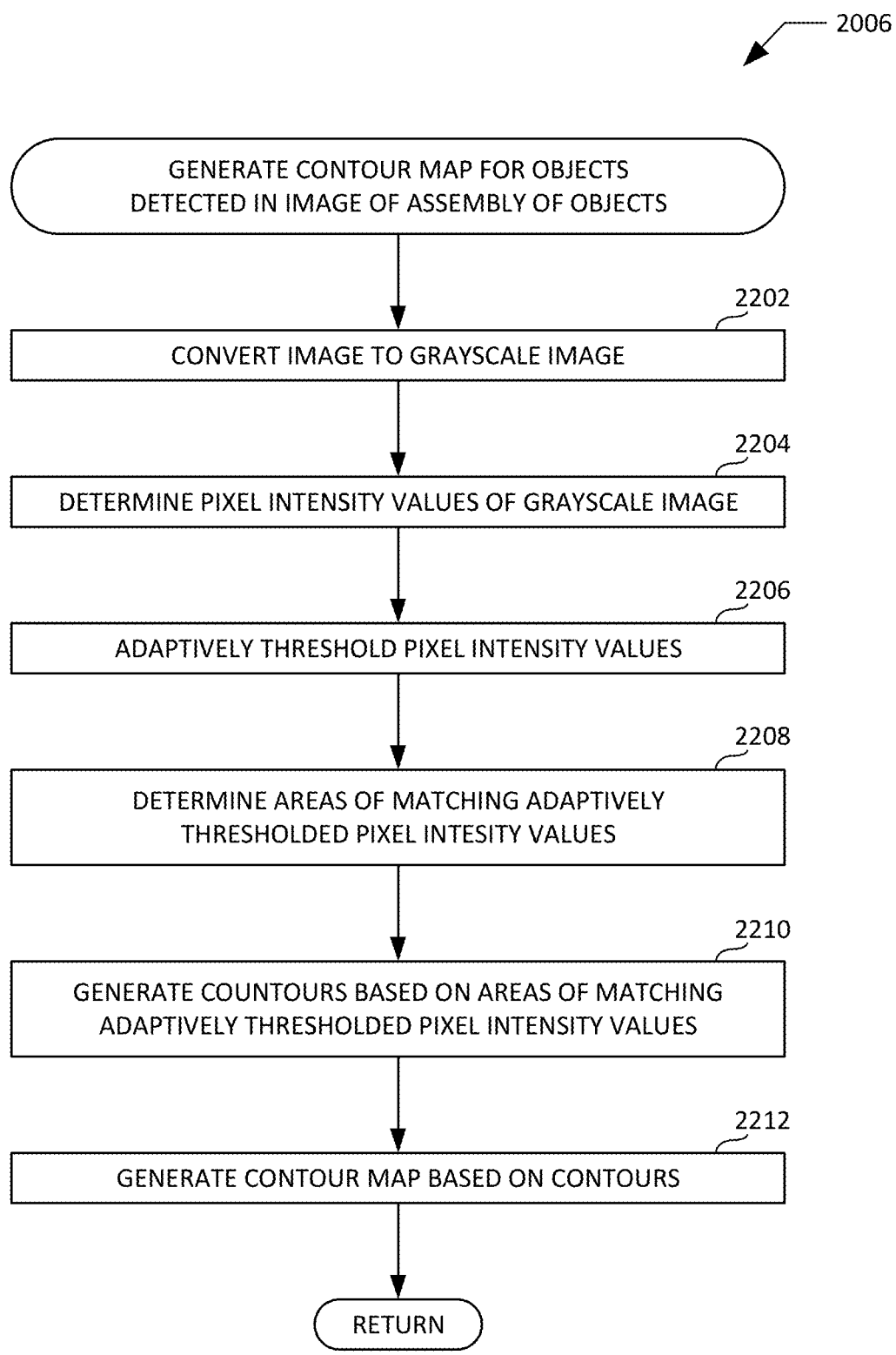
FIG. 22 is a flowchart representative of example machine readable instructions that may be executed to implement the example robot of FIGS. 1-3 and 5-8 to generate a contour map of assembled objects.

FIG. 22 is a flowchart representative of example machine readable instructions that may be executed to implement the example robot 102 of FIGS. 1-3 and 5-8 to generate a contour map for objects detected by the object detector 328 of FIG. 3 in the image of the assembly of objects accessed and/or obtained by the image manager 326 of FIG. 3. Example operations of blocks 2202, 2204, 2206, 2208, 2210 and 2212 of FIG. 22 may be used to implement block 2006 of FIG. 20. The example program 2006 of FIG. 22 begins when the example image converter 902 of FIG. 9 converts an image accessed and/or obtained by the image manager 326 of FIG. 3 into a grayscale image (block 2202). For example, the image converter 902 may convert an RGB image (e.g., RGB image data) accessed and/or obtained by the image manager 326 into a grayscale image (e.g., grayscale image data). Following block 2202, control of the example program 2006 of FIG. 22 proceeds to block 2204.

At block 2204, the example pixel intensity detector 904 of FIG. 9 detects and/or determines pixel intensity values for pixels of the grayscale image generated and/or processed by the image converter 902 of FIG. 9. For example, the pixel intensity detector 904 may detect and/or determine pixel intensity values for pixels of the grayscale image by applying a binarization algorithm (e.g., Otsu's algorithm) to the grayscale image. Following block 2204, control of the example program 2006 of FIG. 22 proceeds to block 2206.

At block 2206, the example thresholder 906 of FIG. 9 adaptively thresholds the pixel intensity values determined by the pixel intensity detector 904 of FIG. 9. For example, the thresholder 906 may adaptively threshold the pixel intensity values by applying an adaptive thresholding algorithm to the pixel intensity values. Following block 2206, control of the example program 2006 of FIG. 22 proceeds to block 2208.

At block 2208, the example pixel intensity comparator 908 of FIG. 9 detects and/or determines areas of matching (e.g., statistically similar) adaptively thresholded pixel intensity values that have been adaptively thresholded by the thresholder 906 of FIG. 9 (block 2208). For example, the pixel intensity comparator 908 may detect and/or determine areas of matching adaptively thresholded pixel intensity values by comparing the adaptively thresholded pixel intensity values of neighboring pixels for statistical similarity and/or likeness. Following block 2208, control of the example program 2006 of FIG. 22 proceeds to block 2210.

At block 2210, the example contour generator 910 of FIG. 9 generates contours based on the areas of matching adaptively thresholded pixel intensity values detected and/or determined by the pixel intensity comparator 908 of FIG. 9. For example, the contour generator 910 may generate one or more contour(s), based on the areas of matching adaptively thresholded pixel intensity values, that can be represented by and/or as one or more straight and/or curved line segment(s). Following block 2210, control of the example program 2006 of FIG. 22 proceeds to block 2212.

At block 2212, the example map generator 330 of FIGS. 3 and 9 generates a contour map based on the contours generated by the contour generator 910 of FIG. 9. For example, the map generator 330 may generate a contour map (e.g., the contour map 1000 of FIG. 10) that includes and/or incorporates the contours generated by the contour generator 910. In some examples, the contour map generated by the map generator 330 represents and/or indicates one or more boundaries and/or physical properties (e.g., a size, a shape, an edge, a relative position, a relative orientation, etc.) of one or more object(s) detected by the object detector 328 of FIG. 3 and/or included within the image of the assembly of objects accessed and/or obtained by the image manager 326 of FIG. 3. Following block 2212, control of the example program 2006 of FIG. 22 returns to a function call such as block 2006 of the example program 1806 of FIG. 20.

Figure 23:
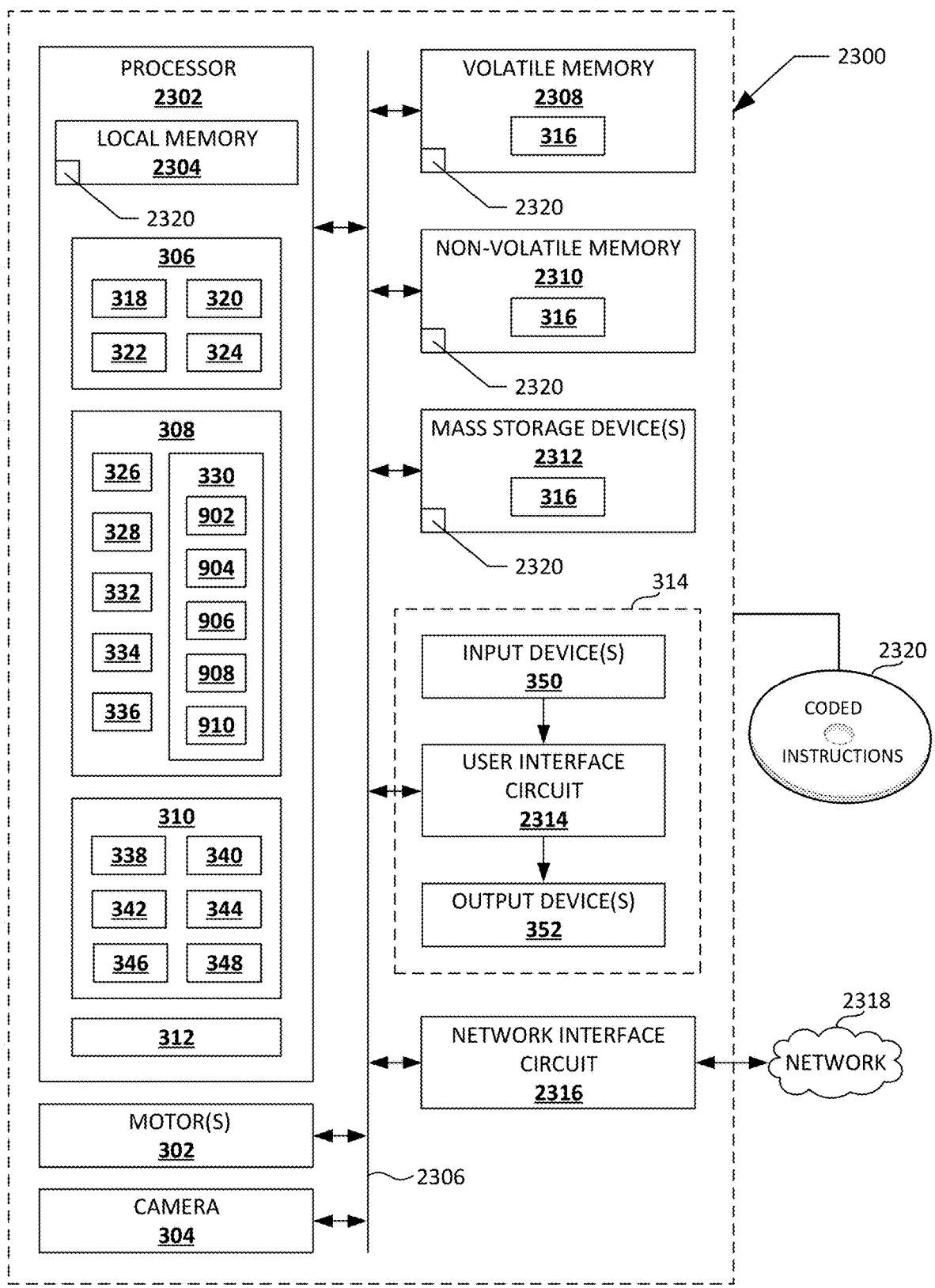
FIG. 23 is a block diagram of an example processor platform structured to execute the example instructions of FIGS. 18-22 to implement the example robot of FIGS. 1-3 and 5-8.

FIG. 23 is a block diagram of an example processor platform 2300 structured to execute the example instructions 1800 of FIGS. 18-22 to implement the example robot 102 of FIGS. 1-3 and 5-8. The processor platform 2300 of the illustrated example includes a processor 2302. The processor 2302 of the illustrated example is hardware. For example, the processor 2302 can be implemented by one or more integrated circuit(s), logic circuit(s), microprocessor(s), GPU(s), DSP(s), microcontroller(s), processor(s), or microcontroller(s) from any desired family or manufacturer. The hardware processor may be a semiconductor based (e.g., silicon based) device. In this example, the processor 2302 implements the example policy library developer 306, the example decomposition manager 308, the example construction manager 310, the example movement manager 312, the example action primitive selector 318, the example policy generator 320, the example policy optimizer 322, the example library manager 324, the example image manager 326, the example object detector 328, the example map generator 330, the example segmentation generator 332, the example location goal determiner 334, the example assembly goal determiner 336, the example object-to-goal mapper 338, the example placement sequence determiner 340, the example placement sequence manager 342, the example goal identifier 344, the example action primitive sequence determiner 346, the example output manager 348, the example image converter 902, the example pixel intensity detector 904, the example thresholder 906, the example pixel intensity comparator 908, and the example contour generator 910 of FIGS. 3 and 9.

The processor 2302 of the illustrated example includes a local memory 2304 (e.g., a cache). The processor 2302 is in communication with the example motor(s) 302 and the example camera 304 of FIG. 3 via a bus 2306. The processor 2302 is also in communication with a main memory including a volatile memory 2308 and a non-volatile memory 2310 via the bus 2306. The volatile memory 2308 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2310 may be implemented by flash memory and/or any other desired type of memory device. Access to the main memory 2308, 2310 is controlled by a memory controller.

The processor platform 2300 of the illustrated example also includes one or more mass storage device(s) 2312 for storing software and/or data. Examples of such mass storage device(s) 2312 include floppy disk drives, hard drive disks, compact disk drives, Blu-ray disk drives, redundant array of independent disks (RAID) systems, and digital versatile disk (DVD) drives. In the illustrated example of FIG. 23, one or more of the volatile memory 2308, the non-volatile memory 2310, and/or the mass storage device(s) 2312 implement(s) the example memory 316 of FIG. 3.

The processor platform 2300 of the illustrated example also includes a user interface circuit 2314. The user interface circuit 2314 may be implemented by any type of interface standard, such as an Ethernet interface, a universal serial bus (USB), a Bluetooth® interface, a near field communication (NFC) interface, and/or a PCI express interface. In the illustrated example, one or more input device(s) 350 of FIG. 3 are connected to the user interface circuit 2314. The input device(s) 350 permit(s) a user to enter data and/or commands into the processor 2302. The input device(s) 350 can be implemented by, for example, an audio sensor, a microphone, a camera (still or video), a keyboard, a button, a mouse, a touchscreen, a track-pad, a trackball, isopoint and/or a voice recognition system. One or more output device(s) 352 of FIG. 3 are also connected to the user interface circuit 2314 of the illustrated example. The output device(s) 352 can be implemented, for example, by a display device (e.g., a light emitting diode (LED), an organic light emitting diode (OLED), a liquid crystal display (LCD), a touchscreen, etc.), a tactile output device, and/or a speaker. The user interface circuit 2314 of the illustrated example, thus, typically includes a graphics driver card, a graphics driver chip and/or a graphics driver processor. In the illustrated example, the input device(s) 350, the output device(s) 352, and the user interface circuit 2314 collectively implement the example user interface 314 of FIG. 3.

The processor platform 2300 of the illustrated example also includes a network interface circuit 2316. The network interface circuit 2316 may be implemented by any type of interface standard, such as an Ethernet interface, a universal serial bus (USB), a Bluetooth® interface, a near field communication (NFC) interface, and/or a PCI express interface. The network interface circuit 2316 may include a radio transmitter, a radio receiver, and/or a radio transceiver to facilitate the exchange of data and/or signals with external machines (e.g., a server, other computing devices, other robots, etc.) via a network 2318 (e.g., a cellular network, a wireless local area network (WLAN), etc.).

Coded instructions 2320 including the machine readable instructions 1800 of FIGS. 18-22 may be stored in the local memory 2304, in the volatile memory 2308, in the non-volatile memory 2310, on the mass storage device(s) 2312, and/or on a removable non-transitory computer readable storage medium such as a flash memory stick, a CD, or a DVD.

From the foregoing, it will be appreciated that methods and apparatus have been disclosed that advantageously enable complex assembly via autonomous robots using RL action primitives corresponding to relatively simple (e.g., non-complex) robotic actions and/or robotic movements. Example disclosed methods and apparatus enable a robot to individually learn respective ones of the RL action primitives. Example disclosed methods and apparatus can intelligently combine various ones of the learned RL action primitives into one or more action primitive policies to be followed and/or implemented by the robot. Subsequent to a robot learning the RL action primitives, example disclosed methods and apparatus can decompose (e.g., deconstruct) complex assembly tasks to be performed by the robot into a sequence of the RL action primitives. Example disclosed methods and apparatus can associate the sequence of RL action primitives with one or more of the action primitive policies, and can cause the robot to follow and/or implement the associated action primitive policies to construct a complex assembly corresponding to the complex assembly task.

In some examples, methods and apparatus disclosed herein automatically decompose (e.g., deconstruct) an image (e.g., captured by or otherwise input to the robot) of an assembly of objects into a plurality of constituent objects having object location goals (e.g., target object locations) and associated assembly goals (e.g., target object assembly parameters such as on a shelf, under a shelf, on another object, under another object, in front of another object, behind another object, etc.). Based on the object location goals and the associated assembly goals, example disclosed methods and apparatus determine an object placement sequence to be implemented, invoked and/or executed by and/or at the robot to sequentially place the constituent objects within a space. For each object in the object placement sequence, example disclosed methods and apparatus determine an action primitive sequence that may be implemented, invoked and/or executed by and/or at the robot to construct a physical assembly of objects corresponding to the imaged assembly of objects. Each action primitive sequence includes one or more RL action primitives that have previously been learned by the robot and stored as one or more corresponding action primitive policies in an action primitive policy library. Example disclosed methods and apparatus access the action primitive policies corresponding to the action primitive sequence, and implement, invoke and/or execute such action primitive policies at the robot to construct the physical assembly of objects.

Example disclosed methods and apparatus for complex assembly via autonomous robots using RI, action primitives provide numerous advantages relative to the known solutions described above. For example, by providing an RL-based approach, example disclosed methods and apparatus advantageously reduce (e.g., eliminate) the tedious and labor-intensive process of manually programming robots to perform complex assembly tasks. As another example, by providing an RL-based approach that utilizes relatively simple (e.g., non-complex) RL action primitives, example disclosed methods and apparatus advantageously reduce (e.g., eliminate) the learning failures that commonly occur in connection with known end-to-end RL-based solutions that do not segment the otherwise complex learning process that is inherently associated with a complex assembly task. As another example, by providing an RL-based approach that utilizes relatively simple and non-complex RL action primitives that are combinable into a myriad of configurations and/or sequences, example disclosed methods and apparatus advantageously provide a solution that is easily adaptable and/or scalable to environments and/or applications that present frequently changing and/or varying numbers, types and/or configurations of objects and/or object assemblies. As another example, by providing an RL-based approach that incorporates automated decomposition (e.g., deconstruction) of an imaged assembly of objects as a basis for constructing a physical assembly of objects corresponding to the imaged assembly, example disclosed methods and apparatus advantageously provide complete end-to-end automation for robotic construction of complex object assemblies In some examples, an apparatus is disclosed. In some disclosed examples, the apparatus includes a construction manager and a movement manager. In some disclosed examples, the construction manager to determine sequences of reinforcement learning (RL) action primitives based on object location goals and associated assembly goals determined for respective ones of objects depicted in an imaged assembly of objects. In some disclosed examples, the movement manager to command a robot to construct a physical assembly of objects based on the sequences of RL action primitives. In some disclosed examples, the physical assembly of objects is to correspond to the imaged assembly of objects.

In some disclosed examples, the apparatus further includes an object-to-goal mapper to generate an object-to-goal map based on the object location goals, the associated assembly goals, and initial locations of physical objects to be included in the physical assembly of objects. In some disclosed examples, the apparatus further includes a placement sequence determiner to determine an object placement sequence for the physical objects based on the object-to-goal map.

In some disclosed examples, the apparatus further includes a placement sequence manager to iteratively invoke, for respective ones of the physical objects according to the object placement sequence, a goal identifier, an action primitive sequence determiner, and an output manager. In some disclosed examples, the goal identifier is to identify a corresponding one of the assembly goals based on the object-to-goal map. In some disclosed examples, the action primitive sequence determiner is to determine a corresponding one of the sequences of RL action primitives associated with the corresponding one of the assembly goals. In some disclosed examples, the output manager is to output the corresponding one of the sequences of RL action primitives to the movement manager.

In some disclosed examples, the movement manager is to command the robot to construct the physical assembly of objects by invoking action primitive policies previously learned by the robot. In some disclosed examples, the movement manager is to access the action primitive policies from an action primitive policy library.

In some disclosed examples, the apparatus further includes a policy generator to train the action primitive policies by invoking an RL algorithm. In some disclosed examples, the robot is to learn the action primitive policies based on the RL algorithm. In some disclosed examples, the apparatus further includes a library manager to add the action primitive policies generated by the policy generator to the action primitive policy library.

In some disclosed examples, the apparatus further includes a decomposition manager to decompose an image depicting the imaged assembly of objects into the object location goals and the associated assembly goals.

In some disclosed examples, the apparatus further includes an image manager to obtain the image. In some disclosed examples, the apparatus further includes an object detector to detect objects associated with the imaged assembly of objects depicted in the image. In some disclosed examples, the apparatus further includes a map generator to generate a contour map for the objects based on the imaged assembly of objects depicted in the image. In some disclosed examples, the apparatus further includes a location goal determiner to determine the object location goals based on the contour map. In some disclosed examples, the apparatus further includes an assembly goal determiner to determine the associated assembly goals based on the contour map.

In some disclosed examples, the apparatus further includes a camera. In some disclosed examples, the image manager is to command the camera to capture the image.

In some disclosed examples, the apparatus further includes an image converter to convert the image to a grayscale image. In some disclosed examples, the apparatus further includes a pixel intensity detector to detect pixel intensity values of pixels of the grayscale image. In some disclosed examples, the apparatus further includes a thresholder to generate adaptively thresholded pixel intensity values by adaptively thresholding the pixel intensity values. In some disclosed examples, the apparatus further includes a pixel intensity comparator to determine areas of matching adaptively thresholded pixel intensity values. In some disclosed examples, the apparatus further includes a contour generator to generate contours based on the areas of matching adaptively thresholded pixel intensity values. In some disclosed examples, the map generator is to generate the contour map based on the contours.

In some disclosed examples, the apparatus further includes an image manager to obtain the image. In some disclosed examples, the apparatus further includes an object detector to detect objects associated with the imaged assembly of objects depicted in the image. In some disclosed examples, the apparatus further includes a segmentation generator to generate a semantic segmentation for the objects based on the imaged assembly of objects depicted in the image. In some disclosed examples, the apparatus further includes a location goal determiner to determine the object location goals based on the semantic segmentation. In some disclosed examples, the apparatus further includes an assembly goal determiner to determine the associated assembly goals based on the semantic segmentation.

In some examples, a non-transitory computer-readable storage medium including instructions is disclosed. In some disclosed examples, the instructions, when executed, cause one or more processors of a robot to determine sequences of reinforcement learning (RL) action primitives based on object location goals and associated assembly goals determined for respective ones of objects depicted in an imaged assembly of objects. In some disclosed examples, the instructions, when executed, cause the one or more processors to command the robot to construct a physical assembly of objects based on the sequences of RL action primitives. In some disclosed examples, the physical assembly of objects is to correspond to the imaged assembly of objects.

In some disclosed examples, the instructions, when executed, cause the one or more processors to generate an object-to-goal map based on the object location goals, the associated assembly goals, and initial locations of physical objects to be included in the physical assembly of objects. In some disclosed examples, the instructions, when executed, cause the one or more processors to determine an object placement sequence for the physical objects based on the object-to-goal map.

In some disclosed examples, the instructions, when executed, cause the one or more processors to iteratively, for respective ones of the physical objects according to the object placement sequence: identify a corresponding one of the assembly goals based on the object-to-goal map; determine a corresponding one of the sequences of RL action primitives associated with the corresponding one of the assembly goals; and output the corresponding one of the sequences of RL action primitives.

In some disclosed examples, the instructions, when executed, cause the one or more processors to command the robot to construct the physical assembly of objects by invoking action primitive policies previously learned by the robot. In some disclosed examples, the action primitive policies are to be accessed from an action primitive policy library.

In some disclosed examples, the instructions, when executed, cause the one or more processors to train the action primitive policies by invoking an RL algorithm. In some disclosed examples, the robot is to learn the action primitive policies based on the RL algorithm. In some disclosed examples, the instructions, when executed, cause the one or more processors to add the action primitive policies to the action primitive policy library.

In some disclosed examples, the instructions, when executed, cause the one or more processors to decompose an image depicting the imaged assembly of objects into the object location goals and the associated assembly goals.

In some disclosed examples, the instructions, when executed, cause the one or more processors to obtain the image. In some disclosed examples, the instructions, when executed, cause the one or more processors to detect objects associated with the imaged assembly of objects depicted in the image. In some disclosed examples, the instructions, when executed, cause the one or more processors to generate a contour map for the objects based on the imaged assembly of objects depicted in the image. In some disclosed examples, the instructions, when executed, cause the one or more processors to determine the object location goals based on the contour map. In some disclosed examples, the instructions, when executed, cause the one or more processors to determine the associated assembly goals based on the contour map.

In some disclosed examples, the instructions, when executed, cause the one or more processors to command a camera of the robot to capture the image.

In some disclosed examples, the instructions, when executed, cause the one or more processors to convert the image to a grayscale image. In some disclosed examples, the instructions, when executed, cause the one or more processors to detect pixel intensity values of pixels of the grayscale image. In some disclosed examples, the instructions, when executed, cause the one or more processors to generate adaptively thresholded pixel intensity values by adaptively thresholding the pixel intensity values. In some disclosed examples, the instructions, when executed, cause the one or more processors to determine areas of matching adaptively thresholded pixel intensity values. In some disclosed examples, the instructions, when executed, cause the one or more processors to generate contours based on the areas of matching adaptively thresholded pixel intensity values. In some disclosed examples, the generating of the contour map is based on the contours.

In some disclosed examples, the instructions, when executed, cause the one or more processors to obtain the image. In some disclosed examples, the instructions, when executed, cause the one or more processors to detect objects associated with the imaged assembly of objects depicted in the image. In some disclosed examples, the instructions, when executed, cause the one or more processors to generate a semantic segmentation for the objects based on the imaged assembly of objects depicted in the image. In some disclosed examples, the instructions, when executed, cause the one or more processors to determine the object location goals based on the semantic segmentation. In some disclosed examples, the instructions, when executed, cause the one or more processors to determine the associated assembly goals based on the semantic segmentation.

In some examples, a method is disclosed. In some disclosed examples, the method includes determining, by executing a computer-readable instruction with one or more processors of a robot, sequences of reinforcement learning (RL) action primitives based on object location goals and associated assembly goals determined for respective ones of objects depicted in an imaged assembly of objects. In some disclosed examples, the method includes commanding, by executing a computer-readable instruction with the one or more processors, the robot to construct a physical assembly of objects based on the sequences of RL action primitives. In some disclosed examples, the physical assembly of objects is to correspond to the imaged assembly of objects.

In some disclosed examples, the method further includes generating, by executing a computer-readable instruction with the one or more processors, an object-to-goal map based on the object location goals, the associated assembly goals, and initial locations of physical objects to be included in the physical assembly of objects. In some disclosed examples, the method further includes determining, by executing a computer-readable instruction with the one or more processors, an object placement sequence for the physical objects based on the object-to-goal map.

In some disclosed examples, the method further includes, iteratively, for respective ones of the physical objects according to the object placement sequence: identifying, by executing a computer-readable instruction with the one or more processors, a corresponding one of the assembly goals based on the object-to-goal map; determining, by executing a computer-readable instruction with the one or more processors, a corresponding one of the sequences of RL action primitives associated with the corresponding one of the assembly goals; and outputting, by executing a computer-readable instruction with the one or more processors, the corresponding one of the sequences of RL action primitives.

In some disclosed examples, the commanding of the robot to construct the physical assembly of objects includes invoking action primitive policies previously learned by the robot. In some disclosed examples, the action primitive policies are to be accessed from an action primitive policy library.

In some disclosed examples, the method further includes training, by executing a computer-readable instruction with the one or more processors, the action primitive policies by invoking an RL algorithm. In some disclosed examples, the robot is to learn the action primitive policies based on the RL algorithm. In some disclosed examples, the method further includes adding, by executing a computer-readable instruction with the one or more processors, the action primitive policies to the action primitive policy library.

In some disclosed examples, the method further includes decomposing, by executing a computer-readable instruction with the one or more processors, an image depicting the imaged assembly of objects into the object location goals and the associated assembly goals.

In some disclosed examples, the method further includes obtaining the image by executing a computer-readable instruction with the one or more processors. In some disclosed examples, the method further includes detecting, by executing a computer-readable instruction with the one or more processors, objects associated with the imaged assembly of objects depicted in the image. In some disclosed examples, the method further includes generating, by executing a computer-readable instruction with the one or more processors, a contour map for the objects based on the imaged assembly of objects depicted in the image. In some disclosed examples, the method further includes determining, by executing a computer-readable instruction with the one or more processors, the object location goals based on the contour map. In some disclosed examples, the method further includes determining, by executing a computer-readable instruction with the one or more processors, the associated assembly goals based on the contour map.

In some disclosed examples, the method further includes commanding, by executing a computer-readable instruction with the one or more processors, a camera of the robot to capture the image.

In some disclosed examples, the method further includes converting, by executing a computer-readable instruction with the one or more processors, the image to a grayscale image. In some disclosed examples, the method further includes detecting, by executing a computer-readable instruction with the one or more processors, pixel intensity values of pixels of the grayscale image. In some disclosed examples, the method further includes generating, by executing a computer-readable instruction with the one or more processors, adaptively thresholded pixel intensity values by adaptively thresholding the pixel intensity values. In some disclosed examples, the method further includes determining, by executing a computer-readable instruction with the one or more processors, areas of matching adaptively thresholded pixel intensity values. In some disclosed examples, the method further includes generating, by executing a computer-readable instruction with the one or more processors, contours based on the areas of matching adaptively thresholded pixel intensity values. In some disclosed examples, the generating of the contour map is based on the contours.

In some disclosed examples, the method further includes obtaining the image by executing a computer-readable instruction with the one or more processors. In some disclosed examples, the method further includes detecting, by executing a computer-readable instruction with the one or more processors, objects associated with the imaged assembly of objects depicted in the image. In some disclosed examples, the method further includes generating, by executing a computer-readable instruction with the one or more processors, a semantic segmentation map for the objects based on the imaged assembly of objects depicted in the image. In some disclosed examples, the method further includes determining, by executing a computer-readable instruction with the one or more processors, the object location goals based on the semantic segmentation. In some disclosed examples, the method further includes determining, by executing a computer-readable instruction with the one or more processors, the associated assembly goals based on the semantic segmentation.

In some examples, an apparatus is disclosed. In some disclosed examples, the apparatus comprises means for determining a sequence of reinforcement learning (RL) action primitives based on an object location goal and an associated assembly goal determined for an object depicted in an imaged assembly of objects. In some disclosed examples, the apparatus further comprises means for commanding a robot to construct a physical assembly of objects based on the sequence of RL action primitives. In some disclosed examples, the physical assembly of objects is to correspond to the imaged assembly of objects.

In some disclosed examples, the apparatus further includes means for generating an object-to-goal map based on (i) object location goals including the object location goal, (ii) associated assembly goals including the associated assembly goal, and (iii) initial locations of physical objects to be included in the physical assembly of objects. In some disclosed examples, the apparatus further includes means for determining an object placement sequence for the physical objects based on the object-to-goal map.

In some disclosed examples, the apparatus further includes means for iteratively invoking, for respective ones of the physical objects according to the object placement sequence: means for identifying a corresponding one of the assembly goals based on the object-to-goal map; means for determining a corresponding one of the sequences of RL action primitives associated with the corresponding one of the assembly goals; and means for outputting the corresponding one of the sequences of RL action primitives to the movement manager.

In some disclosed examples, the means for commanding is to command the robot to construct the physical assembly of objects by invoking action primitive policies previously learned by the robot. In some disclosed examples, the means for commanding is to access the action primitive policies from an action primitive policy library.

In some disclosed examples, the apparatus further includes means for training the action primitive policies. In some disclosed examples, the means for training is to invoke an RL algorithm. In some disclosed examples, the robot is to learn the action primitive policies based on the RL algorithm. In some disclosed examples, the apparatus further includes means for adding the action primitive policies to the action primitive policy library.

In some disclosed examples, the apparatus further includes means for decomposing an image depicting the imaged assembly of objects into (i) object location goals including the object location goal and (ii) associated assembly goals including the associated assembly goal.

In some disclosed examples, the apparatus further includes means for obtaining the image. In some disclosed examples, the apparatus further includes means for detecting objects associated with the imaged assembly of objects depicted in the image. In some disclosed examples, the apparatus further includes means for generating a contour map for the objects based on the imaged assembly of objects depicted in the image. In some disclosed examples, the apparatus further includes means for determining the object location goals based on the contour map. In some disclosed examples, the apparatus further includes means for determining the associated assembly goals based on the contour map.

In some disclosed examples, the apparatus further includes a camera. In some disclosed examples, the means for obtaining the image is to command the camera to capture the image.

In some disclosed examples, the apparatus further includes means for converting the image to a grayscale image. In some disclosed examples, the apparatus further includes means for detecting pixel intensity values of pixels of the grayscale image. In some disclosed examples, the apparatus further includes means for generating adaptively thresholded pixel intensity values. In some disclosed examples, the apparatus further includes means for determining areas of matching adaptively thresholded pixel intensity values. In some disclosed examples, the apparatus further includes means for generating contours based on the areas of matching adaptively thresholded pixel intensity values. In some disclosed examples, the means for generating the contour map is to generate the contour map based on the contours.

In some disclosed examples, the apparatus further includes means for obtaining the image. In some disclosed examples, the apparatus further includes means for detecting objects associated with the imaged assembly of objects depicted in the image. In some disclosed examples, the apparatus further includes means for generating a semantic segmentation for the objects based on the imaged assembly of objects depicted in the image. In some disclosed examples, the apparatus further includes means for determining the object location goals based on the semantic segmentation. In some disclosed examples, the apparatus further includes means for determining the associated assembly goals based on the semantic segmentation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   at least one memory;
   computer-readable instructions; and
   processor circuitry to execute the computer-readable instructions to:
   determine sequences of reinforcement learning (RL) action primitives based on object location goals and associated assembly goals determined for respective ones of objects depicted in a captured image of an assembly picture, the image of the assembly picture to be captured from a presentation of the assembly picture on a display of a computing device; and
   command a robot to construct a physical assembly of objects based on the sequences of RL action primitives, the physical assembly of objects to visually match the captured image of the assembly picture.

2. The apparatus as defined in claim 1, wherein the processor circuitry is to execute the computer-readable instructions to:
   generate an object-to-goal map based on the object location goals, the associated assembly goals, and initial locations of physical objects to be included in the physical assembly of objects; and
   determine an object placement sequence for the physical objects based on the object-to-goal map.

3. The apparatus as defined in claim 2, wherein the processor circuitry is to execute the computer-readable instructions to iteratively, for respective ones of the physical objects according to the object placement sequence:
   identify a corresponding one of the assembly goals based on the object-to-goal map;
   determine a corresponding one of the sequences of RL action primitives associated with the corresponding one of the assembly goals; and
   output the corresponding one of the sequences of RL action primitives to the movement manager.

4. The apparatus as defined in claim 1, wherein the processor circuitry is to execute the computer-readable instructions to command the robot to construct the physical assembly of objects by invoking action primitive policies previously learned by the robot, the action primitive policies to be accessed from an action primitive policy library.

5. The apparatus as defined in claim 4, wherein the processor circuitry is to execute the computer-readable instructions to:
   train the action primitive policies by invoking an RL algorithm, the robot to learn the action primitive policies based on the RL algorithm; and
   add the action primitive policies to the action primitive policy library.

6. The apparatus as defined in claim 1, wherein the processor circuitry is to execute the computer-readable instructions to decompose the captured image of the assembly picture into the object location goals and the associated assembly goals.

7. The apparatus as defined in claim 6, wherein the processor circuitry is to execute the computer-readable instructions to:
   obtain the captured image of the assembly picture;
   detect objects associated with the captured image of the assembly picture;
   generate a contour map for the objects based on the captured image of the assembly picture;
   determine the object location goals based on the contour map; and
   determine the associated assembly goals based on the contour map.

8. The apparatus as defined in claim 7, further including a camera, wherein the processor circuitry is to execute the computer-readable instructions to command the camera to capture the image of the assembly picture.

9. The apparatus as defined in claim 7, wherein the processor circuitry is to execute the computer-readable instructions to:
   convert the captured image of the assembly picture to a grayscale image of the assembly picture;
   detect pixel intensity values of pixels of the grayscale image of the assembly picture;
   generate adaptively thresholded pixel intensity values by adaptively thresholding the pixel intensity values;
   determine areas of matching adaptively thresholded pixel intensity values; and
   generate contours based on the areas of matching adaptively thresholded pixel intensity values, the contour map to be generated based on the contours.

10. The apparatus as defined in claim 6, wherein the processor circuitry is to execute the computer-readable instructions to:
    obtain the captured image of the assembly picture;
    detect objects associated with the captured image of the assembly picture;
    generate a semantic segmentation for the objects based on the captured image of the assembly picture;
    determine the object location goals based on the semantic segmentation; and
    determine the associated assembly goals based on the semantic segmentation.

11. The apparatus as defined in claim 1, wherein the processor circuitry is to execute the computer-readable instructions to:
    obtain the captured image of the assembly picture;
    detect objects associated with the captured image of the assembly picture; and
    determine, based on a detected complexity of shapes of the objects, whether to generate a contour map for the objects or to instead generate a semantic segmentation for the objects.

12. The apparatus as defined in claim 11, wherein the processor circuitry is to execute the computer-readable instructions to generate the contour map for the objects in response to determining that the shapes of the objects are relatively complex.

13. The apparatus as defined in claim 11, wherein the processor circuitry is to execute the computer-readable instructions to generate the semantic segmentation for the objects in response to determining that the shapes of the objects are relatively simple.

14. A non-transitory computer-readable storage medium comprising instructions that, when executed, cause one or more processors of a robot to at least:
    determine sequences of reinforcement learning (RL) action primitives based on object location goals and associated assembly goals determined for respective ones of objects depicted in a captured image of an assembly picture, the image of the assembly picture to be captured from a presentation of the assembly picture on a display of a computing device; and command the robot to construct a physical assembly of objects based on the sequences of RL action primitives, the physical assembly of objects to visually match the captured image of the assembly picture.

15. The non-transitory computer-readable storage medium of claim 14, wherein the instructions, when executed, cause the one or more processors to:

generate an object-to-goal map based on the object location goals, the associated assembly goals, and initial locations of physical objects to be included in the physical assembly of objects; and determine an object placement sequence for the physical objects based on the object-to-goal map.

16. The non-transitory computer-readable storage medium of claim 15, wherein the instructions, when executed, cause the one or more processors to iteratively, for respective ones of the physical objects according to the object placement sequence:

identify a corresponding one of the assembly goals based on the object-to-goal map;

determine a corresponding one of the sequences of RL action primitives associated with the corresponding one of the assembly goals; and output the corresponding one of the sequences of RL action primitives.

17. The non-transitory computer-readable storage medium of claim 14, wherein the instructions, when executed, cause the one or more processors to decompose the captured image of the assembly picture into the object location goals and the associated assembly goals.

18. The non-transitory computer-readable storage medium of claim 17, wherein the instructions, when executed, cause the one or more processors to:

obtain the captured image of the assembly picture;

detect objects associated with the captured image of the assembly picture;

generate a contour map for the objects based on the captured image of the assembly picture;

determine the object location goals based on the contour map; and determine the associated assembly goals based on the contour map.

19. A method, comprising:

determining, by executing a computer-readable instruction with one or more processors of a robot, sequences of reinforcement learning (RL) action primitives based on object location goals and associated assembly goals determined for respective ones of objects depicted in a captured image of an assembly picture, the image of the assembly picture being captured from a presentation of the assembly picture on a display of a computing device; and commanding, by executing a computer-readable instruction with the one or more processors, the robot to construct a physical assembly of objects based on the sequences of RL action primitives, the physical assembly of objects to visually match the captured image of the assembly picture.

20. The method of claim 19, further including:

generating, by executing a computer-readable instruction with the one or more processors, an object-to-goal map based on the object location goals, the associated assembly goals, and initial locations of physical objects to be included in the physical assembly of objects; and determining, by executing a computer-readable instruction with the one or more processors, an object placement sequence for the physical objects based on the object-to-goal map.

21. The method of claim 20, further including, iteratively, for respective ones of the physical objects according to the object placement sequence:

identifying, by executing a computer-readable instruction with the one or more processors, a corresponding one of the assembly goals based on the object-to-goal map;

determining, by executing a computer-readable instruction with the one or more processors, a corresponding one of the sequences of RL action primitives associated with the corresponding one of the assembly goals; and outputting, by executing a computer-readable instruction with the one or more processors, the corresponding one of the sequences of RL action primitives.

22. The method of claim 19, further including decomposing, by executing a computer-readable instruction with the one or more processors, the captured image of the assembly picture into the object location goals and the associated assembly goals.

23. The method of claim 22, further including:

obtaining the captured image of the assembly picture by executing a computer-readable instruction with the one or more processors;

detecting, by executing a computer-readable instruction with the one or more processors, objects associated with the captured image of the assembly picture;

generating, by executing a computer-readable instruction with the one or more processors, a contour map for the objects based on the captured image of the assembly picture;

determining, by executing a computer-readable instruction with the one or more processors, the object location goals based on the contour map; and determining, by executing a computer-readable instruction with the one or more processors, the associated assembly goals based on the contour map.

* * * * *